United States Patent
Kim et al.

(10) Patent No.: US 10,728,831 B2
(45) Date of Patent: Jul. 28, 2020

(54) METHOD AND APPARATUS FOR SUPPORTING DISCONTINUOUS RECEPTION MODE OF CONNECTED MODE IN MOBILE COMMUNICATION SYSTEM

(71) Applicant: Samsung Electronics Co., Ltd., Suwon-si, Gyeonggi-do (KR)

(72) Inventors: Sangbum Kim, Suwon-si (KR); Soenghun Kim, Suwon-si (KR); Donggun Kim, Seoul (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/927,935

(22) Filed: Mar. 21, 2018

(65) Prior Publication Data

US 2018/0279204 A1  Sep. 27, 2018

(30) Foreign Application Priority Data

Mar. 21, 2017 (KR) .................. 10-2017-0035240

(51) Int. Cl.
*H04W 48/02* (2009.01)
*H04W 76/27* (2018.01)
(Continued)

(52) U.S. Cl.
CPC .......... *H04W 48/02* (2013.01); *H04W 76/27* (2018.02); *H04W 76/28* (2018.02); *H04W 88/02* (2013.01);
(Continued)

(58) Field of Classification Search
CPC ...... H04W 48/02; H04W 76/28; H04W 76/27
See application file for complete search history.

(56) References Cited

U.S. PATENT DOCUMENTS

| 2013/0237267 A1 | 9/2013 | Lee et al. |
| 2014/0126446 A1* | 5/2014 | Deivasigamani ........... H04W 52/0216 370/311 |

(Continued)

FOREIGN PATENT DOCUMENTS

| WO | 2012064076 A2 | 5/2012 |
| WO | 2014021611 A1 | 2/2014 |

(Continued)

OTHER PUBLICATIONS

ISA/KR, "International Search Report," International Application No. PCT/KR2017/008141, dated Nov. 16, 2017, 5 pages.

(Continued)

*Primary Examiner* — Charles C Jiang
*Assistant Examiner* — Voster Preval

(57) ABSTRACT

The present disclosure relates to a communication technique and system for integrating a 5G communication system for supporting a higher data rate after a 4G system with IoT technology. Based on 5G communication technology and IoT related technology, this disclosure may be applied to an intelligent service (e.g., smart home, smart building, smart city, smart car or connected car, health care, digital education, retail, security and safety related service). Embodiments relate to a method and apparatus for performing an access in an RRC inactive mode in a next generation mobile communication system.

8 Claims, 33 Drawing Sheets

(51) Int. Cl.
*H04W 76/28* (2018.01)
*H04W 88/02* (2009.01)

(52) U.S. Cl.
CPC .............. *Y02D 70/00* (2018.01); *Y02D 70/10* (2018.01); *Y02D 70/12* (2018.01); *Y02D 70/126* (2018.01); *Y02D 70/1242* (2018.01); *Y02D 70/1262* (2018.01); *Y02D 70/142* (2018.01); *Y02D 70/20* (2018.01); *Y02D 70/21* (2018.01); *Y02D 70/23* (2018.01); *Y02D 70/24* (2018.01)

(56) References Cited

U.S. PATENT DOCUMENTS

| | | | |
|---|---|---|---|
| 2015/0119015 A1* | 4/2015 | Gai | H04W 28/08 |
| | | | 455/418 |
| 2016/0205660 A1 | 7/2016 | Ryu et al. | |
| 2017/0374644 A1 | 12/2017 | Ryu et al. | |
| 2018/0054760 A1* | 2/2018 | Chun | H04W 28/0278 |
| 2018/0199273 A1* | 7/2018 | Chun | H04W 48/14 |
| 2018/0220487 A1* | 8/2018 | Wu | H04W 76/27 |
| 2018/0255484 A1* | 9/2018 | Wu | H04B 7/0697 |
| 2018/0295539 A1* | 10/2018 | Feng | H04W 28/0289 |
| 2018/0359681 A1* | 12/2018 | Futaki | H04W 48/16 |
| 2019/0349838 A1* | 11/2019 | Futaki | H04W 48/08 |

FOREIGN PATENT DOCUMENTS

| | | |
|---|---|---|
| WO | 2014069856 A1 | 5/2014 |
| WO | 2016099138 A1 | 6/2016 |
| WO | 2016105570 A1 | 6/2016 |
| WO | 2016111591 A1 | 7/2016 |
| WO | 2016130264 A1 | 8/2016 |

OTHER PUBLICATIONS

3GPP TS 36331 V13.2.0 (Jun. 2016), Technical Specification, 3rd Generation Partnership Project; Technical Specification Group Radio Access Network; Evolved Universal Terrestrial Radio Access (E-UTRA); Radio Resource control (RRC); Protocol specification (Release 13), 625 pages.

ISA/KR, International Search Report for International Application No. PCT/KR2018/003147, dated Jun. 26, 2018, 3 pages.

Samsung, "Mobility support for RRC Inactive UEs," R1-1702911, 3GPP TSG-RAN WG1 Meeting #88, Athens, Greece, Feb. 13-17, 2017, 10 pages.

Samsung, "DRB and QoS management in Inactive," R2-1701528, 3GPP TSG-RAN WG2 Feb. 2017 RAN2#97, Athens, Greece, Feb. 13-17, 2017, 4 pages.

NTT Docomo, Inc., "Discussion points for unified access barring mechanism", 3GPP TSG-RAN WG2#97, Feb. 13-17, 2016, R2-1702006, 3 pages.

Intel Corporation, "Considerations on the design aspects for NR access control", 3GPP TSG RAN WG2 NR Ad Hoc, Jan. 17-19, 2017, R2-1700349, 7 pages.

LG Electronics Inc., "Unified access control mechanism for New RAT", 3GPP TSG-RAN WG2 NR Ad Floc, Jan. 17-19, 2017, R2-1700453, 4 pages.

Supplementary European Search Report dated Oct. 9, 2019 in connection with European Patent Application No. 18 77 1841, 12 pages.

* cited by examiner

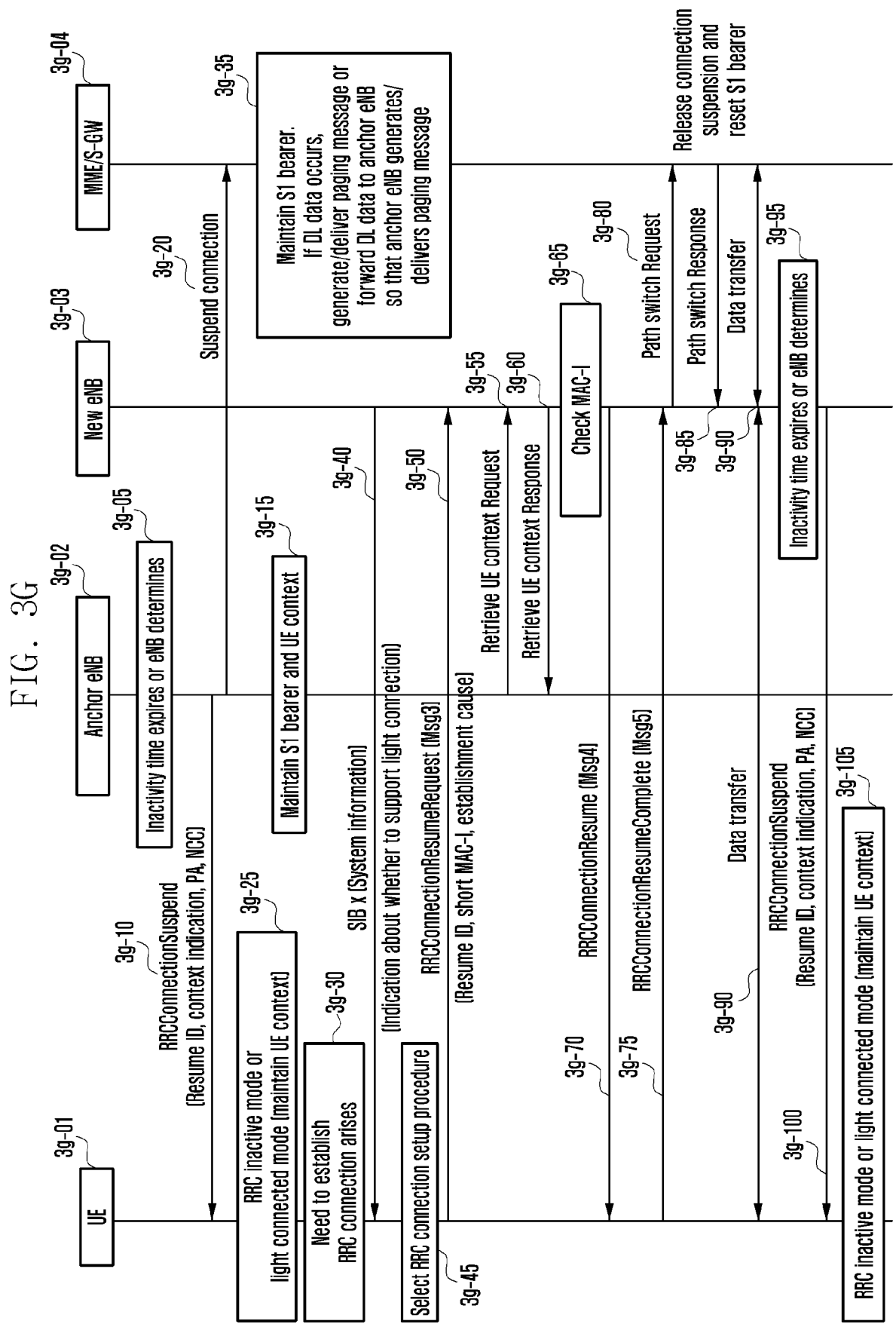

METHOD AND APPARATUS FOR SUPPORTING DISCONTINUOUS RECEPTION MODE OF CONNECTED MODE IN MOBILE COMMUNICATION SYSTEM

CROSS-REFERENCE TO RELATED APPLICATION AND CLAIM OF PRIORITY

This application is based on and claims priority under 35 U.S.C. § 119 to Korean Patent Application No. 10-2017-0035240 filed on Mar. 21, 2017, in the Korean Intellectual Property Office, the disclosure of which is incorporated herein by reference in its entirety.

TECHNICAL FIELD

The present disclosure relates to a method and apparatus for effectively supporting a discontinuous reception mode in a connected mode in a next generation mobile communication system.

BACKGROUND

In order to satisfy increasing demands of radio data traffic after the commercialization of a 4G communication system, efforts at developing an advanced 5G communication system or a pre-5G communication system have been made. For this reason, the 5G communication system or the pre-5G communication system is also referred to as a beyond-4G network communication system or a post-LTE system. In order to accomplish a higher data transfer rate, the 5G communication system considers implementation at a super-high frequency (mmWave) band (e.g., such as a 60 GHz band). In order to obviate a path loss of a radio wave and increase a delivery distance of a radio wave at the super-high frequency band, various techniques such as a beamforming, a massive MIMO, a full dimensional MIMO (FD-MIMO), an array antenna, an analog beam-forming, and a large scale antenna are discussed in the 5G communication system. Additionally, for an improvement in network of the 5G communication system, technical developments are made in an advanced small cell, a cloud radio access network (cloud RAN), an ultra-dense network, a device to device (D2D) communication, a wireless backhaul, a moving network, a cooperative communication, coordinated multi-points (CoMP), a reception interference cancellation, and the like. Besides, in the 5G communication system, a hybrid FSK and QAM modulation (FQAM) and a sliding window superposition coding (SWSC) are developed as advanced coding modulation (ACM) schemes, and a filter bank multi carrier (FBMC), a non orthogonal multiple access (NOMA), and a sparse code multiple access (SCMA) are also developed as advanced access techniques.

Meanwhile, the Internet is evolving from a human-centric network, in which humans generate and consume information, into an Internet of things (IoT) network in which distributed things exchange and process information. Further, the IoT technology combines with big data processing technology through connection with a cloud server or the like, thus developing into Internet of everything (IoE) technology. In order to realize the IoT, relevant technologies such as sensing technology, wired/wireless communication, network infrastructure, service interface technology, and security technology are used. Thus, recently, technologies such as a sensor network, machine-to-machine (M2M), and machine type communication (MTC) are studied. In the IoT environment, an intelligent Internet technology (IT) service can be provided that collects and analyzes data generated from connected things and thereby creates new value in a human life. The IoT can be applied to fields of smart home, smart building, smart city, smart car or connected car, smart grid, health care, smart home appliance, and advanced medical service through the fusion of existing information technology (IT) and various industries.

Accordingly, various attempts are now made to apply the 5G communication system to the IoT network. For example, technologies such as a sensor network, machine-to-machine (M2M), and machine type communication (MTC) are implemented by techniques such as beamforming, MIMO, and array antennas which belong to the 5G communication technology. To apply a cloud radio access network (cloud RAN) for the above-mentioned big data processing technology is an example of the fusion of the 5G technology and the IoT technology.

SUMMARY

The existing LTE technology can configure only two kinds of discontinuous reception (DRX) cycles and cannot dynamically change the DRX cycle depending on various data radio bearer (DRB) characteristics, traffic patterns, and buffer states.

The present disclosure proposes a DRX operation that can dynamically change the DRX cycle or drx-InactivityTimer depending on various DRB characteristics, traffic patterns, and buffer states.

In addition, the present disclosure proposes an operation for performing an access in a radio resource control (RRC) inactive mode in a next generation mobile communication system.

According to embodiments of the present disclosure, a method by a terminal comprises: performing data communication with a base station in a radio resource control (RRC) connected mode; transitioning from the RRC connected mode to an RRC inactive mode; if triggering of an access associated with one of configured data radio bearers (DRBs) is detected in the RRC inactive mode, determining whether the access is barred based on first barring information configured per DRB; and if the access is not barred, performing the access to the base station.

According to embodiments of the present disclosure, a terminal comprises: a transceiver; and a controller connected with the transceiver and configured to control to: perform data communication with a base station in a radio resource control (RRC) connected mode, transition from the RRC connected mode to an RRC inactive mode, if triggering of an access associated with one of configured data radio bearers (DRBs) is detected in the RRC inactive mode, determine whether the access is barred based on first barring information configured per DRB, and if the access is not barred, perform the access to the base station.

According to embodiments of the present disclosure, it is possible to reduce signal overhead for a terminal configured with a carrier aggregation technique for at least one low frequency cell and at least one high frequency cell.

In addition, according to embodiments of the present disclosure, a terminal can perform an access in an RRC inactive mode.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3G is a flow diagram illustrating a procedure in which a terminal transitions from an RRC connected mode to an RRC inactive mode (or a lightly-connected mode) and transitions from the RRC inactive mode to the RRC connected mode according to the third embodiment of the present disclosure.

DETAILED DESCRIPTION

Figure 1A:
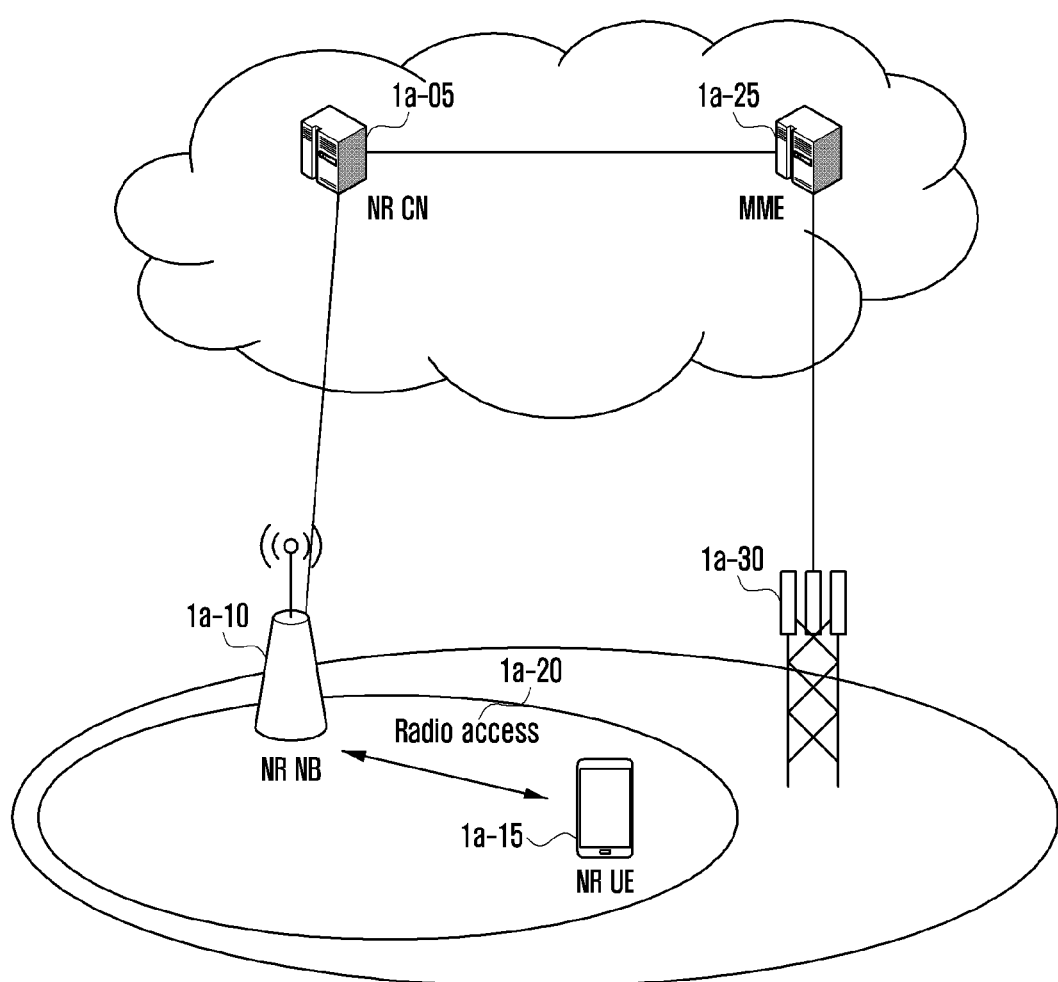
FIG. 1A is a diagram illustrating a structure of a next generation mobile communication system.

FIGS. 1 through 3N, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present disclosure will be described with reference to the accompanying drawings.

In the following description, well known elements, functions, operations, techniques, etc. may not be described or illustrated in detail to avoid obscuring the subject matter of the present disclosure. In addition, terms used herein are defined in consideration of functions of this disclosure and may be varied depending on a user or an operator's intention or custom. Therefore, the definition should be made based on the contents throughout this description.

The advantages and features of the present disclosure and the manner of achieving them will become apparent through embodiments described in detail below with reference to the accompanying drawings. The present disclosure may, however, be embodied in many different forms and should not be construed as limited to embodiments set forth herein. Rather, these embodiments are provided so that this disclosure will be thorough and complete, and will fully convey the scope of the disclosure to those skilled in the art. The present disclosure is only defined by the scope of claims. Like reference numerals refer to like elements throughout this disclosure.

In the following description, terms for identifying access nodes, terms for indicating network entities, terms for indicating messages, terms for indicating interfaces between network entities, terms for indicating various kinds of identification information, etc. are embodiments only and not to be construed as a limitation. Other terms having equivalent technical meanings may be also used.

For convenience of explanation, the following description uses terms and names defined in the 3rd generation partnership project long term evolution (3GPP LTE) standard. However, the present disclosure is not limited to the following description and may be equally applied to any other system that conforms to other standards.

First Embodiment

FIG. 1A is a diagram illustrating a structure of a next generation mobile communication system.

As shown in FIG. 1A, a radio access network of the next generation mobile communication system includes a next generation base station (also referred to as a new radio node B (NR NB) or simply a base station) 1a-10 and a new radio core network (NR CN) 1a-05. A user terminal (also referred to as new radio user equipment (NR UE) or simply a terminal) 1a-15 accesses an external network through the NR NB 1a-10 and the NR CN 1a-05.

In FIG. 1A, the NR NB 1a-10 corresponds to evolved node B (eNB) of the existing LTE system. The NR NB 1a-10 is connected to the NR UE 1a-15 through a radio channel 1a-20 and can provide a better service than the existing node B. In the next generation mobile communication system, since all user traffic is provided through a shared channel, a device for collecting various kinds of state information, such as buffer states, available transmission power states, and channel states of NR UEs, and then performing scheduling is used. This is performed by the NR NB 1a-10. Normally, one NR NB 1a-10 controls a plurality of cells. In order to realize high-speed data transfer compared to the existing LTE, more than the existing increased bandwidth may be applied, and also a beamforming technique may be used with orthogonal frequency division multiplexing (OFDM) as a radio access technology. In addition, an adaptive modulation and coding (AMC) scheme is used to determine a modulation scheme and a channel coding rate according to a channel state of the NR UE. The NR CN 1a-05 performs functions such as mobility support, bearer setup, and quality of service (QoS) setup. The NR CN 1a-05 is a device for performing various control functions as well as a mobility management function for the NR UE, and is connected to a plurality of NR NBs. Also, the next generation mobile communication system may be linked to the existing LTE system, and the NR CN 1a-05 is connected to an MME 1a-25 through a network interface. The MME 1a-25 is connected to eNB 1a-30 which is the existing base station.

Figure 1B:
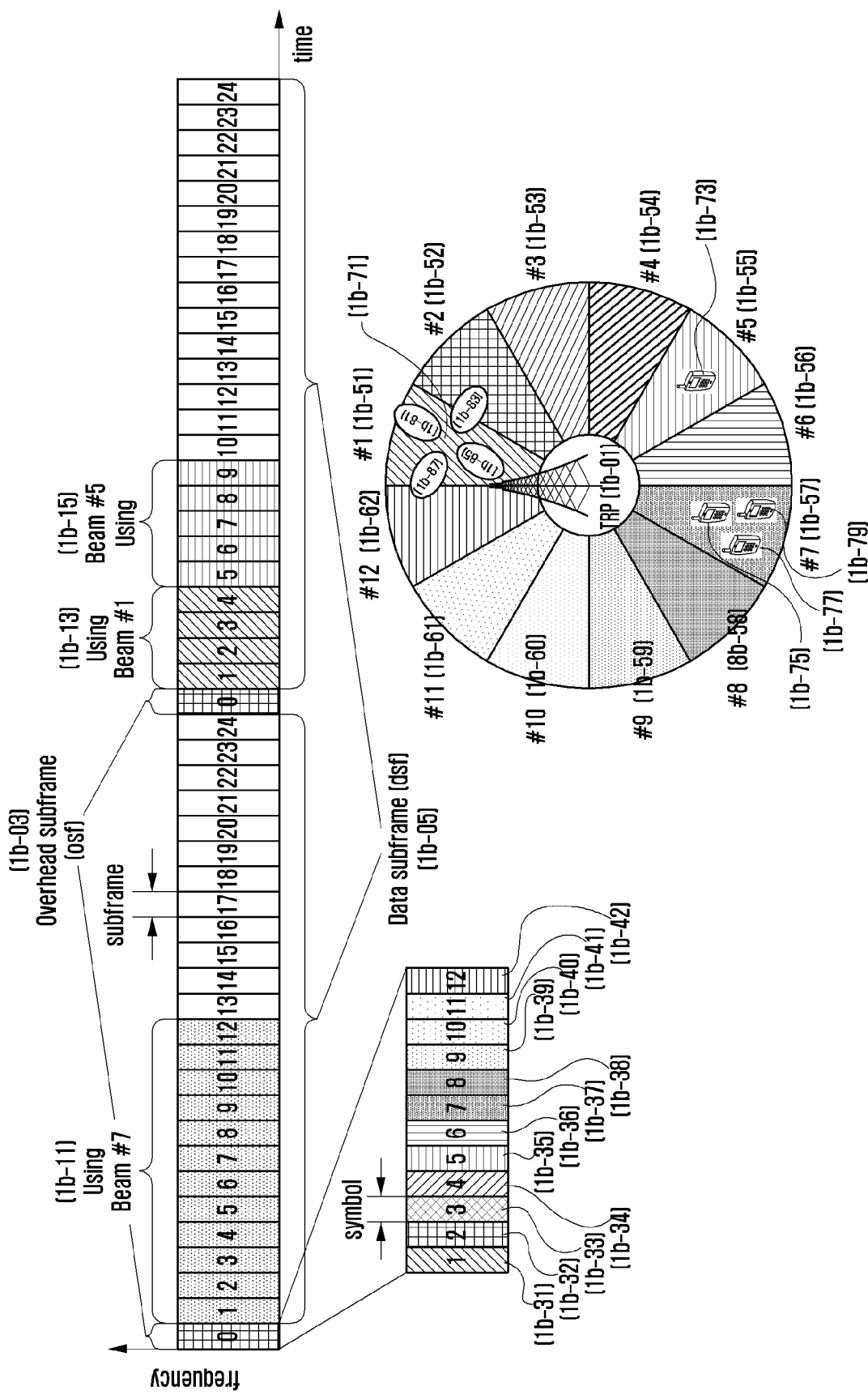
FIG. 1B is a diagram illustrating a frame structure used by an NR system to which the first embodiment of the present disclosure is applied.

FIG. 1B is a diagram illustrating a frame structure used by an NR system to which the first embodiment of the present disclosure is applied.

The NR system may consider a scenario of operating at a high frequency to secure a wide frequency bandwidth for a high transfer rate, and a scenario of transmitting data by generating a beam because of difficulty in signal transmission at high frequencies.

Accordingly, a scenario in which a base station (or a transmission/reception point (TRP)) 1b-01 communicates with terminals 1b-71, 1b-73, 1b-75, 1b-77, and 1b-79 in a cell by using different beams may be considered. That is, FIG. 1B assumes a scenario in which the first terminal 1b-71 communicates using the beam #1 1b-51, the second terminal 1b-73 communicates using the beam #5 1b-55, and the third, fourth, and fifth terminals 1b-75, 1b-77, and 1b-79 communicate through the beam #7 1b-57.

In order to measure a beam used for communication between the terminal and the base station, an overhead subframe (osf) 1b-03 exists in time, and the base station transmits a reference signal by using different beams for each symbol (or several symbols) in the overhead subframe. A beam index value for distinguishing each beam may be derived from the reference signal. In this example, it is assumed that there are twelve beams from the beam #1 1b-51 to the beam #12 1b-62 being transmitted by the base station, and it is also assumed that different beams are sweeping for respective symbols in the overhead subframe. That is, each beam is transmitted in each of symbols 1b-31 to 1b-42 (for example, the beam #1 1b-51 is transmitted in the first symbol 1b-31) in the overhead subframe, so that the terminal can measure the overhead subframe to know a signal having the highest strength among signals from beams transmitted in the overhead subframe.

In addition, FIG. 1B assumes a scenario in which the overhead subframe is repeated every 25 subframes, and the remaining 24 subframes are data subframes (dsf) 1b-05 in which normal data is transmitted and received.

Thus, according to the scheduling of the base station, the third, fourth, and fifth terminals 1b-75, 1b-77, and 1b-79 communicate using beam #7 in common (1b-11), the first terminal 1b-71 communicates using the beam #1 (1b-13), and the second terminal 1b-73 communicates using the beam #5 (1b-15).

Although FIG. 1B mainly shows transmission beams #1 1b-51 to #12 1b-62 of the base station, reception beams of the terminal (e.g., 1b-81, 1b-83, 1b-85, and 1b-87 of the first terminal 1b-71) for receiving the transmission beam of the base station may be further considered. In FIG. 1B, the first terminal has four beams 1b-81, 1b-83, 1b-85, and 1b-87, and performs beam sweeping to determine which beam has the best reception performance. In this case, if a plurality of beams cannot be used at the same time, the terminal may receive several overhead subframes as many as the number of reception beams while using one reception beam for each overhead subframe and then find the optimum transmission beam of the base station and the reception beam of the terminal.

Figure 1C:
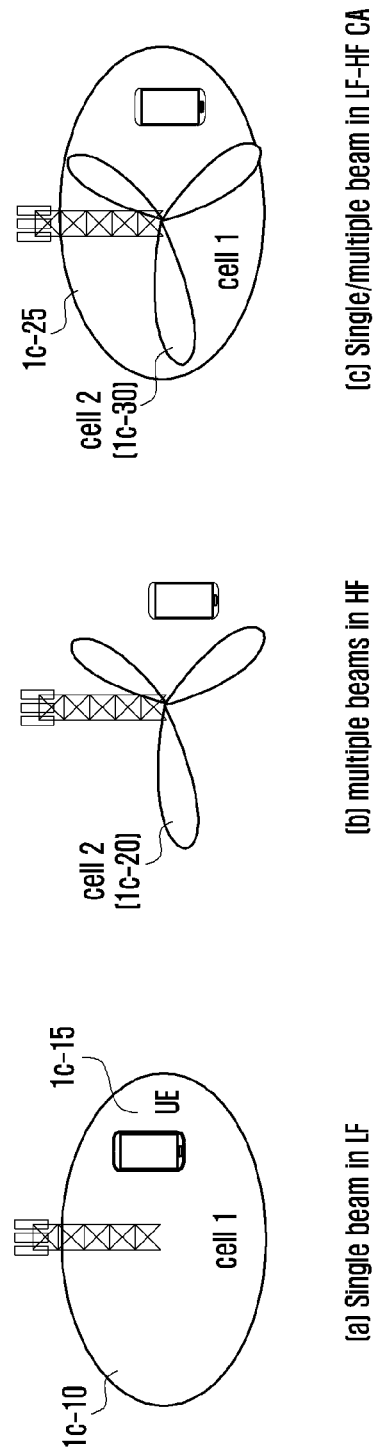
FIG. 1C is a diagram illustrating a carrier aggregation scenario between a cell using a low frequency band and a cell using a high frequency band, considered in the present disclosure.

FIG. 1C is a diagram illustrating a carrier aggregation scenario between a cell using a low frequency band and a cell using a high frequency band, considered in the present disclosure.

The next generation mobile communication system may apply both a low frequency band and a high frequency band. A cell 1c-10 having a low frequency smaller than 6 GHz typically form a service area by using an omnidirectional antenna or a sector antenna. On the other hand, a cell 1c-20 having a high frequency greater than 6 GHz is guaranteed a service area by applying a beam antenna for concentrating an antenna gain within a very narrow angle because of a large radio path loss rate. One terminal may use a carrier aggregation technique to increase the peak throughput of the terminal. In the carrier aggregation technique, the terminal may be concurrently connected to two or more cells to transmit and receive data. In addition, such cells 1c-25 and 1c-30 may be composed of a low frequency band and a high frequency band. The present disclosure considers a terminal configured with a carrier aggregation technique of at least one low frequency cell and at least one high frequency cell.

Figure 1D:
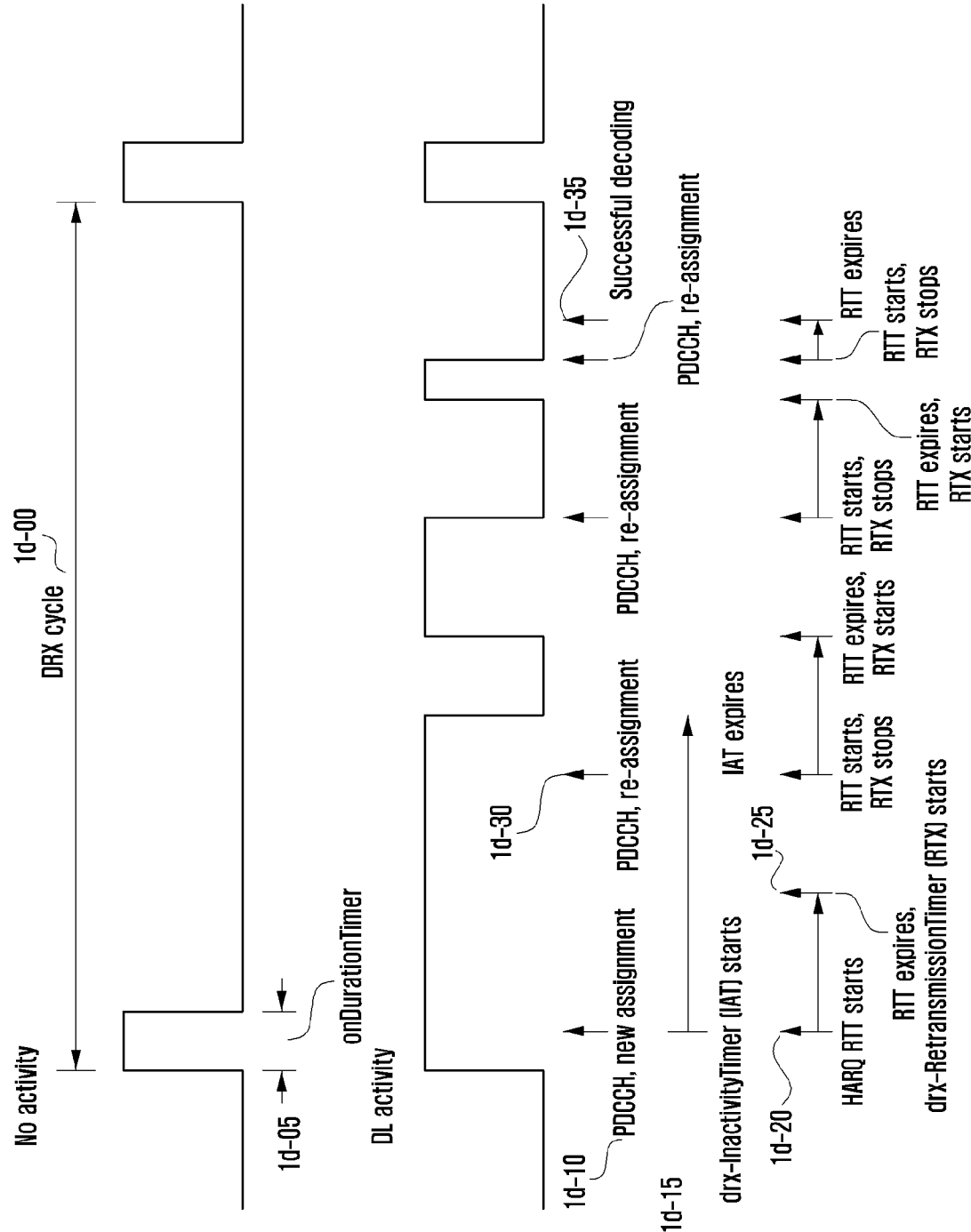
FIG. 1D is a diagram illustrating a DRX operation.

FIG. 1D is a diagram illustrating a DRX operation.

The DRX is a technique that is applied to minimize the power consumption of a terminal and performs monitoring for acquiring scheduling information in a predetermined PDCCH. The DRX is operable in both an idle mode and a connected mode, whereas operating methods thereof are somewhat different. The present disclosure relates to the connected mode. Continuously monitoring the PDCCH at the terminal to acquire the scheduling information will cause large power consumption. The basic DRX operation is to monitor the PDCCH during on-duration 1d-05 with a DRX cycle 1d-00.

In the connected mode, the DRX cycle has two values, long DRX and short DRX. In general, a long DRX cycle is applied, and if necessary, a base station may trigger a short DRX cycle by using a MAC control element (MAC CE). After a certain time, the terminal changes from the short DRX cycle to the long DRX cycle. Initial scheduling information of a specific terminal is provided in the predetermined PDCCH. Therefore, the terminal can minimize power consumption by periodically monitoring the PDCCH.

If scheduling information 1d-10 for a new packet is received via the PDCCH during the on-duration 1d-05, the terminal starts a DRX inactivity timer 1d-15. The terminal remains active while the DRX inactivity timer is running. That is, the terminal continuously performs PDCCH monitoring. Also, the terminal starts an HARQ RTT timer 1d-20. The HARQ RTT timer is applied to prevent the terminal from unnecessarily monitoring the PDCCH during an HARQ round trip time (HARQ RTT), and the terminal does not need to perform the PDCCH monitoring while the above timer is running. However, while the DRX inactivity timer and the HARQ RTT timer are running simultaneously, the terminal continues to monitor the PDCCH, based on the DRX inactivity timer.

When the HARQ RTT timer expires, a DRX retransmission timer 1d-25 starts. While the DRX retransmission timer is running, the terminal should perform the PDCCH monitoring. Normally, while the DRX retransmission timer is running, scheduling information 1d-30 for HARQ retransmission is received. Upon receiving this scheduling information, the terminal immediately stops the DRX retransmission timer and starts the HARQ RTT timer again. The above operation continues until the packet 1d-35 is successfully received.

Configuration information related to the DRX operation in the connected mode is delivered to the terminal through an RRCConnectionReconfiguration message. The on-duration timer, the DRX inactivity timer, and the DRX retransmission timer are defined by means of the number of PDCCH subframes. If a configured number of subframes defined as the PDCCH subframes pass after a certain timer starts, the timer expires. In FDD, all downlink subframes belong to the PDCCH subframe. In TDD, a downlink subframe and a special subframe correspond to this. In TDD, a downlink subframe, an uplink subframe, and a special subframe exist in the same frequency band. Among them, the downlink subframe and the special subframe are regarded as the PDCCH subframe.

The base station may configure two states, long DRX and short DRX. Normally, the base station may use one of the above two states in consideration of power preference indication information and terminal mobility record information, reported from the terminal, and characteristics of a data radio bearer (DRB). The transition between two states is performed when a specific timer expires or when a specific MAC CE is transmitted to the terminal.

In the existing LTE technology, only two DRX cycles are configurable, so that the DRX cycle may not be dynamically changed depending on various DRB characteristics, traffic patterns, buffer states, and the like.

The present disclosure proposes a DRX operation capable of dynamically changing the DRX cycle or the drx-InactivityTimer depending on various DRB characteristics, traffic patterns, buffer states, and the like. In particular, the proposed DRX operation is characterized by configuring a default DRX cycle or a default drx-InactivityTimer and dynamically changing the DRX cycle by using a MAC CE. In another embodiment, the present disclosure proposes a method for stopping a configured DRX operation and maintaining an active time when a terminal reports a beam measurement, especially reports a new optimum beam.

Figure 1E:
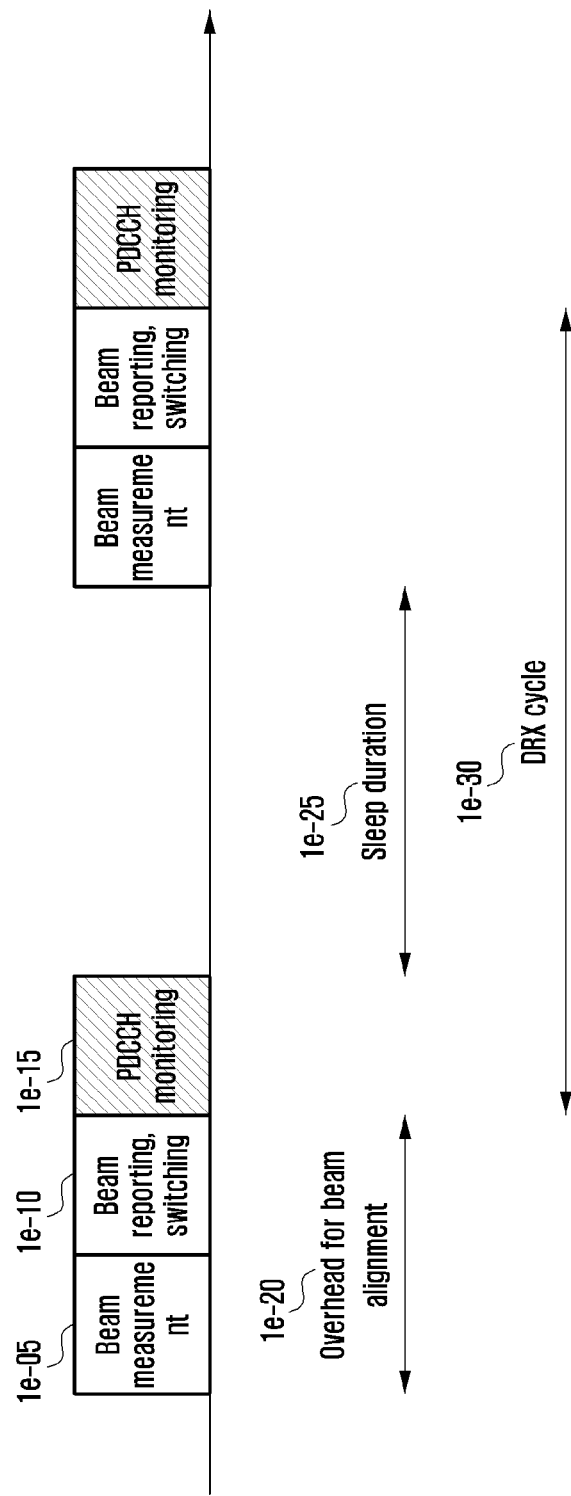
FIG. 1E is a diagram illustrating a process of performing beam alignment before PDCCH monitoring.

FIG. 1E is a diagram illustrating a process of performing beam alignment before PDCCH monitoring.

At a high frequency of 6 GHz or more, a mobile communication system based on a beam antenna is suitable. However, such a beam antenna based operation needs additional procedures. One of them is a beam alignment operation. Normally, in a low frequency band, a base station uses an omnidirectional antenna or a sector antenna, and a terminal uses an omnidirectional antenna. Therefore, it is not necessary to perform antenna alignment in advance so as to transmit and receive data. However, when at least one of the base station and the terminal applies a beam antenna, a beam alignment operation is used to determine a beam antenna to be used for data transmission and reception. For example, when the terminal performs a DRX operation, namely, periodic PDCCH monitoring 1e-15 in the beam antenna based mobile communication system, a beam alignment operation 1e-20 is used in advance.

Typically, the beam alignment operation includes a beam measurement procedure 1e-05 and a measurement result reporting and beam switching procedure 1e-10. Since the beam alignment operation is not required in a system which is not based on a beam antenna, the beam alignment operation may be regarded as a sort of overhead imposed when the beam antenna based system is applied. Accordingly, the present disclosure proposes a method for minimizing the overhead for the terminal in which a carrier aggregation technique composed of at least one low frequency cell and at least one high frequency cell is configured.

Figure 1F:
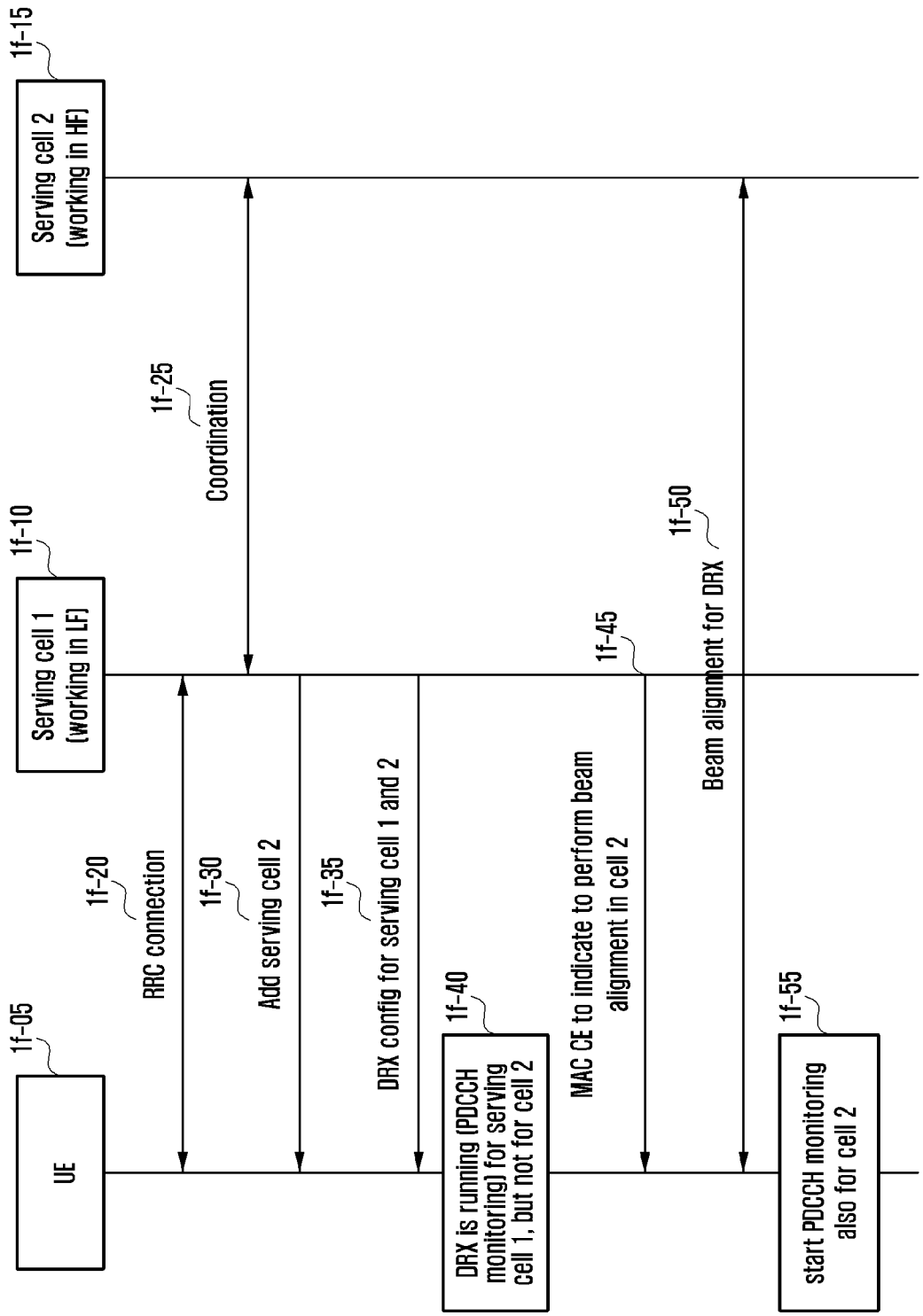
FIG. 1F is a diagram illustrating a process of performing a DRX operation of a cell performing a beam-based operation according to the first embodiment of the present disclosure.

FIG. 1F is a diagram illustrating a process of performing a DRX operation of a cell performing a beam-based operation according to the first embodiment of the present disclosure.

At step 1$f$-20, a terminal (i.e., UE) 1$f$-05 establishes an RRC connection with a first cell (i.e., a serving cell 1) 1$f$-10. The first cell uses a low frequency band and does not need beam alignment because of using an omnidirectional antenna or a sector antenna. A carrier aggregation technique is configured for the terminal so as to improve peak throughput. For this, the first cell exchanges configuration information with a second cell (i.e., a serving cell 2) 1$f$-15 at step 1$f$-25, and adds the second cell as a serving cell of the terminal at step 1$f$-30. Since the second cell uses a high frequency band, a beam antenna is used.

In addition, the first cell transmits DRX configuration information for the first and second cells to the terminal at step 1$f$-35. Then the terminal triggers a DRX operation at step 1$f$-40. According to an embodiment of the present disclosure, the terminal triggers only the DRX operation for the first cell, and the DRX operation for the second cell is triggered when a specific condition is satisfied. The specific condition is when beam alignment is triggered. The beam alignment may be triggered by receiving a message indicating the beam alignment for the second cell from the first cell. An indication for the beam alignment may be explicitly provided to the terminal by using a specific MAC CE at step 1$f$-45, or implicitly provided when a DL assignment for the first or second cell is received from the first cell. The beam alignment operation may be started when the second cell is configured or activated, or may be automatically started before data transmission and reception. In a state 1$f$-50 where the beam alignment operation is performed, the terminal triggers the DRX operation for the second cell at step 1$f$-55. The beam alignment operation is stopped when a specific message is received from a particular cell or when the second cell is deactivated or reconfigured.

Figure 1G:
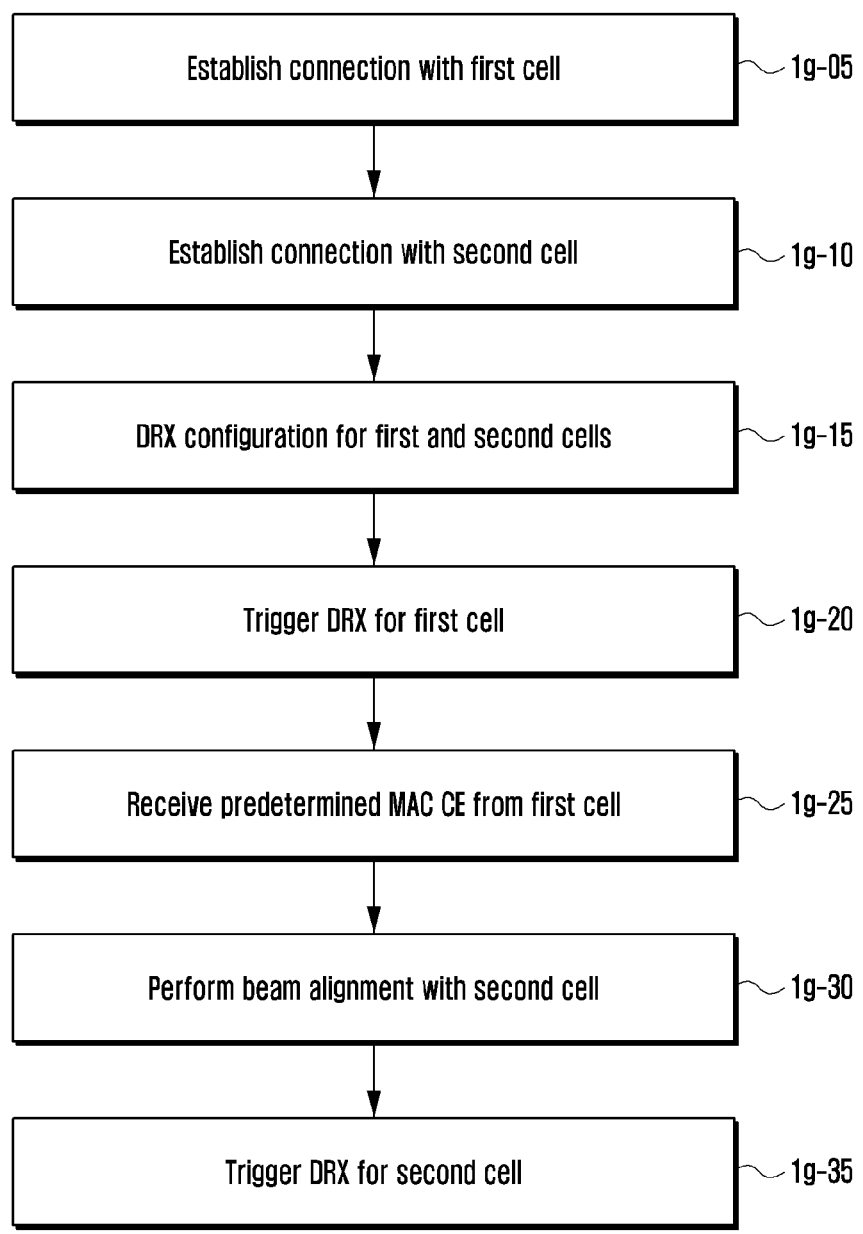
FIG. 1G is a flow diagram illustrating an operation of a terminal performing DRX according to the first embodiment of the present disclosure.

FIG. 1G is a flow diagram illustrating an operation of a terminal performing DRX according to the first embodiment of the present disclosure.

At step 1$g$-05, the terminal establishes a connection with the first cell. At step 1$g$-10, the terminal establishes a connection with the second cell. At step 1$g$-15, the terminal receives DRX configuration information of the first and second cells from the first cell. The DRX configuration information of the first cell and the DRX configuration information of the second cell may be provided to the terminal at the same time or at different times. At step 1$g$-20, the terminal triggers a DRX operation for the first cell. At step 1$g$-25, the terminal receives a predetermined MAC CE. At step 1$g$-30, the terminal performs beam alignment with the second cell. At step 1$g$-35, the terminal triggers a DRX operation for the second cell.

Figure 1H:
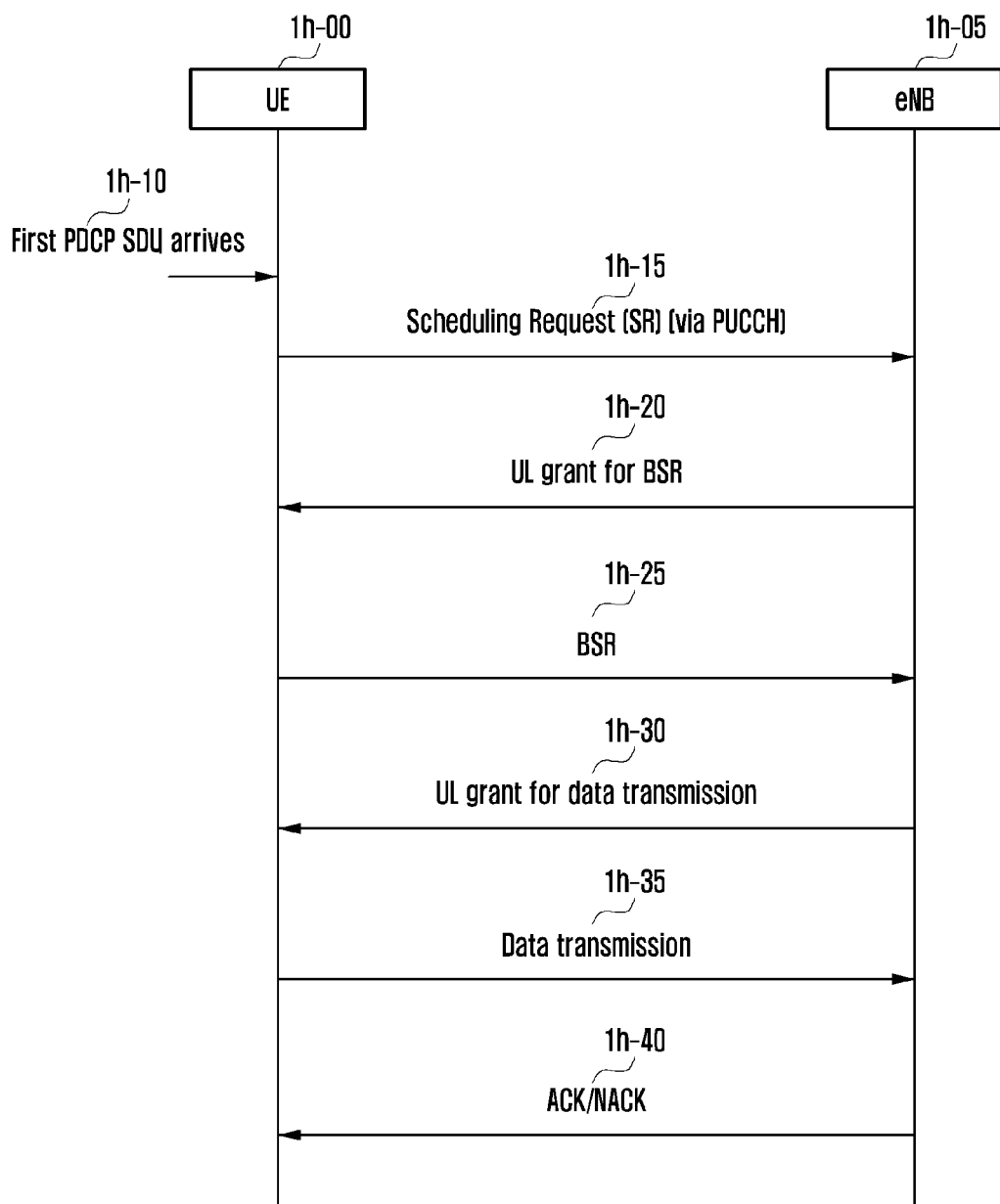
FIG. 1H is a diagram illustrating a process in which a terminal transmits a scheduling request and is allocated a radio resource from a base station in the existing LTE system.

FIG. 1H is a diagram illustrating a process in which a terminal transmits a scheduling request (SR) and is allocated a radio resource from a base station.

At step 1$h$-10, the terminal (i.e., UE) 1$h$-00 receives a PDCP SDU to be transmitted. At step 1$h$-15, the terminal determines whether there is a radio resource to transmit the data. If there is no radio resource, the terminal determines whether a usable PUCCH is allocated. If the PUCCH exists, the terminal transmits the SR to a base station (i.e., eNB) 1$h$-05 by using the PUCCH. At step 1$h$-20, the base station that successfully receives the SR schedules a radio resource for transmitting a buffer status report (BSR) to the terminal. The BSR is used to inform the base station how much transmission data the terminal has. At steps 1$h$-25, the terminal transmits the BSR by using the allocated radio resource. At steps 1$h$-30, the base station allocates a radio resource for transmitting the PDCP SDU. At step 1$h$-step 35, the terminal transmits the data to the base station. At steps 1$h$-40, the base station transmits ACK/NACK information for the data.

Figure 1I:
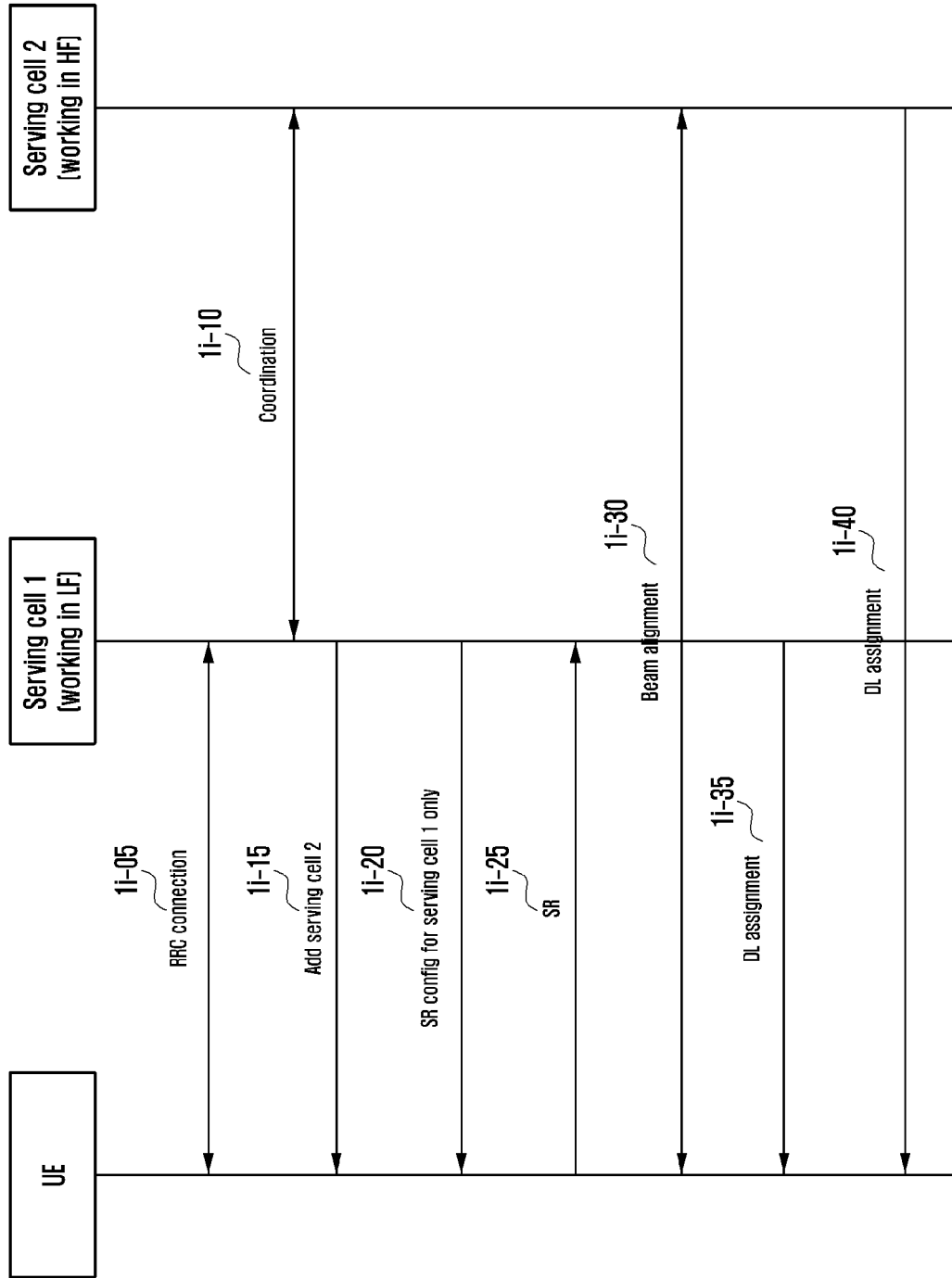
FIG. 1I is a diagram illustrating a process of performing a scheduling request operation of a cell performing a beam-based operation according to the first embodiment of the present disclosure.

FIG. 1I is a diagram illustrating a process of performing a scheduling request operation of a cell performing a beam-based operation according to the first embodiment of the present disclosure.

At step 1$i$-05, a terminal (i.e., UE) establishes an RRC connection with a first cell (i.e., a serving cell 1). The first cell uses a low frequency band and does not need beam alignment because of using an omnidirectional antenna or a sector antenna. A carrier aggregation technique is configured for the terminal so as to improve peak throughput. For this, the first cell exchanges configuration information with a second cell (i.e., a serving cell 2) at step 1$i$-10, and adds the second cell as a serving cell of the terminal at step 1$i$-15. Since the second cell uses a high frequency band, a beam antenna is used.

In addition, the first cell transmits SR configuration information for the first cell to the terminal at step 1$i$-20. If the SR transmission condition is satisfied, the terminal transmits an SR to the first cell at step 1$i$-25. After transmitting the SR, the terminal starts a beam alignment operation at step 1$i$-30. In response to the SR, the first cell or the second cell provides a DL assignment to the terminal at step 1$i$-35 or 1$i$-40.

Figure 1J:
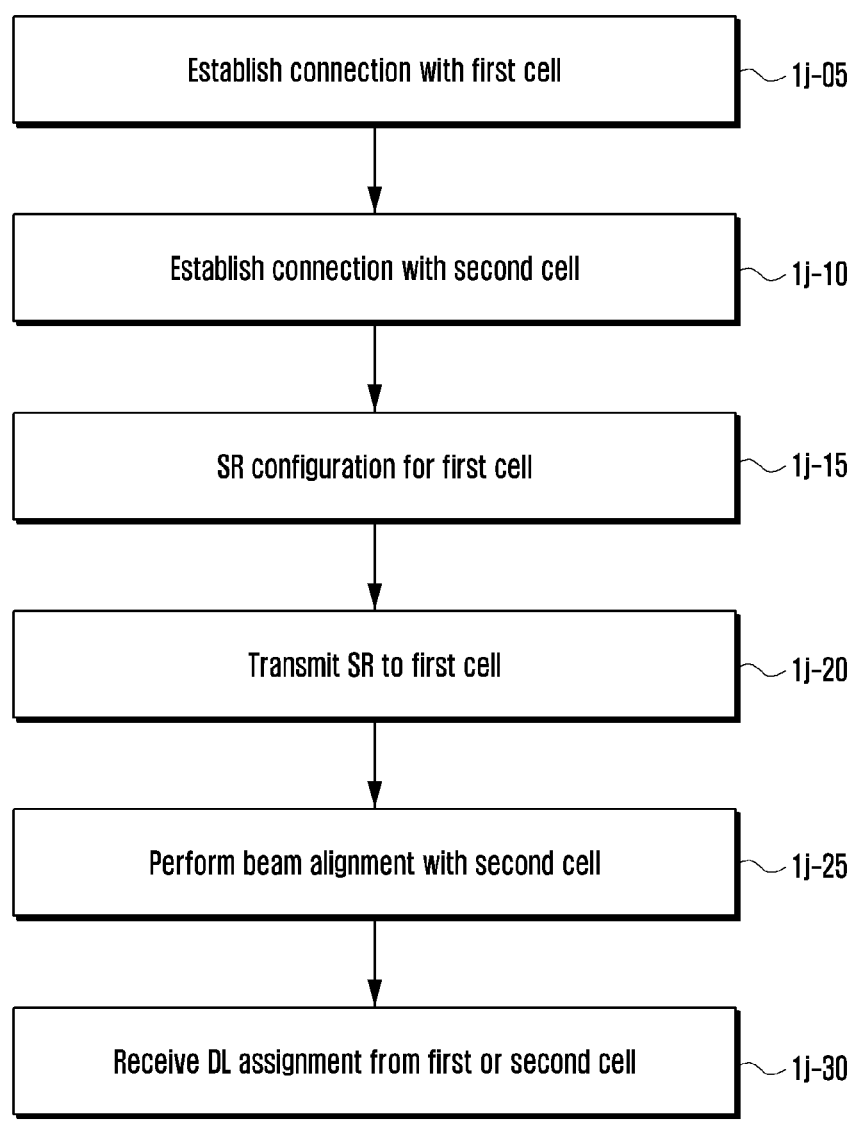
FIG. 1J is a flow diagram illustrating an operation of a terminal performing an SR according to the first embodiment of the present disclosure.

FIG. 1J is a flow diagram illustrating an operation of a terminal performing an SR according to the first embodiment of the present disclosure.

At step 1*j*-05, the terminal establishes a connection with the first cell. At step 1*j*-10, the terminal establishes a connection with the second cell. At step 1*j*-15, the terminal receives SR configuration information for the first cell from the first cell. At step 1*j*-20, the terminal transmits an SR to the first cell. At step 1*j*-25, the terminal performs beam alignment with the second cell after the SR transmission, and monitors PDCCH to find whether a DL assignment is received from the first cell or the second cell. At step 1*j*-30, the terminal receives the DL assignment from the first cell or the second cell.

Figure 1K:
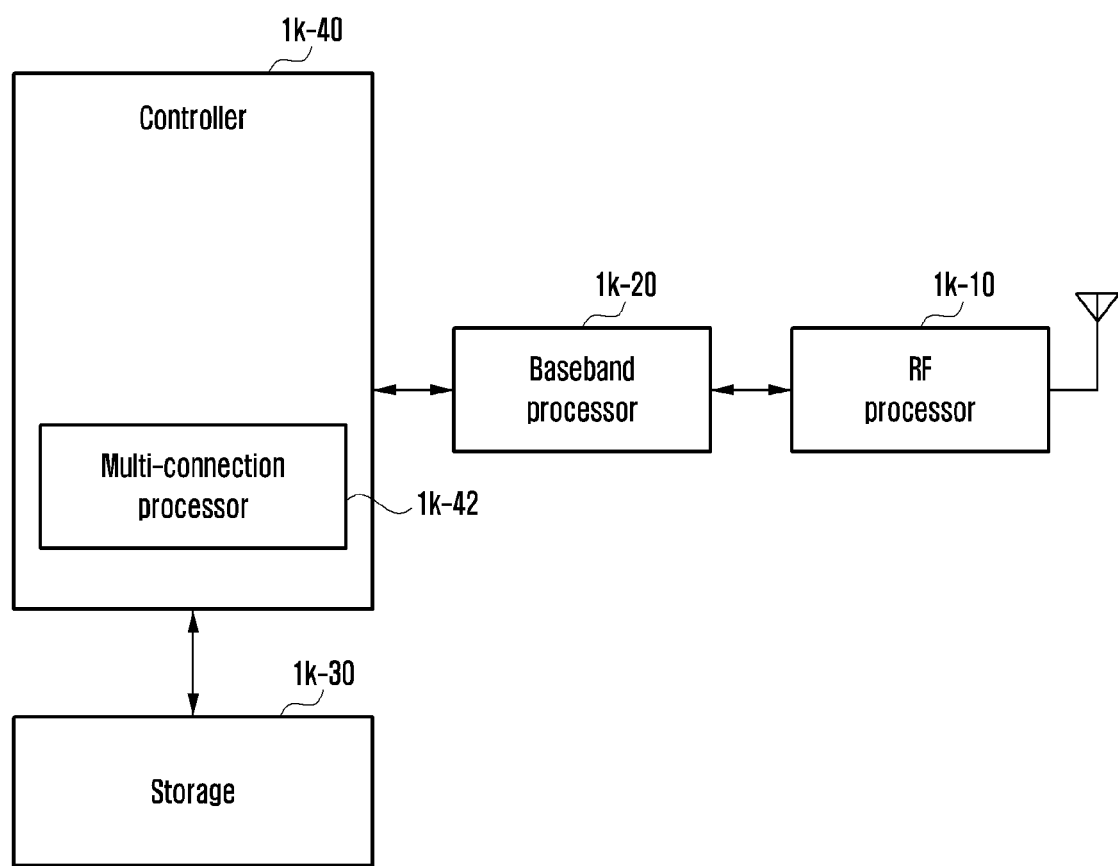
FIG. 1K is a block diagram illustrating an internal structure of a terminal according to the first embodiment of the present disclosure.

FIG. 1K is a block diagram illustrating an internal structure of a terminal according to the first embodiment of the present disclosure.

As shown in FIG. 1K, the terminal includes a radio frequency (RF) processor 1*k*-10, a baseband processor 1*k*-20, a storage 1*k*-30, and a controller 1*k*-40.

The RF processor 1*k*-10 performs a function, such as band conversion and amplification of a signal, for transmitting and receiving the signal through a radio channel. That is, the RF processor 1*k*-10 up-converts a baseband signal provided from the baseband processor 1*k*-20 into an RF band signal to transmit the RF band signal through an antenna, and also down-converts an RF band signal received through the antenna into a baseband signal. For example, the RF processor 1*k*-10 may include a transmitter filter, a receiver filter, an amplifier, a mixer, an oscillator, a digital to analog converter (DAC), an analog to digital converter (ADC), and the like. Although FIG. 1K shows only one antenna, the terminal may have a plurality of antennas. In addition, the RF processor 1*k*-10 may include a plurality of RF chains. Further, the RF processor 1*k*-10 may perform beamforming. For the beamforming, the RF processor 1*k*-10 may adjust the phase and size of each signal transmitted and received through a plurality of antennas or antenna elements. Also, the RF processor 1*k*-10 may perform MIMO and receive several layers in the MIMO operation.

The baseband processor 1*k*-20 performs a conversion function between a baseband signal and a bit stream in accordance with a physical layer standard of the system. For example, in data transmission, the baseband processor 1*k*-20 creates complex symbols by encoding and modulating transmission bit streams. Also, in data reception, the baseband processor 1*k*-20 restores reception bit streams by demodulating and decoding a baseband signal provided from the RF processor 1*k*-10. In case of complying with orthogonal frequency division multiplexing (OFDM) scheme, in data transmission, the baseband processor 1*k*-20 generates complex symbols by encoding and modulating transmission bit streams, maps the complex symbols to subcarriers, and constructs OFDM symbols through an inverse fast Fourier transform (IFFT) operation and a cyclic prefix (CP) insertion. In addition, in data reception, the baseband processor 1*k*-20 divides a baseband signal provided from the RF processor 1*k*-10 into OFDM symbol units, restores signals mapped to subcarriers through a fast Fourier transform (FFT) operation, and restores reception bit streams through demodulation and decoding.

As described above, the baseband processor 1*k*-20 and the RF processor 1*k*-10 transmit and receive signals. Accordingly, the baseband processor 1*k*-20 and the RF processor 1*k*-10 may be referred to as a transmitting unit, a receiving unit, a transceiver, or a communication unit. In addition, at least one of the baseband processor 1*k*-20 and the RF processor 1*k*-10 may include a plurality of communication modules to support a plurality of different radio access technologies. Also, at least one of the baseband processor 1*k*-20 and the RF processor 1*k*-10 may include different communication modules for processing signals of different frequency bands. For example, the different radio access technologies may include a wireless LAN (e.g., IEEE 802.11), a cellular network (e.g., LTE), and the like. In addition, the different frequency bands may include a super high frequency (SHF) band (e.g., 2.5 GHz, 5 GHz), and a millimeter wave (e.g., 60 GHz) band.

The storage 1*k*-30 stores a basic program for the operation of the terminal, an application program, and data such as configuration information. In particular, the storage 1*k*-30 may store information associated with an access node that performs wireless communication by using a radio access technology. Also, the storage 1*k*-30 provides the stored data in response to a request of the controller 1*k*-40.

The controller 1*k*-40 controls overall operations of the terminal. For example, the controller 1*k*-40 transmits and receives a signal through the baseband processor 1*k*-20 and the RF processor 1*k*-10. Also, the controller 1*k*-40 writes and reads data to and from the storage 1*k*-30. For this, the controller 1*k*-40 may include at least one processor. For example, the controller 1*k*-40 may include a communication processor (CP) for controlling communication and an application processor (AP) for controlling an upper layer such as an application program.

Figure 1L:
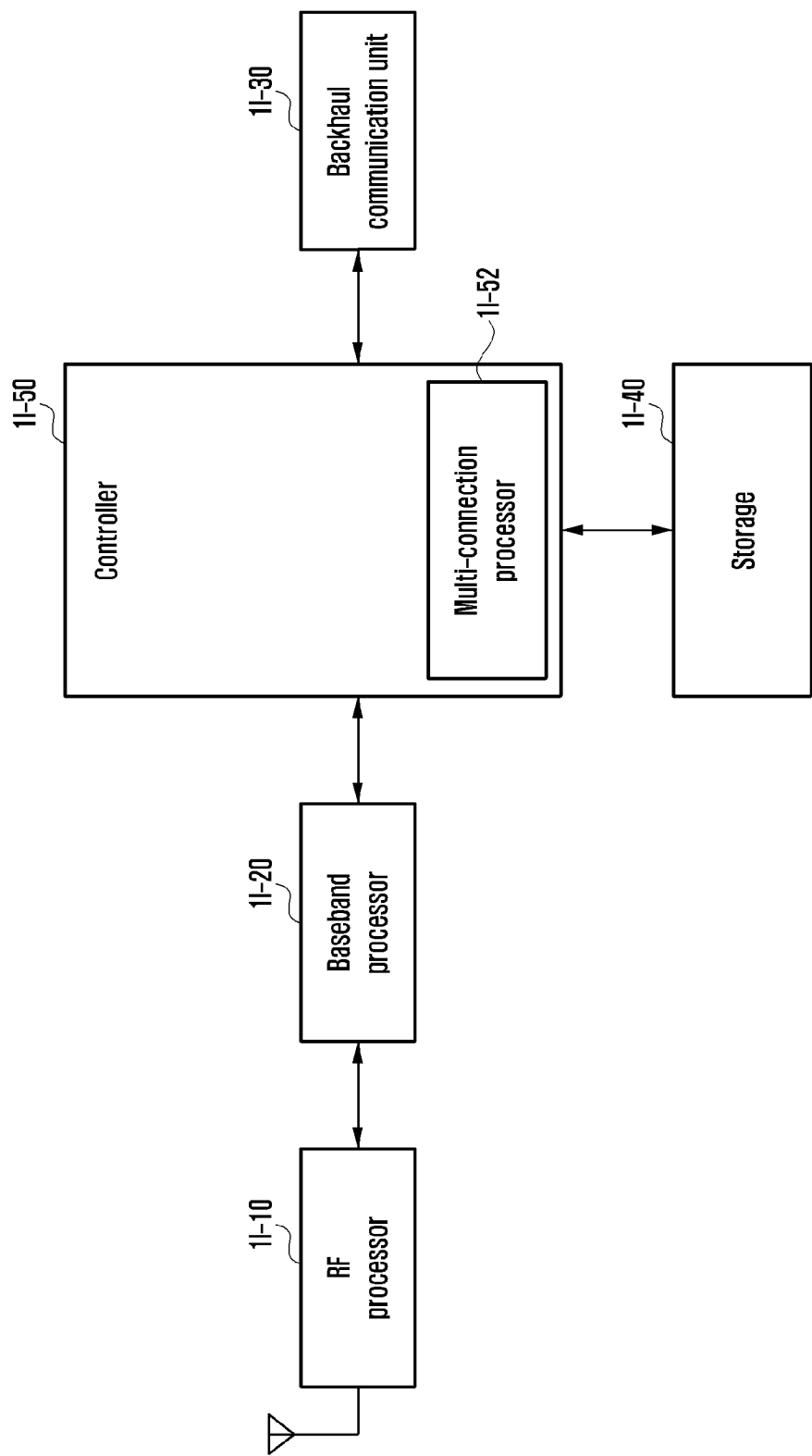
FIG. 1L is a block diagram illustrating a configuration of a base station according to the first embodiment of the present disclosure.

FIG. 1L is a block diagram illustrating a configuration of a base station according to the first embodiment of the present disclosure.

As shown in FIG. 1L, the base station includes an RF processor 1*l*-10, a baseband processor 1*l*-20, a backhaul communication unit 1*l*-30, a storage 1*l*-40, and a controller 1*l*-50.

The RF processor 1*l*-10 performs a function, such as band conversion and amplification of a signal, for transmitting and receiving the signal through a radio channel. That is, the RF processor 1*l*-10 up-converts a baseband signal provided from the baseband processor 1*l*-20 into an RF band signal to transmit the RF band signal through an antenna, and also down-converts an RF band signal received through the antenna into a baseband signal. For example, the RF processor 1*l*-10 may include a transmitter filter, a receiver filter, an amplifier, a mixer, an oscillator, a DAC, an ADC, and the like. Although FIG. 1L shows only one antenna, the base station may have a plurality of antennas. In addition, the RF processor 1*l*-10 may include a plurality of RF chains. Further, the RF processor 1*l*-10 may perform beamforming. For the beamforming, the RF processor 1*l*-10 may adjust the phase and size of each signal transmitted and received through a plurality of antennas or antenna elements. Also, the RF processor 1*l*-10 may perform MIMO and receive several layers in the MIMO operation.

The baseband processor 1*l*-20 performs a conversion function between a baseband signal and a bit stream in accordance with a physical layer standard of the radio access technology. For example, in data transmission, the baseband processor 1*l*-20 creates complex symbols by encoding and modulating transmission bit streams. Also, in data reception, the baseband processor 1*l*-20 restores reception bit streams by demodulating and decoding a baseband signal provided from the RF processor 1*l*-10. In case of complying with OFDM scheme, in data transmission, the baseband processor 1*l*-20 generates complex symbols by encoding and modulating transmission bit streams, maps the complex symbols to subcarriers, and constructs OFDM symbols through an IFFT operation and a CP insertion. In addition, in data reception, the baseband processor 1*l*-20 divides a baseband signal provided from the RF processor 1*l*-10 into OFDM symbol units, restores signals mapped to subcarriers through an FFT operation, and restores reception bit streams through demodulation and decoding. The baseband processor 1*l*-20 and the RF processor 1*l*-10 transmit and receive signals as described above. Thus, the baseband processor 1*l*-20 and the RF processor 1*l*-10 may be referred to as a transmitting unit, a receiving unit, a transceiver, a communication unit, or a wireless communication unit.

The backhaul communication unit 1*l*-30 provides an interface for performing communication with other nodes in a network. That is, the backhaul communication unit 1*l*-30 converts a bit stream transmitted from the base station to another node, e.g., a sub base station, a core network, etc., into a physical signal, and also converts a physical signal received from another node into a bit stream.

The storage 1*l*-40 stores a basic program for the operation of the base station, an application program, and data such as setting information. In particular, the storage 1*l*-40 may store information on a bearer allocated to the connected terminal, a measurement result reported from the connected terminal, and the like. In addition, the storage 1*l*-40 may store information for determining whether to provide or suspend multiple connections to or from the terminal. Also, the storage 1*l*-40 provides the stored data in response to a request of the controller 1*l*-50.

The controller 1*l*-50 controls overall operations of the base station. For example, the controller 1*l*-50 transmits and receives a signal through the baseband processor 1*l*-20 and the RF processor 1*l*-10 or through the backhaul communication unit 1*l*-30. Also, the controller 1*l*-50 writes and reads data to and from the storage 1*l*-40. For this, the controller 1*l*-50 may include at least one processor.

In summary, according to the first embodiment of the present disclosure, the beam alignment should be performed in a high frequency (HF) before the active time starts. On the other hand, in a low frequency (LF), there is no need to perform the beam alignment.

According to the first embodiment of the present disclosure, it is possible to indicate during the configuration operation whether to perform the beam alignment.

In LF-HF carrier aggregation (CA) situation where DRX is applied only to LF while HF is still off, if scheduling starts in LF, the active time may be started even in HF after beam alignment. The terminal may selectively trigger the inactivity timer or the like depending on whether beam alignment is performed in HF. Then, when the scheduling is started in LF, the terminal may report whether the beam alignment is performed in HF.

Also, according to the first embodiment of the present disclosure, even though the SR for LF is configured in the terminal, it may be necessary to perform a random access in HF for beam recovery.

Table 1 below shows the configuration and operation of the terminal (UE) and the base station (gNB) according to the first embodiment of the present disclosure.

TABLE 1

| | |
|---|---|
| UE ↔ gNB | To establish RRC connection in NR |
| UE ← gNB | To configure at least one SCell |
| UE ← gNB | To configure DRX (inactivity timer, onDurationTimer, etc.) |
| | To specify each serving cell to which a DRX-related second operation will be applied |
| | Hereinafter, it is assumed that the second operation is not instructed for the first cell and is instructed for the second cell. |
| UE | To perform a DRX operation |
| | To apply the second DRX operation to a serving cell for which the second operation is instructed |
| | To apply the first DRX operation to a serving cell for which the second operation is not instructed |
| | First operation: To monitor PDCCH when onDurationTimer/inactivityTimer is triggered |
| | Second operation: In the first situation, to monitor PDCCH when onDurationTimer/inactivityTimer is triggered. In the second situation, not to monitor PDCCH even if onDurationTimer/inactivityTimer is triggered |
| | In the first situation, after the beam alignment process, the base station recognizes the optimal beam to be transmitted to the terminal, and the terminal recognizes the optimal beam to be received from the base station. |
| | In the second situation, no beam alignment is performed. |
| UE ← gNB | To receive a DL assignment through the first cell |
| | If a MAC CE instructing the second cell to perform beam alignment is included, to start a random access procedure in the second cell |
| | Also, to start PDCCH monitoring in the second cell |

Second Embodiment

Figure 2A:
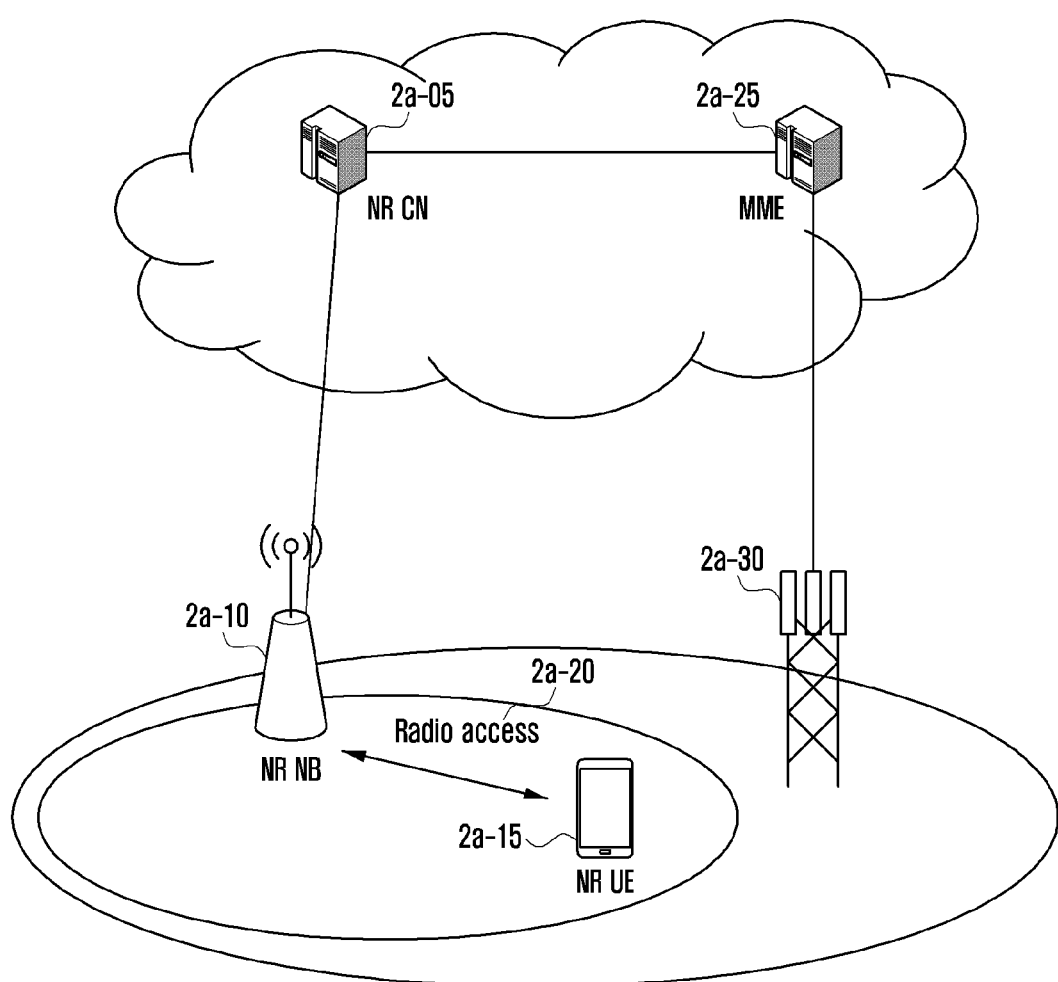
FIG. 2A is a diagram illustrating a structure of a next generation mobile communication system.

FIG. 2A is a diagram illustrating a structure of a next generation mobile communication system.

As shown in FIG. 2A, a radio access network of the next generation mobile communication system includes a next generation base station (also referred to as a new radio node B (NR NB) or simply a base station) 2*a*-10 and a new radio core network (NR CN) 2*a*-05. A user terminal (also referred to as new radio user equipment (NR UE) or simply a terminal) 2*a*-15 accesses an external network through the NR NB 2*a*-10 and the NR CN 2*a*-05.

In FIG. 2A, the NR NB 2*a*-10 corresponds to evolved node B (eNB) of the existing LTE system. The NR NB 2*a*-10 is connected to the NR UE 2*a*-15 through a radio channel 2*a*-20 and can provide a better service than the existing node B. In the next generation mobile communication system, since all user traffic is provided through a shared channel, a device for collecting various kinds of state information, such as buffer states, available transmission power states, and channel states of NR UEs, and then performing scheduling is used. This is performed by the NR NB 2*a*-10. Normally, one NR NB 2*a*-10 controls a plurality of cells. In order to realize high-speed data transfer compared to the existing LTE, more than the existing increased bandwidth may be applied, and also a beamforming technique may be used with orthogonal frequency division multiplexing (OFDM) as a radio access technology. In addition, an adaptive modulation and coding (AMC) scheme is used to determine a modulation scheme and a channel coding rate according to a channel state of the NR UE. The NR CN 2a-05 performs functions such as mobility support, bearer setup, and quality of service (QoS) setup. The NR CN 2a-05 is a device for performing various control functions as well as a mobility management function for the NR UE, and is connected to a plurality of NR NBs. Also, the next generation mobile communication system may be linked to the existing LTE system, and the NR CN 2a-05 is connected to an MME 2a-25 through a network interface. The MME 2a-25 is connected to eNB 2a-30 which is the existing base station.

Figure 2B:
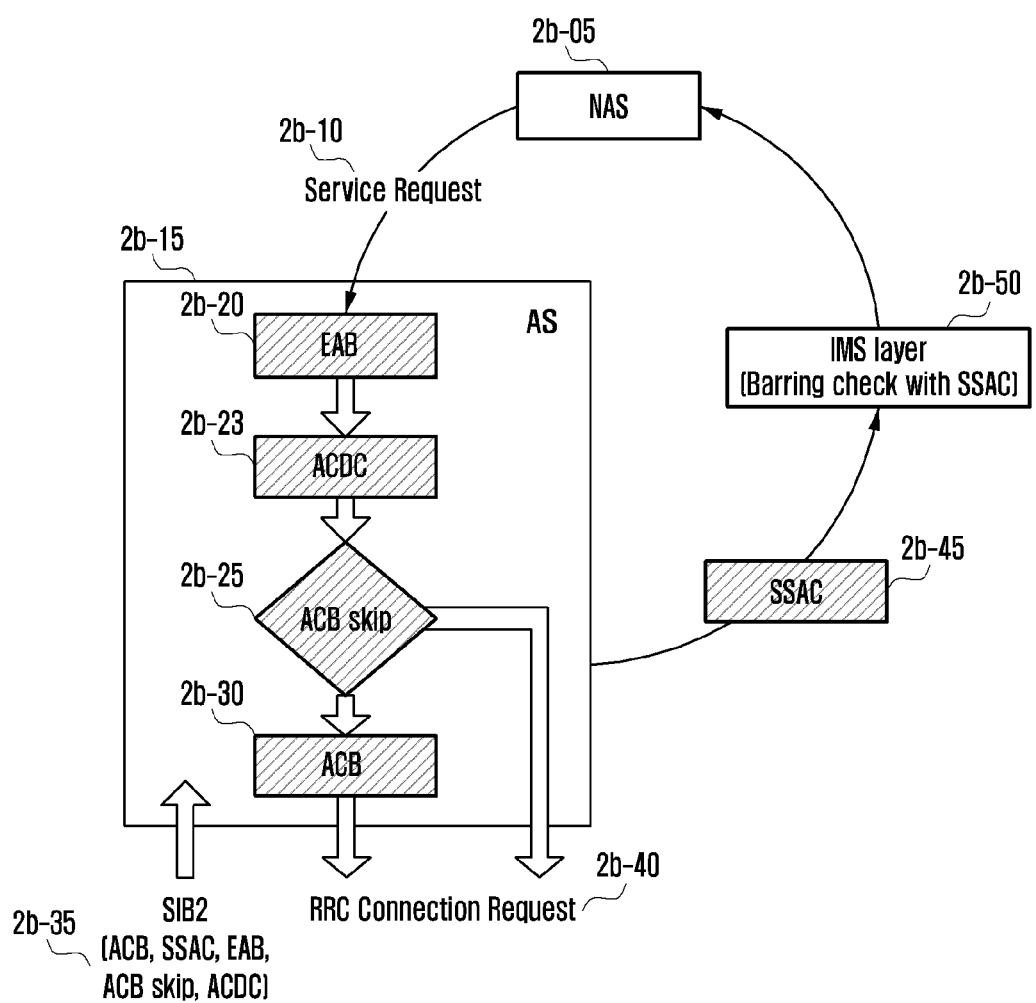
FIG. 2B is a diagram illustrating a method for determining whether to approve an access in the existing LTE system.

FIG. 2B is a diagram illustrating a method for determining whether to approve an access in the existing LTE system.

The LTE terminal is divided into an access stratum (AS) 2b-15 and a non access stratum (NAS) 2b-05, depending on functionality. The AS performs all functions related to access, and the NAS performs access-unrelated functions such as PLMN selection and service request. Accessibility is mainly performed in the AS of the terminal. As mentioned above, when the network is congested, the network may restrict a new access. Therefore, the network broadcasts related configuration information 2b-35 such that each terminal can determine accessibility.

As new requirements are added to the existing LTE system, a new barring mechanism is proposed accordingly. As a result, several access barring checks are preformed. When the terminal NAS delivers a service request 2b-10 to the terminal AS, the terminal AS checks in response to the request whether access to the network is actually possible. If an establishment cause value of the service request is a delay tolerant access, the terminal AS performs extended access barring (EAB) 2b-20 first. The EAB barring mechanism is an access check process applied to a machine type communication (MTC) device. After passing through the EAB, the terminal AS performs Application specific Congestion control for Data Communication (ACDC) 2b-23. An application that requests a service is given one piece of ACDC category information, and the ACDC category value may be contained in the service request and provided to the terminal AS. The network may provide barring configuration information for each ACDC category. That is, the access check process may be performed for each application group classified according to the ACDC category. If barring configuration information for the ACDC category is not provided from the network, the terminal AS skips the ACDC access check process. Upon passing ACDC, the terminal AS performs access class barring (ACB) 2b-30. The ACB performs the access check process using the barring configuration information provided separately according to mobile originating (MO) signaling or MO data. The MMTEL voice/video/SMS may omit the ACB performing process by using an ACB skip indicator 2b-25.

If it is determined that access is possible in all of the above-mentioned plurality of access checking processes, then the terminal AS may attempt to access the network. That is, the terminal AS performs a random access and transmits an RRC connection request message 2b-40 to the base station. There is an access check process not performed in the terminal AS. When receiving the barring configuration information for the MMTEL voice/video, e.g., service specific access control (SSAC) 2b-45, from the network, the terminal AS delivers it to an IMS layer 2b-50 in the terminal managing the service. Upon receiving the barring configuration information, the IMS layer performs an access check process when the service is triggered. When the SSAC was introduced, the terminal AS was designed to perform functions regardless of the type of application or service. Therefore, in order to control accessibility for a specific service such as the MMTEL voice/video, it was designed that the barring configuration information is directly transmitted to the layer managing the service and the access check process is performed in the layer.

Figure 2C:
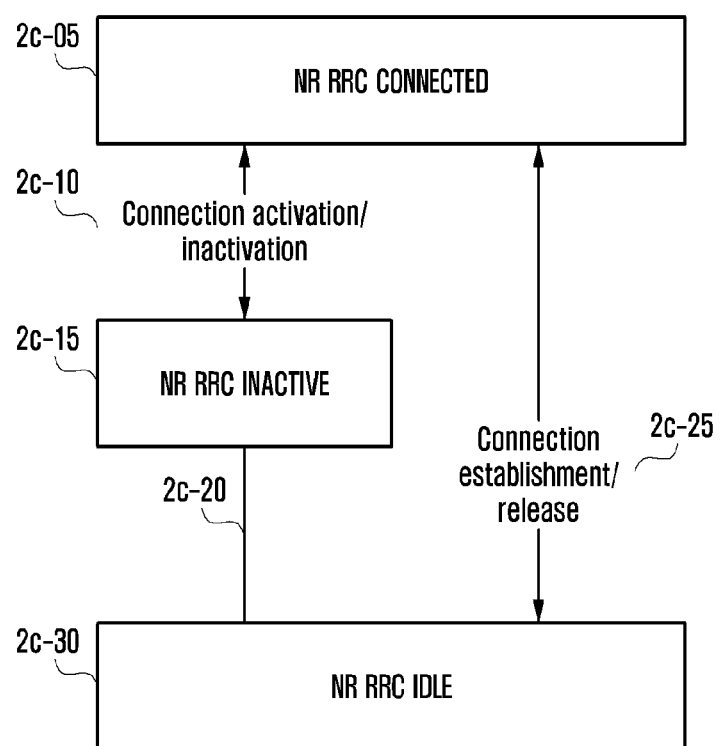
FIG. 2C is a diagram illustrating a radio access mode transition in a next generation mobile communication system.

FIG. 2C is a diagram illustrating a radio access state (or mode) transition in a next generation mobile communication system.

In the next generation mobile communication system, there are three radio access states (RRC states). A connected mode (RRC_CONNECTED, 2c-05) is a radio access state in which the UE can transmit and receive data. An idle mode (RRC_IDLE, 2c-30) is a radio access state in which the UE monitors whether paging is received. The above two modes are also applied to the existing LTE system, and details thereof are the same as those of the existing LTE system. In the next generation mobile communication system, an RRC_INACTIVE radio access state 2c-15 is newly defined. In the RRC_INACTIVE radio access state, the UE context is maintained in the gNB and the UE, and an RAN-based paging is supported. The features of the new radio access state are as follows:

Cell re-selection mobility;
CN-NR RAN connection (both C/U-planes) has been established for UE;
The UE AS context is stored in at least one gNB and the UE;
Paging is initiated by NR RAN;
RAN-based notification area is managed by NR RAN;
NR RAN knows the RAN-based notification area which the UE belongs to.

The new INACTIVE radio access state can transition to the connected mode or the idle mode through a specific procedure. As indicated by reference numeral 2c-10, a connection activation procedure is used for transition from the INACTIVE mode to the connected mode, and a connection inactivation procedure is used for transition from the connected mode to the INACTIVE mode. The connection activation/inactivation procedure is performed through at least one RRC message between the UE and the gNB, and formed of at least one step. In addition, the transition between the INACTIVE mode and the idle mode is possible through a specific procedure 2c-20. This specific procedure may consider various methods such as a specific message exchange method, a timer based method, or an event based method. The transition between the connected mode and the idle mode complies with the existing LTE technology. That is, this transition between modes is performed through a connection establishment or release procedure 2c-25.

Figure 2D:
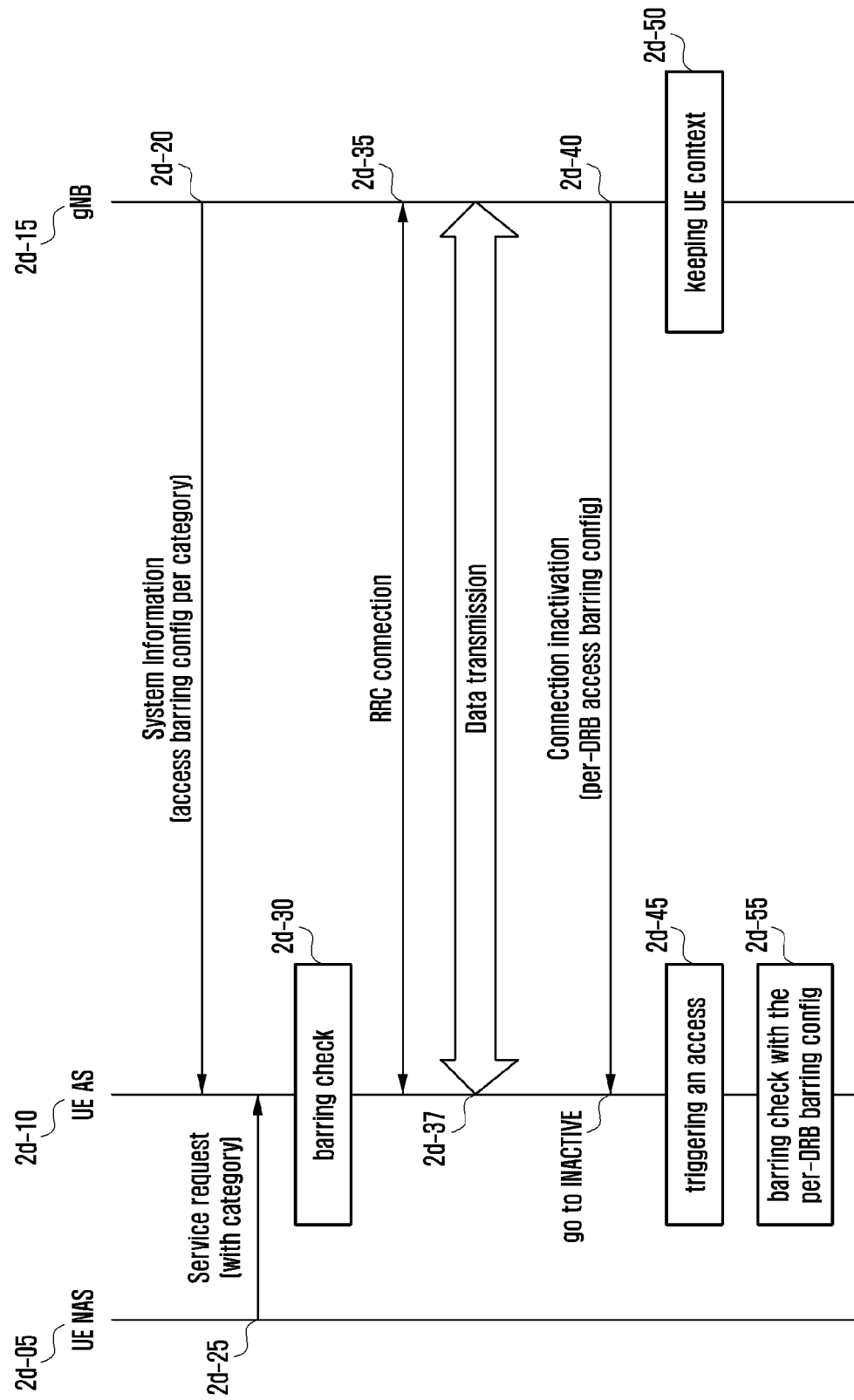
FIG. 2D is a diagram illustrating a process of performing an access in an RRC inactive mode according to the second embodiment of the present disclosure.

FIG. 2D is a diagram illustrating a process of performing an access in an RRC inactive mode according to the second embodiment of the present disclosure.

At step 2d-20, a UE AS 2d-10 receives barring configuration information to be applied in the idle mode from a gNB 2d-15 through system information. The barring configuration information is used for the UE to determine whether to trigger an access per category. One Category is determined to correspond to at least one of an access class, a UE/device type, a service type, a call type, an application type, and a signaling type, or one of combinations thereof. The gNB provides the barring configuration information per category to the UE, and the UE AS stores it. With respect to a specific service such as emergency, a voice call, a video call, or a text message service, the UE may have a default value even though the barring configuration information is not be provided in the system information. If the barring configuration information is provided for the specific service through the system information, it is applied with priority over the default value.

A UE NAS 2d-05 determines which of the above elements corresponds to an access being tried, and then maps an appropriate category to the access. In addition, at step 2d-25, the UE NAS transmits a service request for the access to the UE AS together with the mapped category. In case of emergency, the UE NAS may notify the UE AS that the service request is associated with emergency, in the form of a call without informing the UE AS of category information. In response to the service request, the UE AS checks the stored barring configuration information corresponding to the category received from the UE NAS. At step 2d-30, using the barring configuration information, the UE AS determines whether the access is barred. If not barred, the UE AS attempts an RRC connection with the gNB at step 2d-35. The gNB and the UE perform data transmission and reception at step 2d-37.

If necessary, the gNB may allow the UE to go to the RRC inactive mode. For this, the gNB enables the UE to transition from the connected mode to the inactive mode through a connection inactivation procedure at step 2d-40. At this time, the gNB provides barring configuration information based on a data radio bearer (DRB) to the UE. The DRB-based barring configuration information is used when the UE determines whether an access triggered in the inactive mode at step 2d-45 is barred at step 2d-55. In the inactive mode, UE context 2d-50 for the UE is still stored in the gNB and the UE. This is contrasted with deletion of UE context in case of transition from the connected mode to the idle mode. The UE context information includes all kinds of configuration information used by the UE for data transmission/reception in the connected mode. Therefore, it is possible to provide the barring configuration information based on the DRB in the inactive mode. For a specific service, the DRB-based barring configuration information may conflict with the barring configuration information provided through the system information. In this case, the DRB-based barring configuration information is applied. If an access to which the DRB-based barring configuration information is not applied is detected, the category-based barring information provided through the system information may be applied to determine whether the access is barred. For example, in case of RRC signaling generated in the inactive mode, barring configuration information for a category corresponding to the RRC signaling is used to determine whether an access is barred.

Figure 2E:
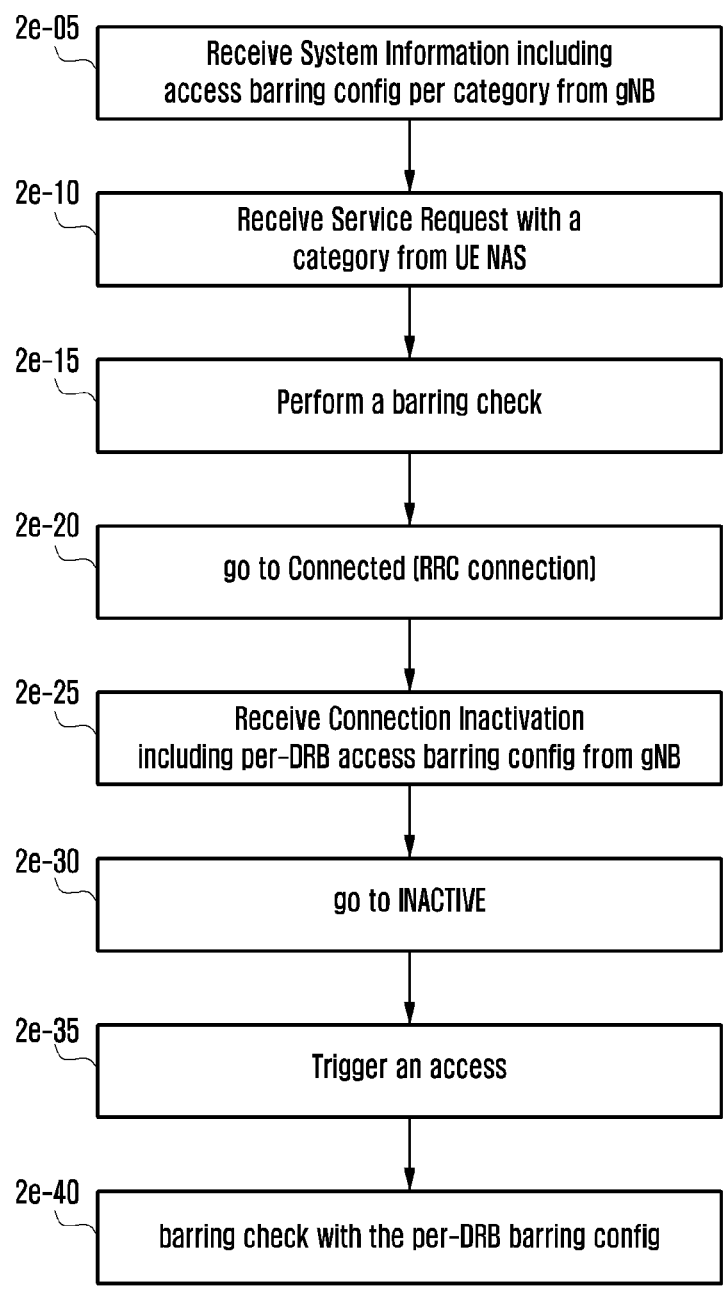
FIG. 2E is a diagram illustrating an operation of a terminal AS performing an access in an RRC inactive mode according to the second embodiment of the present disclosure.

FIG. 2E is a diagram illustrating an operation of a terminal AS performing an access in an RRC inactive mode according to the second embodiment of the present disclosure.

At step 2e-05, the terminal AS (i.e., the UE AS) receives barring configuration information per category from the base station (i.e., the gNB) via broadcasting or dedicated signaling. At step 2e-10, the UE AS receives a service request together with category information from the UE NAS. At step 2e-15, using the barring configuration information corresponding to the category, the UE AS determines whether an access to the service request is barred. At step 2e-20, if the access is not barred, the UE performs an establishment procedure with the gNB. Through this, the UE transitions to the RRC connected mode. At step 2e-25, the UE AS receives from the gNB a message associated with a connection inactivation procedure for transition to the inactive mode. This message includes DRB-based barring configuration information. At step 2e-30, the UE AS transitions from the connected mode to the inactive mode. At step 2e-35, an access associated with one of DRBs configured in the UE AS may be triggered. At step 2e-40, using the DRB-based barring configuration information, the UE AS determines whether the access is barred.

Figure 2F:
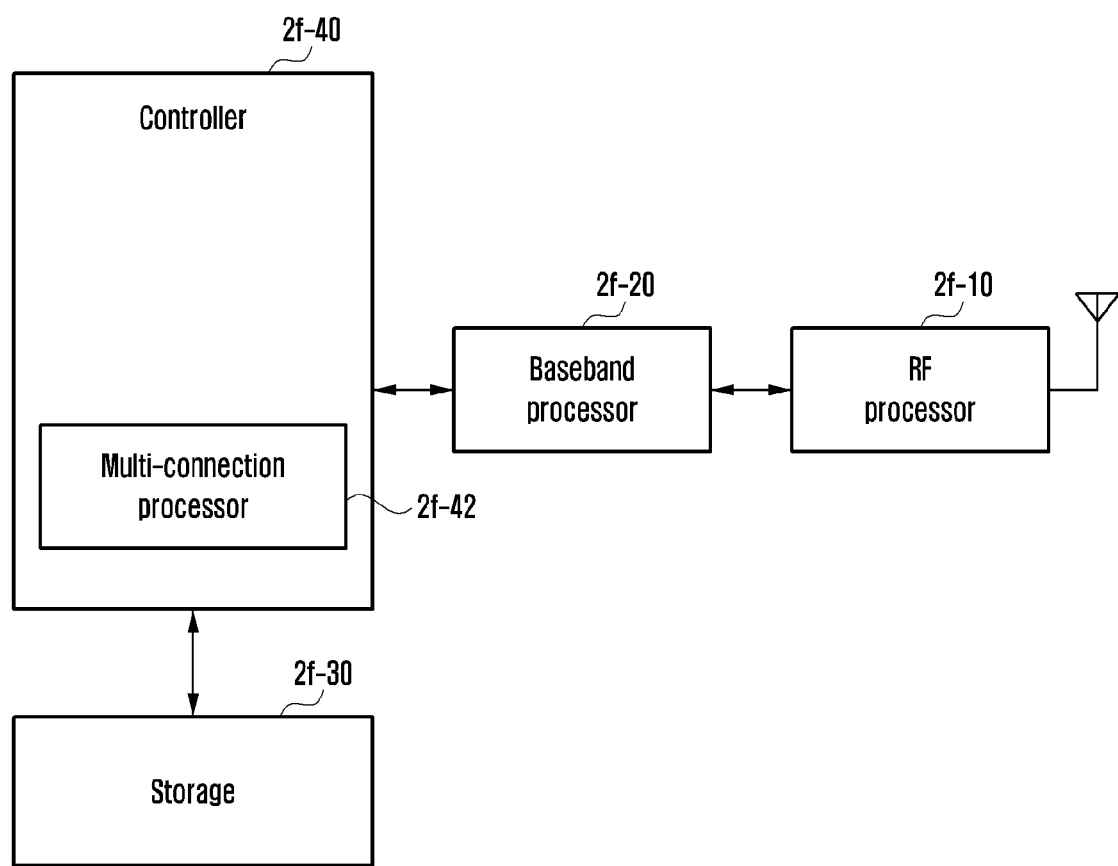
FIG. 2F is a block diagram illustrating an internal structure of a terminal according to a second embodiment of the present disclosure.

FIG. 2F is a block diagram illustrating an internal structure of a terminal according to a second embodiment of the present disclosure.

As shown in FIG. 2F, the terminal includes a radio frequency (RF) processor 2f-10, a baseband processor 2f-20, a storage 2f-30, and a controller 2f-40.

The RF processor 2f-10 performs a function, such as band conversion and amplification of a signal, for transmitting and receiving the signal through a radio channel. That is, the RF processor 2f-10 up-converts a baseband signal provided from the baseband processor 2f-20 into an RF band signal to transmit the RF band signal through an antenna, and also down-converts an RF band signal received through the antenna into a baseband signal. For example, the RF processor 2f-10 may include a transmitter filter, a receiver filter, an amplifier, a mixer, an oscillator, a digital to analog converter (DAC), an analog to digital converter (ADC), and the like. Although FIG. 2F shows only one antenna, the terminal may have a plurality of antennas. In addition, the RF processor 2f-10 may include a plurality of RF chains. Further, the RF processor 2f-10 may perform beamforming. For the beamforming, the RF processor 2f-10 may adjust the phase and size of each signal transmitted and received through a plurality of antennas or antenna elements. Also, the RF processor 2f-10 may perform MIMO and receive several layers in the MIMO operation.

The baseband processor 2f-20 performs a conversion function between a baseband signal and a bit stream in accordance with a physical layer standard of the system. For example, in data transmission, the baseband processor 2f-20 creates complex symbols by encoding and modulating transmission bit streams. Also, in data reception, the baseband processor 2f-20 restores reception bit streams by demodulating and decoding a baseband signal provided from the RF processor 2f-10. In case of complying with orthogonal frequency division multiplexing (OFDM) scheme, in data transmission, the baseband processor 2f-20 generates complex symbols by encoding and modulating transmission bit streams, maps the complex symbols to subcarriers, and constructs OFDM symbols through an inverse fast Fourier transform (IFFT) operation and a cyclic prefix (CP) insertion. In addition, in data reception, the baseband processor 2f-20 divides a baseband signal provided from the RF processor 2f-10 into OFDM symbol units, restores signals mapped to subcarriers through a fast Fourier transform (FFT) operation, and restores reception bit streams through demodulation and decoding.

As described above, the baseband processor 2f-20 and the RF processor 2f-10 transmit and receive signals. Accordingly, the baseband processor 2f-20 and the RF processor 2f-10 may be referred to as a transmitting unit, a receiving unit, a transceiver, or a communication unit. In addition, at least one of the baseband processor 2f-20 and the RF processor 2f-10 may include a plurality of communication modules to support a plurality of different radio access technologies. Also, at least one of the baseband processor 2f-20 and the RF processor 2f-10 may include different communication modules for processing signals of different frequency bands. For example, the different radio access technologies may include a wireless LAN (e.g., IEEE 802.11), a cellular network (e.g., LTE), and the like. In addition, the different frequency bands may include a super high frequency (SHF) band (e.g., 2.5 GHz, 5 GHz), and a millimeter wave (e.g., 60 GHz) band.

The storage 2*f*-30 stores a basic program for the operation of the terminal, an application program, and data such as configuration information. In particular, the storage 2*f*-30 may store information associated with an access node that performs wireless communication by using a radio access technology. Also, the storage 2*f*-30 provides the stored data in response to a request of the controller 2*f*-40.

The controller 2*f*-40 controls overall operations of the terminal. For example, the controller 2*f*-40 transmits and receives a signal through the baseband processor 2*f*-20 and the RF processor 2*f*-10. Also, the controller 2*f*-40 writes and reads data to and from the storage 2*f*-30. For this, the controller 2*f*-40 may include at least one processor. For example, the controller 2*f*-40 may include a communication processor (CP) for controlling communication and an application processor (AP) for controlling an upper layer such as an application program.

Figure 2G:
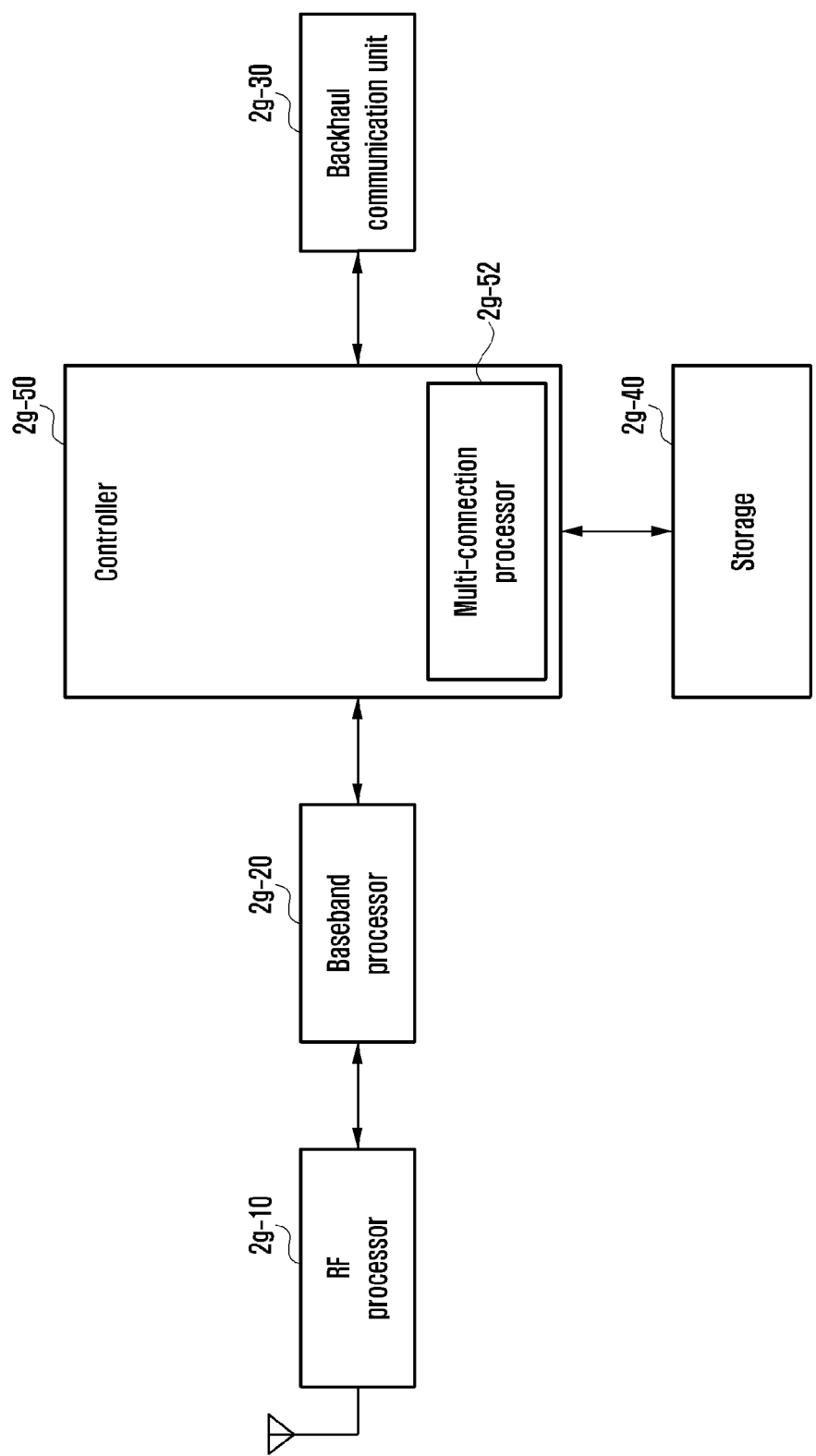
FIG. 2G is a block diagram illustrating a configuration of a base station according to a second embodiment of the present disclosure.

FIG. 2G is a block diagram illustrating a configuration of a base station according to a second embodiment of the present disclosure.

As shown in FIG. 2G, the base station includes an RF processor 2*g*-10, a baseband processor 2*g*-20, a backhaul communication unit 2*g*-30, a storage 2*g*-40, and a controller 2*g*-50.

The RF processor 2*g*-10 performs a function, such as band conversion and amplification of a signal, for transmitting and receiving the signal through a radio channel. That is, the RF processor 2*g*-10 up-converts a baseband signal provided from the baseband processor 2*g*-20 into an RF band signal to transmit the RF band signal through an antenna, and also down-converts an RF band signal received through the antenna into a baseband signal. For example, the RF processor 2*g*-10 may include a transmitter filter, a receiver filter, an amplifier, a mixer, an oscillator, a DAC, an ADC, and the like. Although FIG. 2G shows only one antenna, the base station may have a plurality of antennas. In addition, the RF processor 2*g*-10 may include a plurality of RF chains. Further, the RF processor 2*g*-10 may perform beamforming. For the beamforming, the RF processor 2*g*-10 may adjust the phase and size of each signal transmitted and received through a plurality of antennas or antenna elements. Also, the RF processor 2*g*-10 may perform MIMO and receive several layers in the MIMO operation.

The baseband processor 2*g*-20 performs a conversion function between a baseband signal and a bit stream in accordance with a physical layer standard of the radio access technology. For example, in data transmission, the baseband processor 2*g*-20 creates complex symbols by encoding and modulating transmission bit streams. Also, in data reception, the baseband processor 2*g*-20 restores reception bit streams by demodulating and decoding a baseband signal provided from the RF processor 2*g*-10. In case of complying with OFDM scheme, in data transmission, the baseband processor 2*g*-20 generates complex symbols by encoding and modulating transmission bit streams, maps the complex symbols to subcarriers, and constructs OFDM symbols through an IFFT operation and a CP insertion. In addition, in data reception, the baseband processor 2*g*-20 divides a baseband signal provided from the RF processor 2*g*-10 into OFDM symbol units, restores signals mapped to subcarriers through an FFT operation, and restores reception bit streams through demodulation and decoding. The baseband processor 2*g*-20 and the RF processor 2*g*-10 transmit and receive signals as described above. Thus, the baseband processor 2*g*-20 and the RF processor 2*g*-10 may be referred to as a transmitting unit, a receiving unit, a transceiver, a communication unit, or a wireless communication unit.

The backhaul communication unit 2*g*-30 provides an interface for performing communication with other nodes in a network. That is, the backhaul communication unit 2*g*-30 converts a bit stream transmitted from the base station to another node, e.g., a sub base station, a core network, etc., into a physical signal, and also converts a physical signal received from another node into a bit stream.

The storage 2*g*-40 stores a basic program for the operation of the base station, an application program, and data such as setting information. In particular, the storage 2*g*-40 may store information on a bearer allocated to the connected terminal, a measurement result reported from the connected terminal, and the like. In addition, the storage 2*g*-40 may store information for determining whether to provide or suspend multiple connections to or from the terminal. Also, the storage 2*g*-40 provides the stored data in response to a request of the controller 2*g*-50.

The controller 2*g*-50 controls overall operations of the base station. For example, the controller 2*g*-50 transmits and receives a signal through the baseband processor 2*g*-20 and the RF processor 2*g*-10 or through the backhaul communication unit 2*g*-30. Also, the controller 2*g*-50 writes and reads data to and from the storage 2*g*-40. For this, the controller 2*g*-50 may include at least one processor.

In summary, the operation according to the first embodiment of the present disclosure is as follows.

With respect to the first embodiment of the present disclosure, an access control mechanism of LTE is as follows.

Access class barring features has been discussed RAN2 (and SA1) in almost every release since Rel-8. As a result, there are multiple access barring mechanisms in LTE:

1. Access Class Barring (ACB) as per Rel-8: In this mechanism, it is possible to bar the UE. Normal UEs (Access Class 0-9) are barred with a probability factor and a timer whereas special classes can be controlled separately. Also emergency calls can be controlled separately.

```
SEQUENCE {
    ac-BarringInfo                    SEQUENCE {
        ac-BarringForEmergency            BOOLEAN,
        ac-BarringForMO-Signalling            AC-BarringConfig        OPTIONAL, -
- Need OP
        ac-BarringForMO-Data              AC-BarringConfig        OPTIONAL --
Need OP
    AC-BarringConfig ::=              SEQUENCE {
        ac-BarringFactor                  ENUMERATED {
            p00, p05, p10, p15, p20, p25, p30, p40,
            p50, p60, p70, p75, p80, p85, p90, p95},
```

```
    ac-BarringTime              ENUMERATED {s4, s8, s16, s32, s64, s128, s256,
s512},
    ac-BarringForSpecialAC      BIT STRING(SIZE(5))
}
```

2. Service Specific Access Control (SSAC): Allows the network to prohibit MMTel-voice and MMTel-video accesses. The network broadcasts barring parameters (parameters similar to ACB) and the actual barring algorithm is similar to ACB (barring factor and random timer). The actual decision if access is allowed is done in the IMS layer of the UE.

```
    [[ ssac-BarringForMMTEL-Voice-r9    AC-BarringConfig
OPTIONAL,   - - Need OP
       ssac-BarringForMMTEL-Video-r9    AC-BarringConfig
OPTIONAL    - - Need OP
```

3. Access control for CS fall-back: Allows the network to prohibit CSFB users. The actual barring algorithm is similar to ACB.

```
    ]],
    [[  ac-BarringForCSFB-r10    AC-BarringConfig    OPTIONAL  --
Need OP
    ]],
```

4. Extended Access Barring (EAB): Allows the network to prohibit low priority UEs. Barring is based on a bitmap in which each access class (AC 0-9) can be either barred or allowed.

```
SystemInformationBlockType14-r11 ::=    SEQUENCE {
    eab-Param-r11                       CHOICE {
        eab-Common-r11                      EAB-Config-r11,
        eab-PerPLMN-List-r11                SEQUENCE(SIZE(1..maxPLMN-r11)) OF
EAB-ConfigPLMN-r11
    }                                   OPTIONAL, -- Need OR
    lateNonCriticalExtension            OCTET STRING    OPTIONAL,
    ...
EAB-Config-r11 ::=                  SEQUENCE {
    eab-Category-r11                    ENUMERATED {a, b, c},
    eab-BarringBitmap-r11               BIT STRING(SIZE(10))
}
```

5. Access class barring bypass: Allows omitting access class barring for IMS voice and video users.

```
    [[  ac-BarringSkipForMMTELVoice-r12     ENUMERATED {true}
OPTIONAL,        -- Need OP
        ac-BarringSkipForMMTELVideo-r12     ENUMERATED {true}
OPTIONAL,        -- Need OP
        ac-BarringSkipForSMS-r12    ENUMERATED {true}       OPTIONAL,
-- Need OP
```

6. Application Specific Access Class (ACDC) barring: Allows to bar traffic of certain application. In this solution, applications are categorized based on global application ID (in Android or IOS). The network broadcasts barring parameters (barring factor and timer) for each category.

```
]],
[[  acdc-BarringForCommon-r13       ACDC-BarringForCommon-r13
OPTIONAL,   -- Need OP
     acdc-BarringPerPLMN-List-r13   ACDC-BarringPerPLMN-List-r13 OPTIONAL
-- Need OP
    ]],
ACDC-BarringForCommon-r13 ::=   SEQUENCE {
    acdc-HPLMNonly-r13              BOOLEAN,
    barringPerACDC-CategoryList-r13         BarringPerACDC-CategoryList-r13
}
ACDC-BarringPerPLMN-List-r13 ::=    SEQUENCE(SIZE(1.. maxPLMN-r11)) OF ACDC-
BarringPerPLMN-r13
ACDC-BarringPerPLMN-r13 ::=     SEQUENCE {
    plmn-IdentityIndex-r13      INTEGER(1..maxPLMN-r11),
    acdc-OnlyForHPLMN-r13           BOOLEAN,
    barringPerACDC-CategoryList-r13         BarringPerACDC-CategoryList-r13
}
```

-continued

```
BarringPerACDC-Category-r13 ::= SEQUENCE {
    acdc-Category-r13         INTEGER(1..maxACDC-Cat-r13),
    acdc-BarringConfig-r13    SEQUENCE {
        ac-BarringFactor-r13      ENUMERATED {
                                      p00, p05, p10, p15, p20, p25, p30, p40,
                                      p50, p60, p70, p75, p80, p85, p90, p95},
        ac-BarringTime-r13        ENUMERATED {s4, s8, s16, s32, s64, s128, s256,
s512}
    }                         OPTIONAL    -- Need OP
}
```

Any overload control mechanism need to consider multiple sometimes conflicting requirements at congestion:

According to the existing LTE access control mechanism, NAS-AS interaction is used and there is no AS based triggering. That is, in the existing LTE, there is no access control mechanism for controlling whether to transmit data generated in the AS. The reason is that this can be controlled by means of scheduling.

Thus, even in NR, it may not be necessary to newly introduce AS-based triggering while focusing on the integration of the mechanisms listed above. However, a terminal which is in a newly introduced inactive mode requires an access control.

Therefore, the second embodiment of the present disclosure proposes that the base station provides barring configuration information per DRB when the terminal transitions to the inactive mode.

Various examples of improvements in an access control mechanism design according to the second embodiment of the present disclosure will be described below.

AC-config does not distinguish the default AC (0-9).

Through the AC control, the following traffic may be treated separately (bypassing AC)
  emergency
  MMTELVoice
  MMTELVideo
  SMS Through the AC control, the following traffic can be stochastically controlled regardless of a user class.
  MO-Signaling
  MO-Data
  MMTEL-Voice
  MMTEL-Video
  CSFB Delay tolerant traffic may be on/off according to AC.

The NR unified access control according to the second embodiment of the present disclosure is based on typical LTE ACDC. The default barring configuration information of specific traffic (e.g., an emergency call) may have the highest priority, and the barring configuration information of specific traffic (e.g., MMTEL voice, MMTEL video, MMTEL-SMS) may be broadcasted via system information. The broadcasted value may override the terminal dedicated value.

Basically, when an RRC connection is established, the NAS informs the AS of the category. According to the second embodiment of the present disclosure, when the RRC connection is suspended, the NAS may inform the AS of the category per DRB.

Table 2 below describes the access control per category according to the second embodiment of the present disclosure.

TABLE 2

| | |
|---|---|
| Emergency | No NAS configuration of category (That is, the NAS does not notify the category information separately but only informs that the call type is emergency) |
| | default = highest category (no barring) |
| | The category can be configured separately per cell in the system information. |
| | The value configured per cell overrides the default value. |
| Certain Application (Voice, Video, SMS, . . . ) | The category is configured in the NAS. |
| | The category can be configured separately per cell in the system information (or whether to apply the highest category can be configured). |
| | The value configured per cell overrides the value configured in the NAS. |
| MO-signaling/MO-data/delay tolerant traffic | The category is configured in the NAS. |
| | If the NAS informs the AS of the category, the AS performs the AC with the configured category. |
| RRC signaling in INACTIVE state | The MO-signaling category is used, or the RRC message does not apply the AC. |
| MO data in INACTIVE state | The gNB assigns a category to be applied per DRB in the INACTIVE state transition of the UE. |
| | Whether to resume is determined using the category. |

```
    ]],
    [[  acdc-BarringForCommon-r13          ACDC-BarringForCommon-r13
        OPTIONAL,   -- Need OP
        acdc-BarringPerPLMN-List-r13       ACDC-BarringPerPLMN-List-r13 OPTIONAL
    -- Need OP
    ]],
ACDC-BarringForCommon-r13 ::=              SEQUENCE {
    acdc-HPLMNonly-r13                         BOOLEAN,
    barringPerACDC-CategoryList-r13            BarringPerACDC-CategoryList-r13
}
ACDC-BarringPerPLMN-List-r13 ::=           SEQUENCE(SIZE(1.. maxPLMN-r11)) OF ACDC-
BarringPerPLMN-r13
ACDC-BarringPerPLMN-r13 ::=                SEQUENCE {
    plmn-IdentityIndex-r13                     INTEGER(1..maxPLMN-r11),
    acdc-OnlyForHPLMN-r13                      BOOLEAN,
    barringPerACDC-CategoryList-r13            BarringPerACDC-CategoryList-r13
}
```

-continued

```
BarringPerACDC-Category-r13 ::= SEQUENCE {
    acdc-Category-r13              INTEGER(1..maxACDC-Cat-r13),
    acdc-BarringConfig-r13         SEQUENCE {
        ac-BarringFactor-r13           ENUMERATED {
                                           p00, p05, p10, p15, p20, p25, p30, p40,
                                           p50, p60, p70, p75, p80, p85, p90, p95},
        ac-BarringTime-r13             ENUMERATED {s4, s8, s16, s32, s64, s128, s256,
s512}
    }                              OPTIONAL    -- Need OP
}
```

Third Embodiment

Figure 3A:
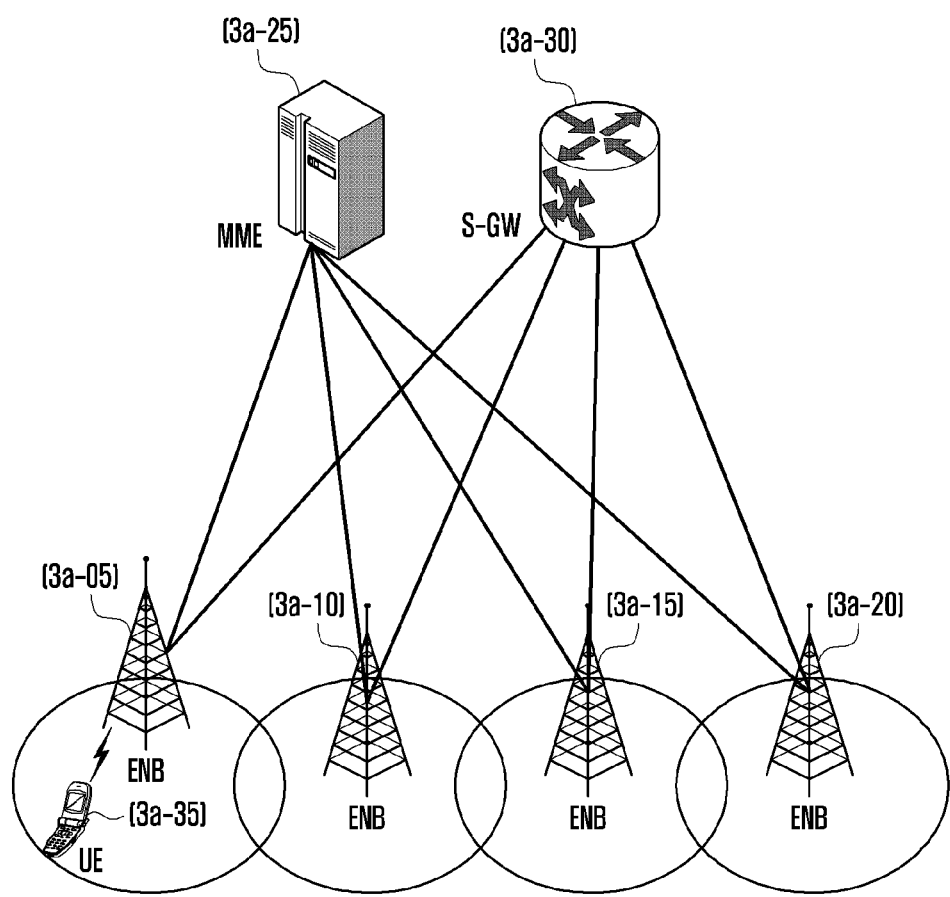
FIG. 3A is a diagram illustrating a structure of an LTE system.

FIG. 3A is a diagram illustrating a structure of an LTE system.

As shown in FIG. 3A, a radio access network of the LTE system includes a plurality of eNBs (also referred to as evolved Node B, eNodeB, or a base station) 3a-05, 3a-10, 3a-15 and 3a-20, a mobility management entity (MME) 3a-25, and a serving gateway (S-GW) 3a-30. A user equipment (also referred to as UE or a terminal) 3a-35 accesses an external network through the eNB 3a-05, 3a-10, 3a-15 or 3a-20 and the S-GW 3a-30.

Each of the eNBs 3a-05, 3a-10, 3a-15, and 3a-20 corresponds to the existing node B of the UMTS system. This eNB is connected to the UE 3a-35 via a radio channel and performs a more complicated function than that of the existing node B. Since all kinds of user traffic including a real-time service such as voice over IP (VoIP) are served through a shared channel in the LTE system, a device for collecting various kinds of state information such as buffer states, available transmission power states, and channel states of the UEs and performing scheduling is used. The eNBs 3a-05, 3a-10, 3a-15, and 3a-20 are in charge of this. Normally, one eNB controls a plurality of cells. For example, in order to realize a transfer rate of 100 Mbps, the LTE system uses, as a radio access technique, orthogonal frequency division multiplexing (OFDM) at the bandwidth of 20 MHz. In addition, an adaptive modulation and coding (AMC) scheme is used to determine a modulation scheme and a channel coding rate according to a channel state of the UE. The MME 3a-25 is a device for performing various control functions as well as a mobility management function for the UE, and is connected to the plurality of eNBs. The S-GW 3a-30 is a device for providing a data bearer, and creates or removes the data bearer under the control of the MME 3a-25.

Figure 3B:
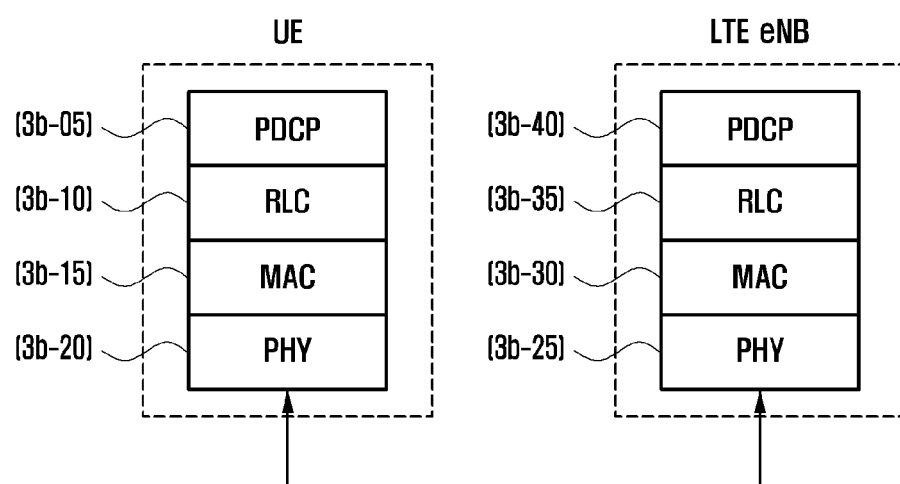
FIG. 3B is a diagram illustrating a radio protocol structure in an LTE system.

FIG. 3B is a diagram illustrating a radio protocol structure in an LTE system.

As shown in FIG. 3B, in each of the UE and the eNB, a radio protocol of the LTE system is composed of a packet data convergence protocol (PDCP) 3b-05 or 3b-40, a radio link control (RLC) 3b-10 or 3b-35, and a medium access control (MAC) 3b-15 or 3b-30. The PDCP 3b-05 or 3b-40 performs an operation of IP header compression/decompression, and the like. The main functions of the PDCP are summarized as follows.
  Header compression and decompression: ROHC only
  Transfer of user data
  In-sequence delivery of upper layer PDUs at PDCP re-establishment procedure for RLC AM
  For split bearers in DC (only support for RLC AM): PDCP PDU routing for transmission and PDCP PDU reordering for reception
  Duplicate detection of lower layer SDUs at PDCP re-establishment procedure for RLC AM
  Retransmission of PDCP SDUs at handover and, for split bearers in DC, of PDCP PDUs at PDCP data-recovery procedure, for RLC AM
  Ciphering and deciphering
  Timer-based SDU discard in uplink The RLC 3b-10 or 3b-35 performs an ARQ operation or the like by reassembling a PDCP packet data unit (PDCP PDU) in a suitable size. The main functions of the RLC are summarized as follows.
  Transfer of upper layer PDUs
  Error correction through ARQ (only for AM data transfer)
  Concatenation, segmentation and reassembly of RLC SDUs (only for UM and AM data transfer)
  Re-segmentation of RLC data PDUs (only for AM data transfer)
  Reordering of RLC data PDUs (only for UM and AM data transfer)
  Duplicate detection (only for UM and AM data transfer)
  Protocol error detection (only for AM data transfer)
  RLC SDU discard (only for UM and AM data transfer)
  RLC re-establishment The MAC 3b-15 or 3b-30 is connected to several RLC layer devices included in one UE and performs an operation of multiplexing RLC PDUs into a MAC PDU and demultiplexing RLC PDUs from the MAC PDU. The main functions of the MAC are summarized as follows.
  Mapping between logical channels and transport channels
  Multiplexing/demultiplexing of MAC SDUs belonging to one or different logical channels into/from transport blocks (TB) delivered to/from the physical layer on transport channels
  Scheduling information reporting
  Error correction through HARQ
  Priority handling between logical channels of one UE
  Priority handling between UEs by means of dynamic scheduling
  MBMS service identification
  Transport format selection
  Padding A physical layer (PHY) 3b-20 or 3b-25 performs an operation of channel-coding and modulating upper layer data and then transmitting OFDM symbols thereof to the radio channel, or an operation of demodulating and channel-decoding OFDM symbols received through the radio channel and then delivering them to the upper layer.

Figure 3C:
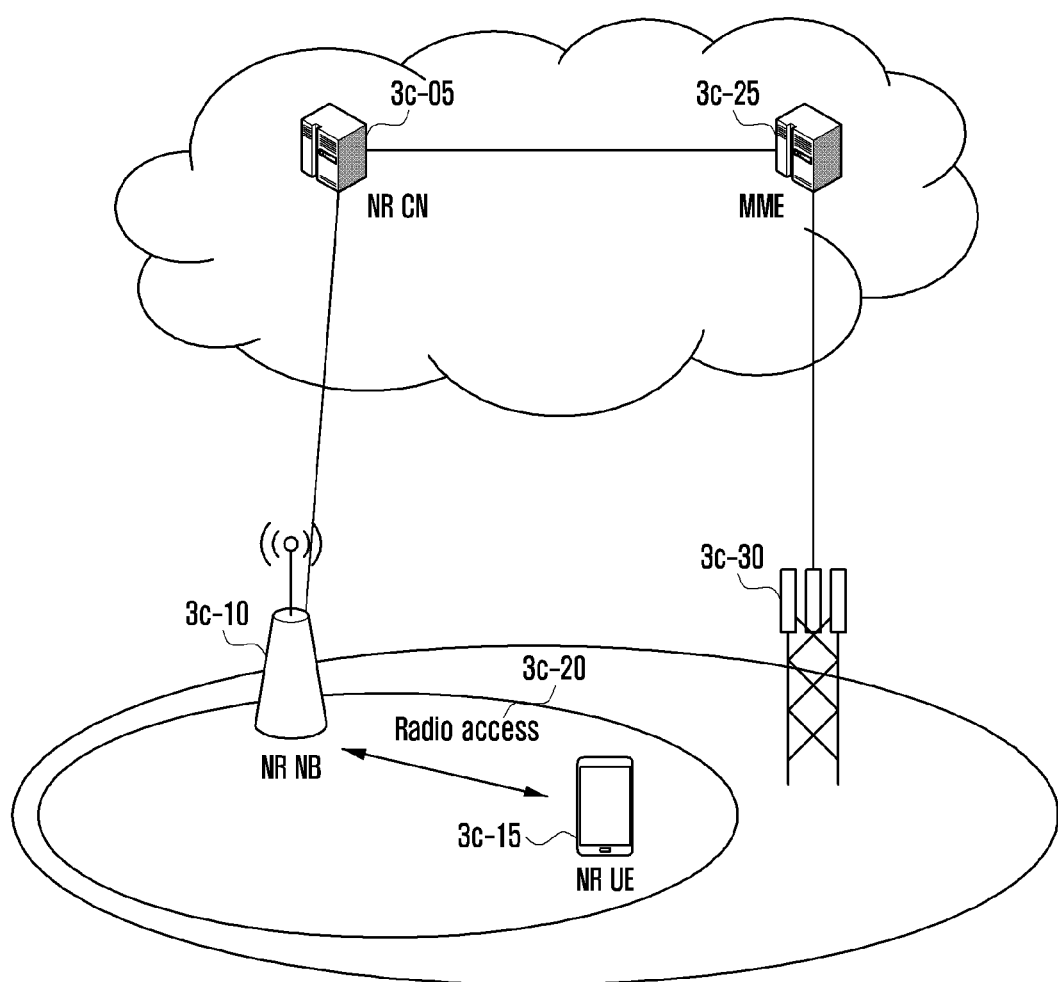
FIG. 3C is a diagram illustrating a structure of a next generation mobile communication system.

FIG. 3C is a diagram illustrating a structure of a next generation mobile communication system.

Referring to FIG. 3C, a radio access network of the next generation mobile communication system (hereinafter, new radio (NR) or 5G) includes a next generation base station (also referred to as a new radio node B, NR gNB, gNB, 5G NB, or an NR base station) 3c-10 and a new radio core network (NR CN) 3c-05. A user terminal (also referred to as new radio user equipment, NR UE, UE, or terminal) 3c-15 accesses an external network through the NR gNB 3c-10 and the NR CN 3c-05.

In FIG. 3C, the NR gNB 3c-10 corresponds to the eNB of the existing LTE system. The NR gNB 3c-10 is connected to the NR UE 3c-15 through a radio channel and can provide a better service than the existing Node B. In the next generation mobile communication system, since all user traffic is provided through a shared channel, a device for collecting various kinds of state information, such as buffer states, available transmission power states, and channel states of NR UEs, and thereby performing scheduling is used. This is performed by the NR gNB 3c-10. Normally, one NR gNB 3c-10 controls a plurality of cells and includes a central unit (CU) for performing control and signaling and a distributed unit (DU) for performing transmission and reception of signals. In order to realize high-speed data transfer compared to the existing LTE, more than the existing increased bandwidth may be applied, and also a beamforming technique may be used with orthogonal frequency division multiplexing (OFDM) as a radio access technology. In addition, an adaptive modulation and coding (AMC) scheme is used to determine a modulation scheme and a channel coding rate according to a channel state of the NR UE. The NR CN 3c-05 performs functions such as mobility support, bearer setup, and QoS setup. The NR CN 3c-05 is a device for performing various control functions as well as a mobility management function for the NR UE, and is connected to a plurality of NR gNB. Also, the next generation mobile communication system may be linked to the existing LTE system, and the NR CN 3c-05 is connected to the MME 3c-25 through a network interface. The MME 3c-25 is connected to the eNB 3c-30 which is the existing base station.

Figure 3D:
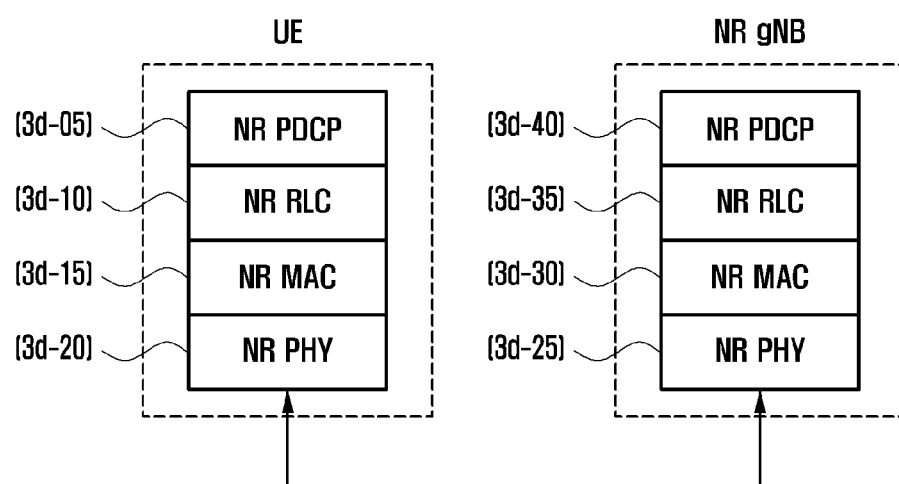
FIG. 3D is a diagram illustrating a radio protocol structure of a next generation mobile communication system.

FIG. 3D is a diagram illustrating a radio protocol structure of a next generation mobile communication system.

Referring to FIG. 3D, in each of the UE and the NR gNB, a radio protocol of the next generation mobile communication system is composed of an NR PDCP 3d-05 or 3d-40, an NR RLC 3d-10 or 3d-35, and an NR MAC 3d-15 or 3d-30. The main functions of the NR PDCP 3d-05 or 3d-40 may include at least parts of the following functions.

Header compression and decompression: ROHC only
Transfer of user data
In-sequence delivery of upper layer PDUs
PDCP PDU reordering for reception
Duplicate detection of lower layer SDUs
Retransmission of PDCP SDUs
Ciphering and deciphering
Timer-based SDU discard in uplink In the above, the reordering function of the NR PDCP refers to a function of rearranging PDCP PDUs received from a lower layer on the basis of a PDCP sequence number (PDCP SN). The reordering function may include a function of delivering data to an upper layer in the order of rearrangement, a function of recording lost PDCP PDUs through reordering, a function of reporting the status of the lost PDCP PDUs to a transmitter, and/or a function of requesting retransmission of the lost PDCP PDUs.

The main functions of the NR RLC 3d-10 or 3d-35 may include at least parts of the following functions.

Transfer of upper layer PDUs
In-sequence delivery of upper layer PDUs
Out-of-sequence delivery of upper layer PDUs
Error correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment In the above, the in-sequence delivery function of the NR RLC refers to a function of delivering RLC SDUs, received from a lower layer, to an upper layer in order. If one original RLC SDU is divided into several RLC SDUs and then received, the in-sequence delivery function may include a function of reassembling and delivering the RLC PDUs, a function of rearranging the received RLC PDUs on the basis of an RLC SN or a PDCP SN, a function of recording lost RLC PDUs through reordering, a function of reporting the status of the lost RLC PDUs to a transmitter, and/or a function of requesting retransmission of the lost RLC PDUs. If there is a lost RLC SDU, the in-sequence delivery function may include a function of delivering only the RLC SDUs before the lost RLC SDU to an upper layer in order. If a given timer expires even if there is a lost RLC SDU, the in-sequence delivery function may include a function of delivering all the RLC SDUs, received before the start of the timer, to an upper layer in order, or a function of delivering all the RLC SDUs, received up to the present moment, to an upper layer in order. In addition, the RLC PDUs may be processed in the order of being received (regardless of the sequence number), and may be delivered to the PDCP device in an out-of-sequence delivery manner. Segments, stored in a buffer or to be received later, may be reconstructed into one complete RLC PDU, which is processed and transferred to the PDCP device. The NR RLC layer may not include a concatenation function, which may be performed in the NR MAC layer or replaced by a multiplexing function of the NR MAC layer.

In the above, the out-of-sequence delivery function of the NR RLC refers to a function of delivering RLC SDUs, received from a lower layer, directly to an upper layer regardless of order. If one original RLC PDU is divided into several RLC SDUs and then received, the out-of-sequence delivery function may include a function of reassembling and delivering the RLC PDUs, and a function of recording lost RLC PDUs by storing RLC SNs or PDCP SNs of the received RLC PDUs and reordering them.

The NR MAC 3d-15 or 3d-30 is connected to several NR RLC layer devices included in one UE, and the main functions of the NR MAC may include at least parts of the following functions.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding A physical layer (PHY) 3d-20 or 3d-25 performs an operation of channel-coding and modulating upper layer data and then transmitting OFDM symbols thereof to the radio channel, or an operation of demodulating and channel-decoding OFDM symbols received through the radio channel and then delivering them to the upper layer.

Figure 3E:
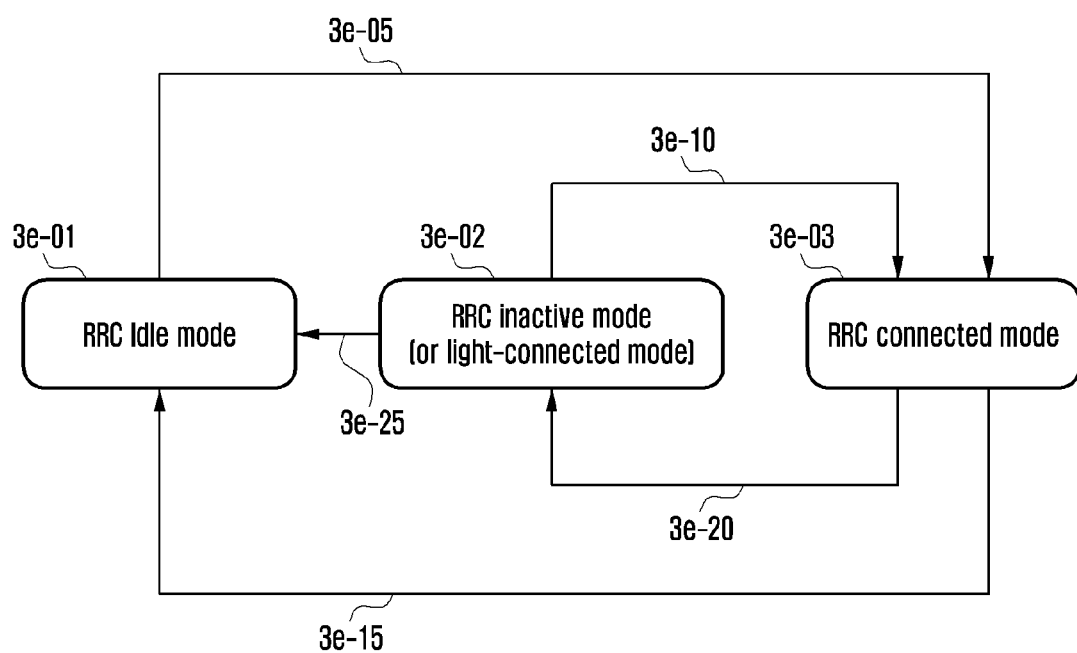
FIG. 3E is a diagram illustrating modes allowing a terminal to stay in a next generation mobile communication system according to the third embodiment of the present disclosure.

FIG. 3E is a diagram illustrating modes (or states) allowing a terminal to stay in a next generation mobile communication system according to the third embodiment of the present disclosure.

In FIG. 3E, the terminal (i.e., UE) may stay in an RRC connected mode 3e-03, an RRC inactive mode (or a lightly-connected mode) 3e-02, or an RRC idle mode 3e-01, and may go through processes 3e-05, 3e-10, 3e-15, 3e-20, and 3e-25 of transitioning to other respective modes.

That is, when the UE which is in the RRC idle mode 3e-01 has data to be transmitted on uplink, receives a paging message through downlink data, or updates a tracking area (periodically or if it moves out of the tracking area), the UE may establish a connection with the network and then transition to the RRC connected mode 3e-03 in the process 3e-05 so as to transmit and receive data. If data is not generated for a certain time after data transmission and reception, the UE which is in the RRC connected mode 3e-03 may transition to the RRC idle mode 3e-01 by the network in the process 3e-15. Alternatively, if data is not generated for a certain time, the UE which is in the RRC connected mode 3e-03 may transition to the RRC inactive mode 3e-02 in the process 3e-20 by the network or by itself for the purpose of battery saving and quick connection.

When the UE which is in the RRC inactive mode 3e-02 has data to be transmitted on uplink, receives a paging message through downlink data, or updates a tracking area or a RAN notification area (periodically or if it moves out of the tracking area or the RAN notification area), the UE may establish a connection with the network and then transition to the RRC connected mode 3e-03 in the process 3e-10 so as to transmit and receive data.

The UE which is in the RRC inactive mode 3e-02 may transition to the RRC idle mode 3e-01 in the process 3e-25 by the instruction of the network, by predetermined configuration, or by itself. This operation should be supported because the signaling overhead of network may increase due to a frequent RAN notification area update procedure when many UEs being in the RRC inactive mode exist in the network.

The UE having a certain purpose may transmit data even in the RRC inactive mode 3e-02 without transitioning to the RRC connected mode, and may transition to the RRC connected mode, only if necessary, while repeatedly transitioning between the RRC inactive mode and the RRC idle mode according to the instruction of the network. In this procedure, the UE being in the RRC inactive mode may have a very short transmission delay and very little signaling overhead by transmitting data in the RRC inactive mode. The UE having a certain purpose may correspond to UE that intends to transmit a small amount of data or UE that periodically transmits data intermittently or in a very long cycle. Also, the UE being in the RRC idle mode 3e-01 may directly transition to the RRC inactive mode 3e-02 by the network, or may transition to the RRC connected mode 3e-03 and then transition to the RRC inactive mode 3e-02 in the processes 3e-05 and 3e-20.

In order to solve a problem of a state mismatch between an actual mode of the UE and a UE mode recognized by the network when the UE performs the transition between modes, an additional timer (e.g., an inactive timer) may be configured and used in the UE. Further, a base station (i.e., eNB or gNB) may also use an additional timer.

In the present disclosure, the RRC inactive mode and the lightly-connected mode may be interpreted as the same mode and assumed that the UE performs the same operation. Alternatively, the RRC inactive mode and the lightly-connected mode may be interpreted as the same mode and assumed that the UE performs different operations in the respective modes. Alternatively, the RRC inactive mode and the lightly-connected mode may be interpreted as different modes and assumed that the UE performs different operations in the respective modes. While the RRC inactive mode and the lightly-connected mode have the same purpose in that they can allow quick re-access with small signaling and save the battery, both modes may be the same mode or different modes depending on the implementation of the UE and the network or the definition thereof.

In addition, the UE operation in the RRC inactive mode and the lightly-connected mode may be the same as the operation in the RRC idle mode, have an additional function, or have only some functions of the operation in the RRC idle mode. As described above, the RRC inactive mode has advantages in that the battery of the UE is saved and the UE can establish a quick connection with the network through a small signaling overhead. However, the UE being in the RRC inactive mode should perform a procedure of updating the RAN notification area more frequently than a procedure in which the UE being in the RRC idle mode updates the tracking area periodically. Therefore, since the signaling overhead due to the procedure of periodically updating the RAN notification area may be caused if there are a large number of RRC inactive mode UEs in the network, the network should be able to manage the RRC inactive mode UE and, if necessary, enable the transition to the RRC idle mode.

Figure 3F:
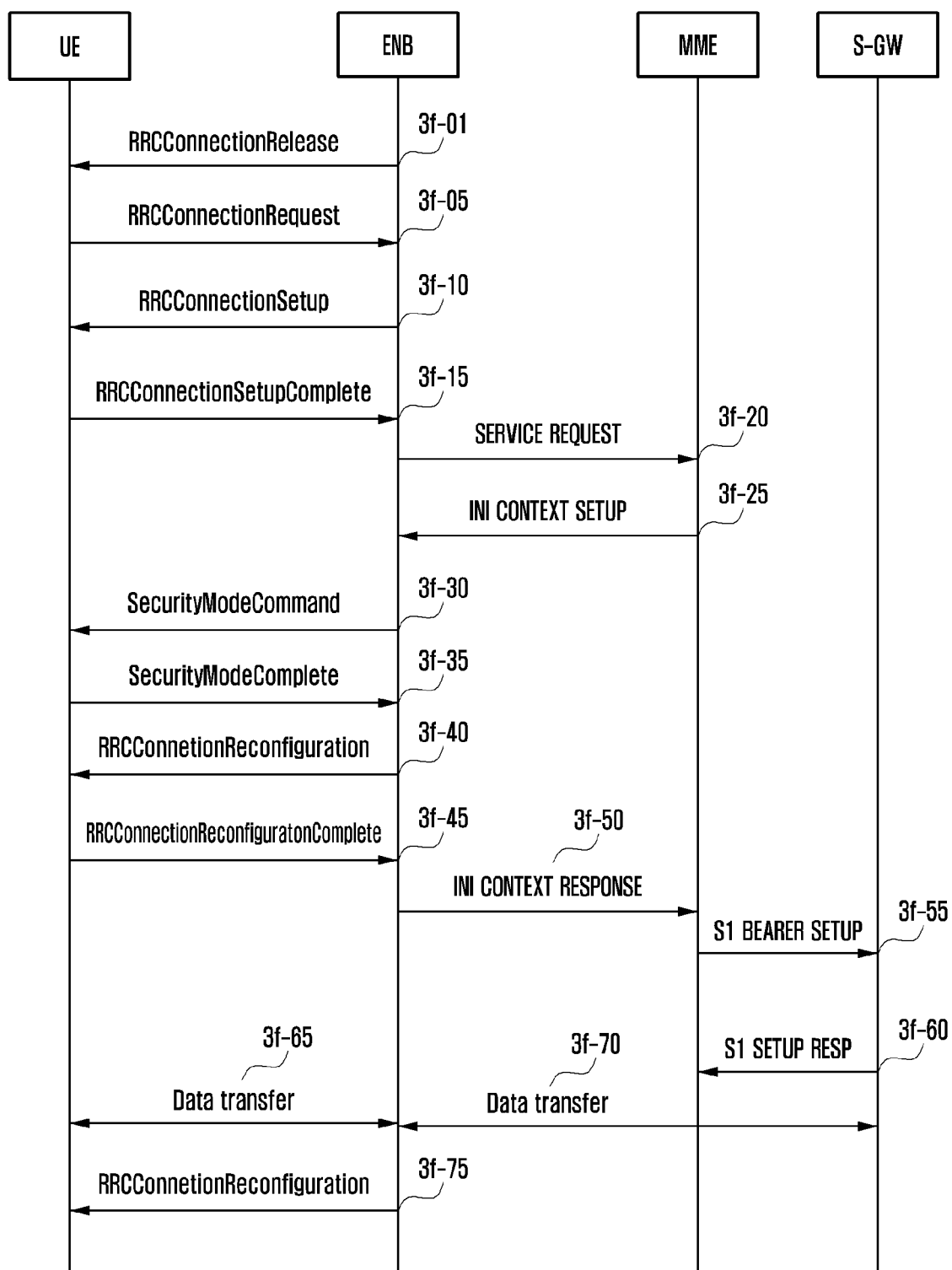
FIG. 3F is a flow diagram illustrating a procedure in which a terminal transitions from an RRC connected mode to an RRC idle mode and transitions from the RRC idle mode to the RRC connected mode according to the third embodiment of the present disclosure.

FIG. 3F is a flow diagram illustrating a procedure in which a terminal transitions from an RRC connected mode to an RRC idle mode and transitions from the RRC idle mode to the RRC connected mode according to the third embodiment of the present disclosure.

As shown in FIG. 3F, when the terminal (i.e., UE) being in the RRC connected mode fails to transmit or receive data for a certain reason or for a certain time, a base station (i.e., eNB or gNB) may transmit an RRCConnectionRelease message to the UE at step 3f-01 so as to enable the UE to transition to the RRC idle mode. If the UE currently having no connection establishment (hereinafter referred to as an idle mode UE) generates data to be transmitted, the UE performs an RRC connection establishment procedure with the eNB. The UE establishes uplink transmission synchronization with the eNB through a random access process and transmits an RRCConnectionRequest message to the eNB at step 3f-05. This message contains an identifier of the UE, a cause to establish a connection (establishmentCause), and the like.

At step 3f-10, the eNB transmits an RRCConnectionSetup message to the UE so that the UE establishes the RRC connection. This message contains RRC connection configuration information and the like. The RRC connection is also referred to as a signaling radio bearer (SRB) and used for transmission and reception of RRC messages which are control messages between the UE and the eNB. The UE that establishes the RRC connection transmits an RRCConnetionSetupComplete message to the eNB at step 3f-15. This message contains a control message, called a SERVICE REQUEST, by which the UE requests bearer setup for a certain service to an MME.

The eNB transmits a SERVICE REQUEST message contained in the RRCConnetionSetupComplete message to the MME at step 3f-20, and the MME determines whether to provide the service requested by the UE. If it is determined to provide the requested service, the MME transmits an INITIAL CONTEXT SETUP REQUEST message to the eNB at step **3*f*-25**. This message contains quality of service (QoS) information to be applied at the setup of a data radio bearer (DRB), security-related information (e.g., security key, security algorithm) to be applied to the DRB, and the like.

At steps **3*f*-30 and 3*f*-35, the eNB exchanges a SecurityModeCommand message and a SecurityModeComplete message with the UE to establish security. After the security establishment is completed, the eNB transmits an RRCConnectionReconfiguration message to the UE at step 3*f*-40. This message contains setup information of DRB through which user data will be processed. The UE sets up the DRB by applying this information and then transmits an RRCConnectionReconfigurationComplete message to the eNB at step 3*f*-45**.

After completing the DRB setup with the UE, the eNB transmits an INITIAL CONTEXT SETUP COMPLETE message to the MME at step **3*f*-50. At steps 3*f*-55 and 3*f*-60, the MME exchanges an S1 BEARER SETUP message and an S1 BEARER SETUP RESPONSE message with the S-GW to set up an S1 bearer with the S-GW. The S1 bearer is a data transmission connection established between the S-GW and the eNB and corresponds to the DRB on a one-to-one basis. When the above process is completed, the UE transmits and receives data through the eNB and the S-GW at steps 3*f*-65 and 3*f*-70**.

As discussed above, the general data transfer process is mainly composed of three steps, namely, RRC connection setup, security setup, and DRB setup. Further, the eNB may transmit an RRCConnectionReconfiguration message at step **3*f*-75** in order to renew, add, or change the setup of the UE for a certain reason.

As described above, the transition from the RRC idle mode to the RRC connected requires many signaling procedures. Therefore, the next generation mobile communication system newly defines the RRC inactive mode or the lightly-connected mode. In this new mode, since the UE and the eNB stores the context of the UE and may maintain the S1 bearer if necessary, a faster access is possible with fewer signaling procedures.

FIG. 3G is a flow diagram illustrating a procedure in which a terminal transitions from an RRC connected mode to an RRC inactive mode (or a lightly-connected mode) and transitions from the RRC inactive mode to the RRC connected mode according to the third embodiment of the present disclosure.

FIG. 3G shows the overall operation flow of performing a procedure for reusing a UE context and an S1 bearer among a terminal (i.e., UE) **3*g*-01, an anchor base station (i.e., anchor eNB or anchor gNB) 3*g*-02, a new base station (i.e., new eNB or new gNB) 3*g*-03, and an MME 3*g*-04**.

The UE **3*g*-01 being in the RRC connected mode performs data transmission and reception with the anchor eNB 3*g*-02. If the data transmission/reception is stopped, the anchor eNB starts a certain timer. If the data transmission/reception is not resumed until the timer expires, the anchor eNB may consider releasing the RRC connection of the UE at step 3*g*-05. In addition, based on predetermined conditions, the anchor eNB may determine whether to enable the UE to be in the RRC idle mode or the RRC inactive mode. The predetermined conditions may include the degree of network traffic, the amount of UE context that the network can maintain, and the number of UEs for which the network can support a service. At step 3*g*-10**, the anchor eNB may transmit an RRConnectionRelease or RRCConnectionSuspend message, a newly defined RRC message, or another existing RRC message to the UE in order to enable the UE to be in the RRC inactive mode or the light connected mode.

At step **3*g*-10**, the anchor eNB may release the RRC connection of the UE according to a predetermined rule, store the UE context, and transmit a control message for instructing the release of the RRC connection to the UE while assigning a resume ID and configuring a paging area (PA) for the UE to report mobility in the light connected mode. At this time, from the resume ID assignment, the UE can know that the UE should store the UE context. Alternatively, through the above control message, the anchor eNB may transmit a separate context maintenance indication for instructing the UE to operate in the RRC inactive mode/light connected mode and to store the UE context. In addition, the above control message may include security information for updating a security setup used when the UE performs an RRC connection resumption procedure later. For example, the UE may be allocated in advance NCC (NextHopChainingCount) and then, using it, calculate and configure a new security key (KeNB* or KgNB*). In addition, the control message may include a list of cells to which a procedure of using the stored context can be applied when the eNB maintains the context or when the UE desires to reconfigure the RRC connection within a valid period.

After releasing the RRC connection of the UE, the anchor eNB maintains the UE context and the S1 bearer at step **3*g*-15. The S1 bearer refers to an S1-control bearer used for exchanging control messages between the eNB and the MME, and an S1-user plane bearer used for exchanging user data between the eNB and the S-GW. By maintaining the S1 bearer, it is possible to omit a procedure for S1 bearer setup when the UE attempts to establish an RRC connection in the same cell or in the same eNB. The eNB may delete the UE context and release the S1 bearer when the valid period expires. Upon receiving the RRC connection release message at step 3*g*-10, the UE transitions to the RRC inactive mode/light connected mode at step 3*g*-25**.

The anchor eNB refers to a base station that maintains and manages the UE context (resume ID) of the RRC inactive mode UE and also manages the RAN paging area (or the RAN notification area) to manage the mobility of the RRC inactive mode UE. This function of the anchor eNB may be performed instead by an access and mobility management function (AMF) device.

At step **3*g*-20, the anchor eNB transmits a control message to the MME to request a connection suspension. Upon receipt of this control message, the MME may enable at step 3*g*-35 the S-GW to immediately forward downlink data to the anchor eNB when the downlink data for the UE occurs, and enable the anchor eNB to generate a paging message and then deliver it to neighbor eNB. That is, the anchor eNB that receives the downlink data stores the received data in a buffer and performs a paging procedure. The anchor eNB refers to a base station that maintains the UE context and the S1-U bearer. Alternatively, if the anchor eNB sends the paging message and there is no response from the UE, that is, if paging fails, the anchor eNB may request the MME to perform the paging procedure. Then, at step 3*g*-35**, the MME may instruct the S-GW to request the MME to initiate the paging procedure without forwarding the downlink data for the UE to the anchor eNB.

Upon receiving the RRC connection release message including the context maintenance indication and the resume ID at step **3*g*-10**, the UE may release the RRC connection, start a timer corresponding to the valid period, record the valid cell list in a memory, maintain the current UE context in the memory without deleting it, and transition to the light connected mode at step 3g-25. The UE context refers to various kinds of information associated with the RRC setup of the UE, and includes SRB setup information, DRB setup information, and security key information.

Thereafter, a need to establish an RRC connection arises for any reason at step 3g-30. While the UE that is not assigned the resume ID or is not instructed to maintain the context in the previous RRC connection release process initiates a general RRC connection establishment process as described in FIG. 3F, the RRC inactive mode/light connected mode UE that is assigned the resume ID in the previous RRC connection release process may attempt an RRC connection resumption process using the stored UE context. Depending on whether the network supports the RRC inactive mode/light connected mode, the RRC inactive mode/light connected mode UE may perform the general RRC connection establishment process (FIG. 3F) or perform the RRC connection resumption process using the stored UE context. That is, the general RRC connection establishment process (FIG. 3F) is performed when the RRC inactive mode/light connected mode is not supported, and the RRC connection resumption procedure may be performed as follows when the RRC inactive mode/light connected mode is supported. In the above, the RRC inactive mode may be always supported in the network (therefore, the system information may not indicate separately the supportability.

According to an embodiment of the present disclosure, each eNB or cell may transmit an indication of whether each eNB or cell supports the light connected mode through the system information. The indication may be included in a second block (Systeminformation2) of the system information or may be included in other system information blocks (Systeminformation1~19). Supporting the light connected mode may mean that the following steps 3g-50, 3g-55, 3g-60, 3g-65, 3g-70, 3g-75, 3g-80, 3g-85, and 3g-90 can be configured and supported by the corresponding eNB or cell. When a need to establish an RRC connection arises, the light connected mode UE reads the system information of a currently camping-on cell. If the system information does not include the indication indicating that the eNB or cell supports the light connected mode (or the RRC inactive mode), the UE may perform the general RRC connection establishment process as described in FIG. 3F at step 3g-45. However, if the system information includes the indication indicating that the eNB or cell supports the light connected mode (or the RRC inactive mode), the UE may perform the RRC connection resumption process using the stored UE context at step 3g-45. The RRC connection resumption process using the stored UE context is as follows.

First, the UE transmits a preamble in a message 1 to perform a random access procedure. If the resource allocation is possible according to the preamble received in the message 1, the eNB allocates a corresponding uplink resource to the UE in a message 2. At step 3g-50, the UE transmits a Resume Request message including the resume ID received at step 3g-10, based on the received uplink resource information. This message may be a modified message of the RRCConnectionRequest message or a newly defined message (e.g., RRCConnectionResumeRequest). If the anchor eNB 3g-02 releases the connection and if the UE being in the light connected mode moves and camps on a cell of another eNB, the new eNB 3g-03 receives and checks the resume ID of the UE and thereby knows from which eNB the UE has previously received a service.

When successfully receiving and checking the resume ID, the new eNB 3g-03 performs a procedure of retrieving the UE context from the anchor eNB 3g-02 at steps 3g-55 and 3g-60. If the UE context retrieve procedure fails, for example, in case of failing to find the anchor/source eNB or in case where there is no UE context, the eNB may transmit the RRCConnectionSetup message as shown in FIG. 3F instead of the RRCConnectionResume message, fallback the subsequent bearer setup procedure/security setup procedure by means of the RRC connection establishment procedure described in FIG. 3F, complete the security setup, and enable the UE to be in the RRC connected mode. Alternatively, the eNB may enable the UE to return to the RRC inactive mode while transmitting the RRConnectionSuspend message together with a new UE identifier (resume ID) and the RAN paging area.

The new eNB 3g-03 may retrieve the UE context from the anchor eNB 3g-02 via the S1 or X2 interface. If the new eNB fails to identify the UE even though receiving the resume ID, the new eNB may transmit the RRCConnectionSetup message to the UE to return to the general RRC connection establishment procedure described in FIG. 3F. That is, the new eNB may transmit the RRCConnectionSetup message to the UE, and then the UE may send the RRCConnectionSetupComplete message to the eNB to establish the connection. Alternatively, if the new eNB fails to identify the UE even though receiving the resume ID (for example, in case of failing to retrieve the UE context from the anchor eNB), the new eNB may transmit the RRCConnectionRelease message or the RRCConnectionReject message to the UE to reject the connection of the UE so that the UE tries again the general RRC connection establishment procedure described in FIG. 3F.

At step 3g-65, the new eNB checks a MAC-I, based on the retrieved UE context. The MAC-I is a message authentication code calculated by the UE with respect to a control message by applying security information (i.e., security key and security counter) of the retrieved UE context. The eNB checks the integrity of the message by using the MAC-I of the message, the security key and security counter contained in the UE context, and the like. At step 3g-70, the new eNB determines the configuration to be applied to the RRC connection of the UE and transmits the RRCConnectionResume message containing the configuration information to the UE.

The new eNB may check the UE identifier (resume ID) and transmit the RRC connection resume message encoded using a new secret key (KeNB* or KgNB*). The UE may normally receive the RRC connection resume message by decoding it through a new security key (KeNB* or KgNB*) calculated using NCC allocated in advance at step 3g-10. After the RRC connection resume message is transmitted, the UE and the eNB may transmit and receive RRC messages and data by encoding them with a new security key. The RRC connection resume message may be a control message that information (REUSE INDICATOR) indicating 'RRC context reuse' is contained in a general RRC connection request message. Like the RRC connection setup message, the RRC connection resume message includes various kinds of information associated with the RRC connection setup of the UE.

In case of receiving a general RRC connection setup message (RRConnectionSetup), the UE establishes the RRC connection on the basis of setup information indicated in the RRC connection setup message. However, in case of receiving the RRC connection resume message, the UE establishes the RRC connection by considering both the stored setup information and the setup information indicated in the above control message (Delta configuration). That is, the UE may determine the setup information to be applied by considering the indicated setup information as delta information for the stored setup information, and update the setup information or the UE context. For example, if SRB setup information is included in the RRC connection resume message, the UE configures an SRB by applying the indicated SRB setup information. If the SRB setup information is not included in the RRC connection resume message, the UE configures the SRB by applying the setup information contained in the UE context.

At step 3g-75, the UE establishes an RRC connection by applying the updated UE context and setup information and transmits an RRC connection resume complete message to the new eNB. Then, at steps 3g-80 and 3g-85, the new eNB transmits a control message requesting the release of the connection suspension to the MME and requests the re-setup of the S1 bearer to the new eNB. Upon receiving the above message, the MME instructs the S-GW to reset the S1 bearer to the new eNB and to normally process data for the UE. Thereafter, at step 3g-90, the UE resumes data transmission/reception in the cell.

In the above procedure, if the anchor eNB 3g-02 releases the connection and if the UE being in the light connected mode camps on the cell of the anchor eNB 3g-02 again because of a few movement, the anchor eNB 3g-02 may not perform the above-discussed steps 3g-55 and 3g-60, perform only the release of the connection suspension of the S1 bearer instead of the above-discussed steps 3g-80 and 3g-85, search for the UE context by referring to the resume ID indicated in the message 3, and reestablish the connection based on the UE context.

If the data transmission/reception is stopped, the new eNB starts a certain timer. If the data transmission/reception is not resumed until the timer expires, the new eNB may consider releasing the RRC connection of the UE at step 3g-95. At step 3g-100, the new eNB may transmit the RRConnectionRelease or RRCConnectionSuspend message, a newly defined RRC message, or another existing RRC message to the UE in order to enable the UE to be in the RRC inactive mode or the light connected mode. At step 3g-100, the new eNB may release the RRC connection of the UE according to a predetermined rule, store the UE context, and transmit a control message for instructing the release of the RRC connection to the UE while assigning a new UE identifier (resume ID) and configuring the RAN paging area or RAN notification area for the UE to report mobility in the RRC inactive mode or light connected mode. When the UE that is in the RRC inactive mode or the light connected mode at step 3g-105 moves out of the RAN paging area, a procedure of updating the RAN paging area is performed.

In the next generation mobile communication system, while configuring the UE to be in the RRC inactive mode, the eNB may configure a UE identifier (resume ID) to be used later for an RRC connection, and a RAN paging area or RAN notification area for the UE to report mobility. In addition, the eNB may configure an NCC (NexthopChainingCount) value for the security setup to be used later in a connection establishment process.

In the next generation mobile communication system, the RRC inactive mode UE performs a tracking area update (TAU) procedure when being out of a tracking area (TA) or a TA list configured by the network, MME, or core network (CN). Also, when being out of a RAN paging area or RAN notification area configured by an access and mobility management function (AMF) or the anchor eNB, the RRC inactive mode UE performs a procedure of updating the RAN paging area. When the RRC inactive mode UE performs the RAN paging area update procedure, the network may respond with various messages depending on network conditions. In the present disclosure, a message transmission/reception procedure considering various cases is proposed.

Figure 3H:
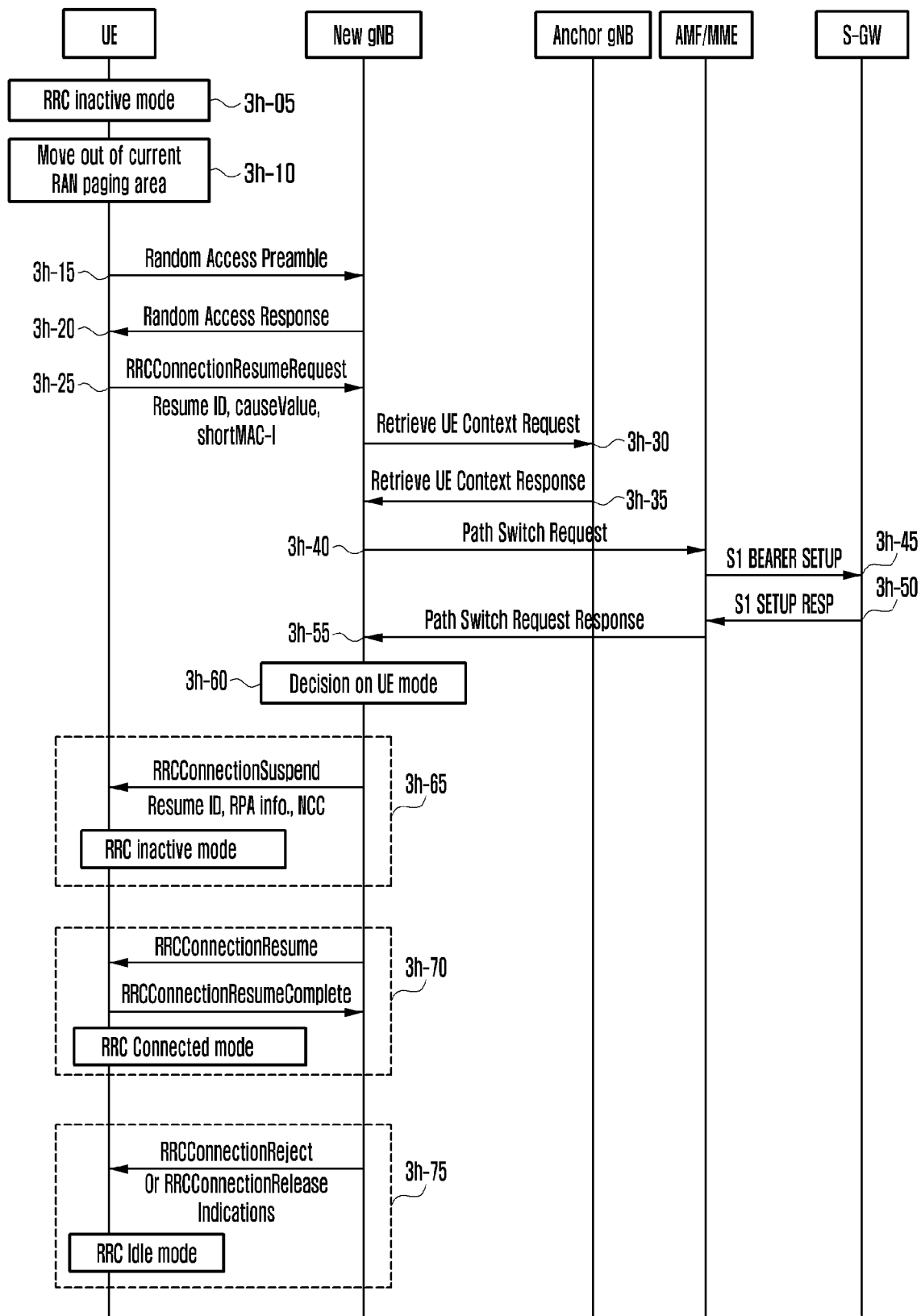
FIG. 3H is a diagram illustrating a procedure in which a terminal moving in an RRC inactive mode (or a lightly-connected mode) performs a RAN paging area update when the terminal moves out of a current RAN paging area according to the third embodiment of the present disclosure.

FIG. 3H is a diagram illustrating a procedure in which a terminal moving in an RRC inactive mode (or a lightly-connected mode) performs a RAN paging area update when the terminal moves out of a current RAN paging area according to the third embodiment of the present disclosure.

As shown in FIG. 3H, the terminal (i.e., UE) which is in the RRC inactive mode at step 3h-05 attempts to access the network in order to perform the RAN paging area update procedure when moving out of the current RAN paging area at step 3h-10. The UE transmits a random access preamble at step 3h-15 to perform a random access procedure, and then receives a random access response (RAR) at step 3h-20. After the random access procedure, the UE transmits at step 3h-25 the RRCConnectionResumeRequest message including a UE identifier (resume ID), an access cause indication (causeValue or randomNotificationAreaUpdateRequest), a short MAC-I (an indication for verifying the integrity of the message), and the like.

The reason for sending the RRCConnectionResumeRequest message is to allow the gNB to change the UE mode in case where downlink data to the UE occurs when the UE attempts to update the RAN paging area or in case where there is a need to change the UE mode to the RRC connected mode for a certain reason. The gNB that receives the message from the UE at step 3h-25 checks the UE identifier (resume ID), identifies the anchor gNB having the UE identifier, and performs a procedure of retrieving the UE context by sending the UE identifier to the anchor gNB at steps 3h-30 and 3h-35. Then, at steps 3h-40, 3h-45, 3h-50, and 3h-55, a bearer path switch procedure may be performed to switch a bearer path to the new gNB accessed by the UE. In order to rapidly update only the RAN paging area of the UE, the gNB may omit the bearer path switch steps 3h-40, 3h-45, 3h-50, and 3h-55.

When deciding to hold the UE in the RRC inactive mode at step 3h-60, or when there is no downlink data to the UE, the gNB transmits at step 3h-65 an RRCConnectionSuspend message including a new UE identifier (resume ID), new RAN paging area information (RPA info.), and security setup information (NexthopChainingCounter (NCC)) to the UE so as to enable the UE to be continuously in the RRC inactive mode. The RAN paging area information may include a list of cell identifiers, a RAN paging area ID, or information indicating a tracking area. Also, the RAN paging area information may be delta signaling. That is, it is possible to instruct to reuse the old RAN paging area information or to add information for adding or deleting some area/cell identifiers to or from the old RAN paging area. The security setup information may be applied to generate a new security key, and may be used to decode the RRC message received from the gNB and verify the integrity of the message in the RRC connection establishment process.

When it is determined at step 3h-60 that there is downlink data to the UE, or when there is a need to change the UE mode to the RRC connected mode for a certain reason (for example, in case of being able to manage the UE in the RRC connected mode because of sufficient network resources), the gNB may attempt to change the UE mode to the RRC connected mode at step 3h-70 by transmitting an RRCConnectionResume message to the UE. The RRCConnectionResume message may be transmitted after encoding with a new security key and integrity verification. Calculating a new security key through security setup information (e.g., NCC) configured when the previous gNB changes the UE mode to the RRC inactive mode through the RRConnectionSuspend message, the UE may decode the RRCConnectionResume message, perform integrity verification, and receive it. Upon receiving the RRCConnectionResume message, the UE may transmit an RRCConnectionResumeComplete message to the gNB to inform the completion of the connection establishment and transition to the RRC connected mode at step 3h-70.

When it is determined at step 3h-60 that there is no downlink data to the UE, or when there is a need to change the UE mode to the RRC idle mode for a certain reason, the gNB may perform step 3h-75. The reason for this step may be short of resources in the network, no longer validity of UE context, or too many RRC inactive mode UEs in a current cell. At step 3h-75, the gNB may transmit an RRConnectionReject message or an RRCConnectionRelease message to the UE to enable the UE to be in the RRC idle mode. The RRCConnectionReject message or the RRCConnectionRelease message may include indications for instructing the UE to transition from the RRC inactive mode to the RRC idle mode.

The next generation mobile communication system may coexist with the existing LTE system and may support different cells. In the LTE system, a technique called light connection is supported to reduce the battery consumption of the UE and to support quick connection of the UE. In the next generation mobile communication system, the RRC inactive mode is supported to reduce the battery consumption of the UE and to support quick connection of the UE. The light connection technique manages the UE in a lightly connected mode in the network and is similar to managing the UE in the RRC inactive mode in the next generation mobile communication system, thus being considered as the same mode and performing the same operation. However, since different radio access schemes deal with the lightly connected mode and the RRC inactive mode, there may be different parts in operation.

Figure 3I:
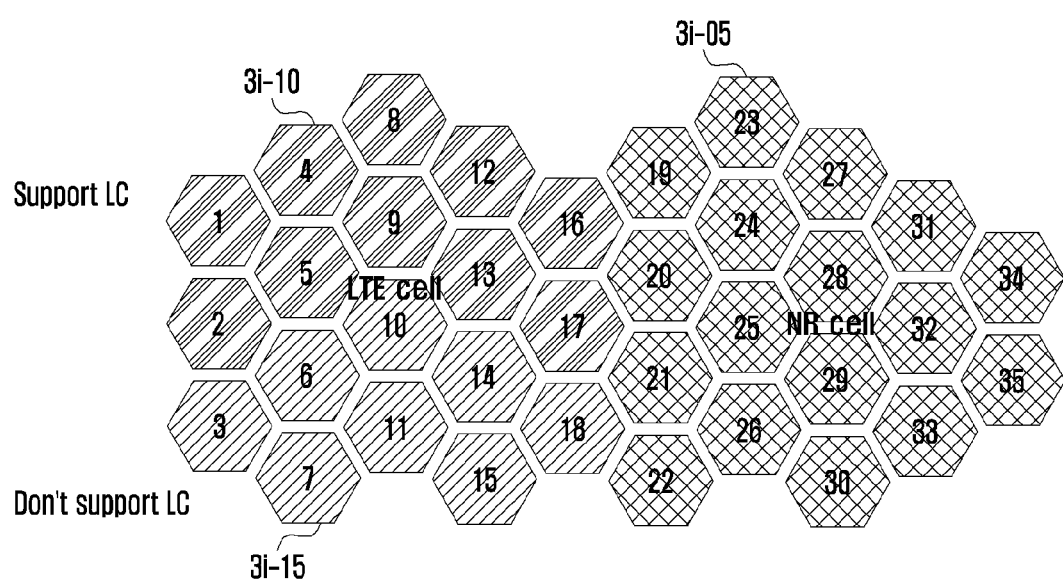
FIG. 3I is a diagram illustrating a deployment scenario in which a next generation mobile communication system and an LTE system coexist according to the third embodiment of the present disclosure.

There are various scenarios in the implementation and deployment of the next generation mobile communication system. FIG. 3I is a diagram illustrating a deployment scenario in which a next generation mobile communication system and an LTE system coexist according to the third embodiment of the present disclosure.

In FIG. 3I, cells 3i-05 supported by the next generation mobile communication system (NR) may always support the RRC inactive mode. The LTE system may be composed of cells 3i-10 of not supporting the lightly connected mode, and cells 3i-15 of supporting the lightly connected mode. According to the deployment scenario of the network, the next generation mobile communication system may also be divided into a cell of supporting the RRC inactive mode and a cell of not supporting the RRC inactive mode. In the deployment scenario shown in FIG. 3I, the RRC inactive mode UE may move cells supported by the next generation mobile communication system and cells supported by the LTE system. Accordingly, in order to support the mobility of the RRC inactive mode UE between different radio access schemes, a mobility support procedure between different radio access schemes is proposed as follows.

Figure 3J:
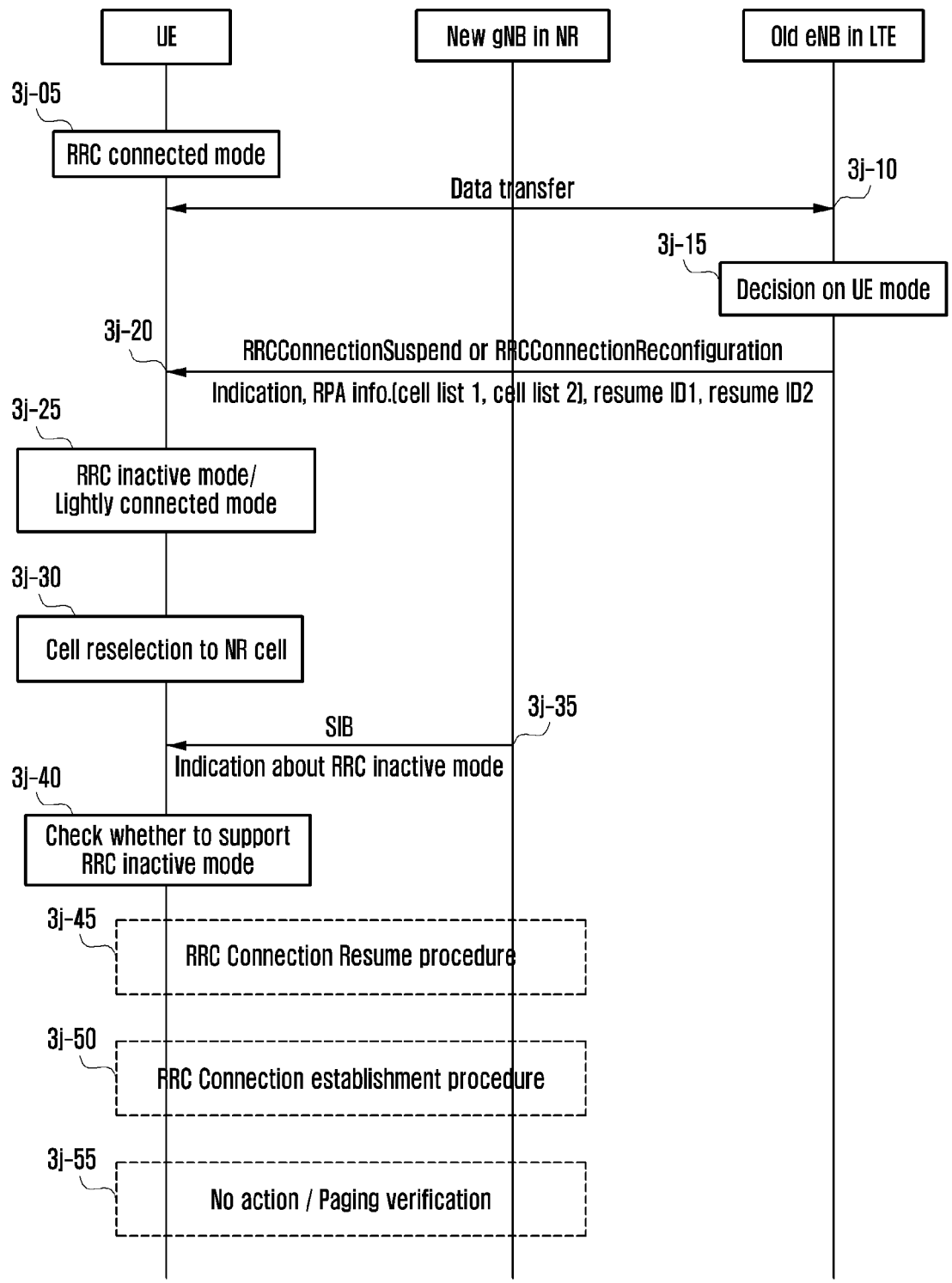
FIG. 3J is a diagram illustrating a method for supporting mobility of an RRC inactive mode (lightly connected mode) terminal when a terminal accessing a cell supported by an LTE system moves to a cell supported by a next generation mobile communication system according to the third embodiment of the present disclosure.

FIG. 3J is a diagram illustrating a method for supporting mobility of an RRC inactive mode (lightly connected mode) terminal when the terminal accessing a cell supported by an LTE system moves to a cell supported by a next generation mobile communication system according to the third embodiment of the present disclosure.

In FIG. 3J, the terminal (i.e., UE) which is in the RRC connected mode at step 3j-05 accesses a cell supported by a base station (i.e., eNB) of the LTE system and transmits/receives data at step 3j-10. At step 3j-15, the LTE eNB may determine the UE to be in the lightly connected mode or the RRC inactive mode for a certain reason. This reason may be no data transmission/reception between the UE and the network for a certain time, insufficient transmission resources of the eNB, or a high possibility for the UE to transmit/receive data again in the near future.

If the LTE eNB decides to change the UE mode to the lightly connected mode or the RRC inactive mode, the LTE eNB transmits an RRCConnectionSuspend message, an RRCConnectionReconfiguration message, or a newly defined RRC message to the UE at step 3j-20 so as to instruct the UE to transition from the RRC connected mode to the lightly connected mode or the RRC inactive mode. This RRC message may include an indication for transitioning to the lightly connected mode, RAN paging area information, a UE identifier, and security setup information (e.g., NexthopChainingCounter (NCC)). The RAN paging area information may be composed of two types of cell lists (cell list 1 and cell list 2). The first cell list (cell list 1) represents a list of cells supporting the RRC inactive mode in the next generation mobile communication system, and the second cell list (cell list 2) represents a list of cells supporting the light connection (LC) in the LTE system. In addition, two types of UE identifiers may be configured. The first UE identifier (resume ID 1) may be used to establish a connection in the next generation mobile communication system, and the second UE identifier (resume ID 2) may be used to establish a connection in the LTE system. Further, in the RRC message, one UE identifier commonly used in the next generation mobile communication system and the LTE system may be configured. In order to allocate the above cell lists and UE identifiers, there may be coordination between the LTE system and the next generation mobile communication system. That is, information about cell identifiers and UE identifiers in different radio access systems may be shared and allocated to the UE of each system.

The UE that receives the RRC message may transition to the lightly connected mode and move at step 3j-25. The lightly connected mode UE may perform cell reselection while moving. If there is no suitable cell for the LTE system accessed previously, the lightly connected mode UE may attempt to connect to a cell supported by the next generation mobile communication system at step 3j-30. For example, if uplink data is generated in the UE, if the UE receives a paging message from the gNB, if control signaling to be transmitted on uplink occurs, if there is a need to update the RAN paging area, or if there is a need to update the tracking area, the UE may try to connect to the network. The UE may identify system information of a cell supported by the next generation mobile communication system at step 3j-35 and check at step 3j-40 whether the cell supports the RRC inactive mode. The cell may transmit through the system information an indication of whether the RRC inactive mode is supported. If the RRC inactive mode is always supported in all cells supported by the next generation mobile communication system, it is not necessary to broadcast the supportability of the RRC inactive mode in the system information.

When the UE waits in a cell supported by the next generation mobile communication system, the UE may monitor paging from the core network (CN) and paging from the anchor gNB/RAN/access network (AN). These different kinds of paging may be distinguished by an indication or identifier included in the paging message. For example, if the paging message includes a resume ID or the first UE identifier, the paging may be determined as being from the anchor gNB/RAN/AN. If the paging message includes an identifier such as IMSI or S-TMSI, the paging may be determined as being from the CN.

The UE first checks whether the RRC inactive mode is supported in the cell supported by the next generation mobile communication system. If the cell supports the RRC inactive mode, if the UE has a reason to establish a connection to the network (for example, if uplink data is generated, if the UE receives a paging message from the gNB, if control signaling to be transmitted on uplink occurs, if there is a need to update the RAN paging area, or if there is a need to update the tracking area), and if the cell is included in the first cell list, the UE may perform the RRC connection resume procedure as described in FIGS. 3G and 3H by using the first UE identifier at step 3$j$-45. In addition, through this procedure, a new first UE identifier and RAN paging area information may be configured.

If the cell supports the RRC inactive mode, if there is no reason for the UE to establish a connection to the network, and if the cell is included in the first cell list, the UE does not take any action and maintain the RRC inactive mode at step 3$j$-55 while monitoring paging from the CN and paring from the anchor gNB/RAN/AN.

If the cell supports the RRC inactive mode and if the cell is not included in the first cell list, the UE may perform the RAN paging area update procedure as described in FIG. 3H by using the first UE identifier at step 3$j$-45.

If the cell does not support the RRC inactive mode, the UE may perform the general RRC connection establishment procedure as described in FIG. 3F at step 3$j$-50.

Figure 3K:
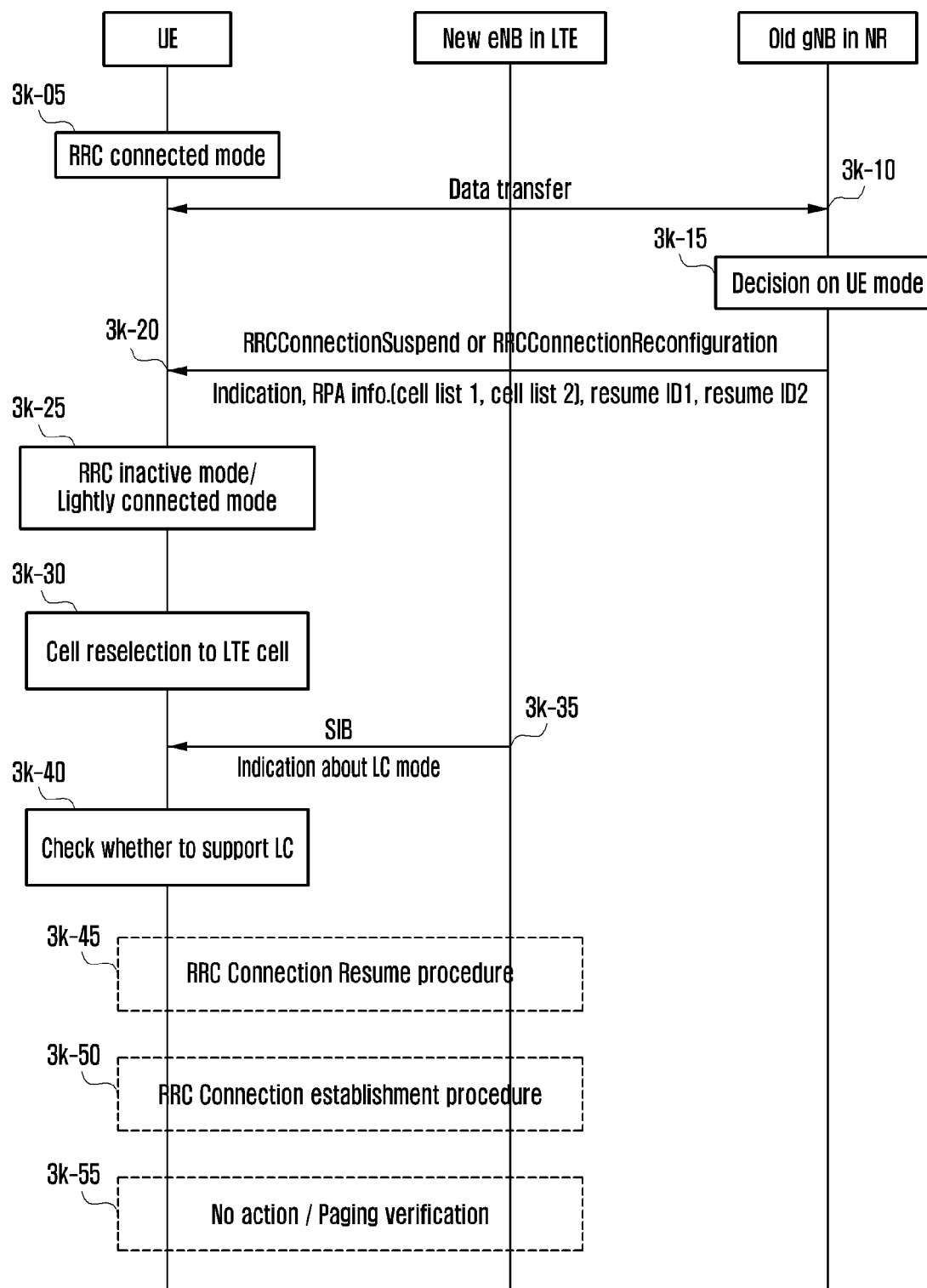
FIG. 3K is a diagram illustrating a method for supporting mobility of an RRC inactive mode (lightly connected mode) terminal when a terminal accessing a cell supported by a next generation mobile communication system moves to a cell supported by an LTE system according to the third embodiment of the present disclosure.

FIG. 3K is a diagram illustrating a method for supporting mobility of an RRC inactive mode (lightly connected mode) terminal when a terminal accessing a cell supported by a next generation mobile communication system moves to a cell supported by an LTE system according to the third embodiment of the present disclosure.

In FIG. 3K, the terminal (i.e., UE) which is in the RRC connected mode at step 3$k$-05 accesses a cell supported by a base station (i.e., gNB) of the next generation mobile communication system and transmits/receives data at step 3$k$-10. At step 3$k$-15, the gNB may determine the UE to be in the lightly connected mode or the RRC inactive mode for a certain reason. This reason may be no data transmission/reception between the UE and the network for a certain time, insufficient transmission resources of the gNB, or a high possibility for the UE to transmit/receive data again in the near future.

If the gNB decides to change the UE mode to the lightly connected mode or the RRC inactive mode, the gNB transmits an RRCConnectionSuspend message, an RRCConnectionReconfiguration message, or a newly defined RRC message to the UE at step 3$k$-20 so as to instruct the UE to transition from the RRC connected mode to the lightly connected mode or the RRC inactive mode. This RRC message may include an indication for transitioning to the lightly connected mode, RAN paging area information, a UE identifier, and security setup information (e.g., NexthopChainingCounter (NCC)). The RAN paging area information may be composed of two types of cell lists (cell list 1 and cell list 2). The first cell list (cell list 1) represents a list of cells supporting the RRC inactive mode in the next generation mobile communication system, and the second cell list (cell list 2) represents a list of cells supporting the light connection (LC) in the LTE system. In addition, two types of UE identifiers may be configured. The first UE identifier (resume ID 1) may be used to establish a connection in the next generation mobile communication system, and the second UE identifier (resume ID 2) may be used to establish a connection in the LTE system. Further, in the RRC message, one UE identifier commonly used in the next generation mobile communication system and the LTE system may be configured. In order to allocate the above cell lists and UE identifiers, there may be coordination between the LTE system and the next generation mobile communication system. That is, information about cell identifiers and UE identifiers in different radio access systems may be shared and allocated to the UE of each system.

The UE that receives the RRC message may transition to the lightly connected mode and move at step 3$k$-25. The lightly connected mode UE may perform cell reselection while moving. If there is no suitable cell for the next generation mobile communication system accessed previously, the lightly connected mode UE may attempt to connect to a cell supported by the LTE system at step 3$k$-30. For example, if uplink data is generated in the UE, if the UE receives a paging message from the eNB, if control signaling to be transmitted on uplink occurs, if there is a need to update the RAN paging area, or if there is a need to update the tracking area, the UE may try to connect to the network. The UE may identify system information of a cell supported by the LTE system at step 3$k$-35 and check at step 3$k$-40 whether the cell supports the light connection. The cell may transmit through the system information an indication of whether the light connection is supported.

When the UE waits in a cell supported by the LTE system, the UE may monitor paging from the CN and paging from the anchor eNB/RAN/AN. These different kinds of paging may be distinguished by an indication or identifier included in the paging message. For example, if the paging message includes a resume ID or the second UE identifier, the paging may be determined as being from the anchor eNB/RAN/AN. If the paging message includes an identifier such as IMSI or S-TMSI, the paging may be determined as being from the CN.

The UE first checks whether the light connection is supported in the cell supported by the LTE system. If the cell supports the light connection, if the UE has a reason to establish a connection to the network (for example, if uplink data is generated, if the UE receives a paging message from the eNB, if control signaling to be transmitted on uplink occurs, if there is a need to update the RAN paging area, or if there is a need to update the tracking area), and if the cell is included in the second cell list, the UE may perform the RRC connection resume procedure as described in FIGS. 3G and 3H by using the second UE identifier at step 3$k$-45. In addition, through this procedure, a new second UE identifier and RAN paging area information may be configured.

If the cell supports the light connection, if there is no reason for the UE to establish a connection to the network, and if the cell is included in the second cell list, the UE does not take any action and maintain the lightly connected mode at step 3$k$-55 while monitoring paging from the CN and paring from the anchor eNB/RAN/AN.

If the cell supports the light connection and if the cell is not included in the second cell list, the UE may perform the RAN paging area update procedure as described in FIG. 3H by using the second UE identifier at step 3$k$-45.

If the cell does not support the RRC inactive mode, the UE may perform the general RRC connection establishment procedure as described in FIG. 3F at step 3$k$-50.

Figure 3L:
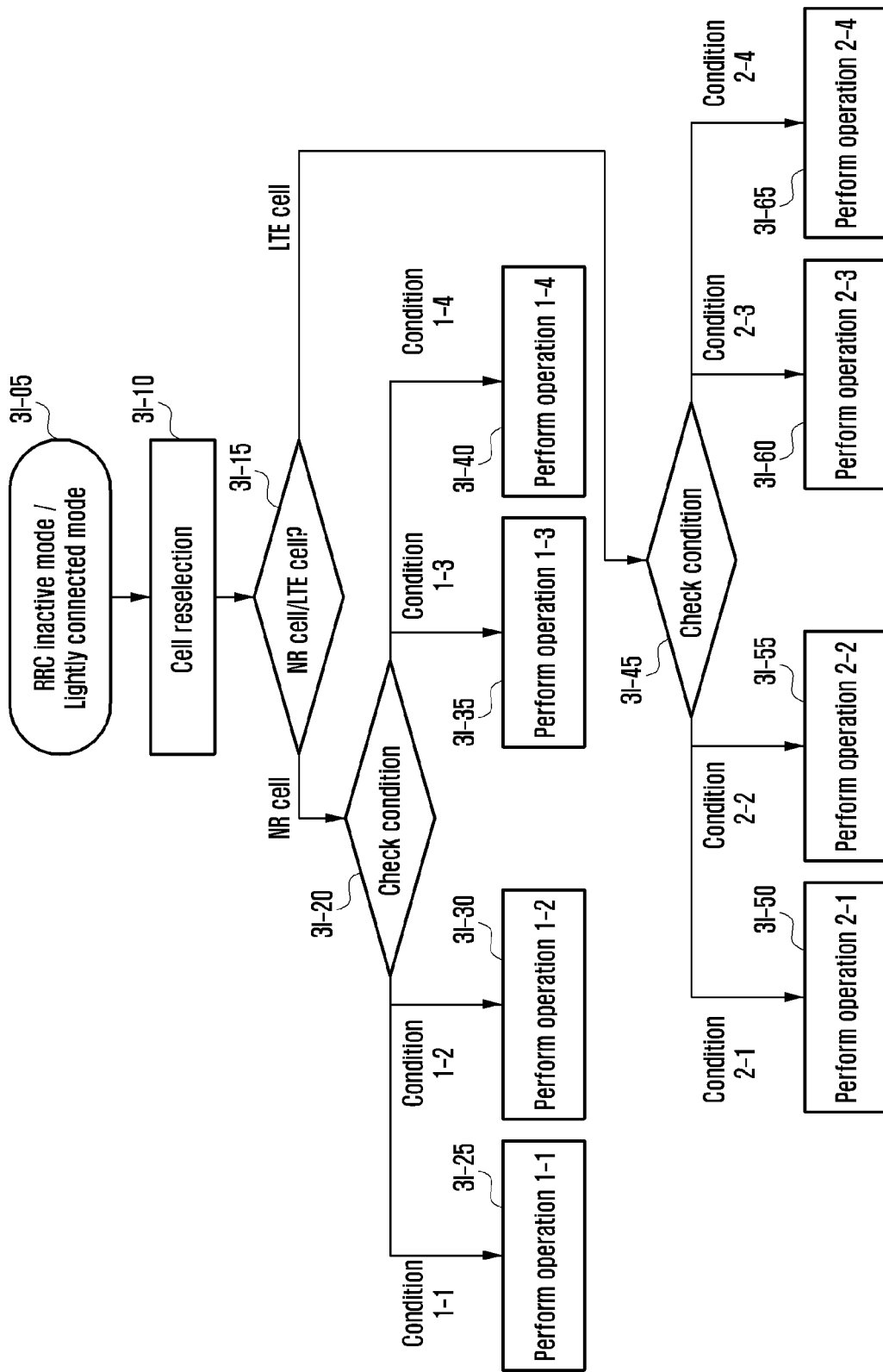
FIG. 3L is a diagram illustrating a terminal operation for supporting mobility of an RRC inactive mode (lightly connected mode) terminal in different radio access schemes according to the third embodiment of the present disclosure.

FIG. 3L is a diagram illustrating a terminal operation for supporting mobility of an RRC inactive mode (lightly connected mode) terminal in different radio access schemes according to the third embodiment of the present disclosure.

In FIG. 3L, the terminal (i.e., UE) being in the RRC inactive mode/lightly connected mode 3*l*-05 may perform a cell reselection process while moving at step 3*l*-10. Then, at step 3*l*-15, the UE checks whether a cell selected through the cell reselection process is an LTE cell or a next generation mobile communication system cell (i.e., an NR cell).

If the selected cell is the NR cell, the UE checks a condition at step 3*l*-20 and performs the corresponding operation as described below.

If the condition 1-1 is satisfied, the UE performs the operation 1-1 at step 3*l*-25.

If the condition 1-2 is satisfied, the UE performs the operation 1-2 at step 3*l*-30.

If the condition 1-3 is satisfied, the UE performs the operation 1-3 at step 3*l*-35.

If the condition 1-4 is satisfied, the UE performs the operation 1-4 at step 3*l*-40.

The condition 1-1 indicates a case where the cell supports the RRC inactive mode, the UE has a reason to establish a connection to the network (for example, if uplink data is generated, if the UE receives a paging message from the gNB, if control signaling to be transmitted on uplink occurs, if there is a need to update the RAN paging area, or if there is a need to update the tracking area), and the cell is included in the first cell list.

The condition 1-2 indicates a case where the cell supports the RRC inactive mode, there is no reason for the UE to establish a connection to the network, and the cell is included in the first cell list.

The condition 1-3 indicates a case where the cell supports the RRC inactive mode and the cell is not included in the first cell list.

The condition 1-4 indicates a case where the cell does not support the RRC inactive mode.

The operation 1-1 indicates that the UE performs the RRC connection resume procedure as described in FIGS. 3G and 3H by using the first UE identifier (through this procedure, a new first UE identifier and RAN paging area information may be configured).

The operation 1-2 indicates that the UE does not take any action and maintain the RRC inactive mode while monitoring paging from the CN and paring from the anchor gNB/RAN/AN.

The operation 1-3 indicates that the UE performs the RAN paging area update procedure as described in FIG. 3H by using the first UE identifier.

The operation 1-4 indicates that the UE performs the general RRC connection establishment procedure as described in FIG. 3F.

If the selected cell is the LTE cell, the UE checks a condition at step 3*l*-45 and performs the corresponding operation as described below.

If the condition 2-1 is satisfied, the UE performs the operation 2-1 at step 3*l*-50.

If the condition 2-2 is satisfied, the UE performs the operation 2-2 at step 3*l*-55.

If the condition 2-3 is satisfied, the UE performs the operation 2-3 at step 3*l*-60.

If the condition 2-4 is satisfied, the UE performs the operation 2-4 at step 3*l*-65.

The condition 2-1 indicates a case where the cell supports the light connection, the UE has a reason to establish a connection to the network (for example, if uplink data is generated, if the UE receives a paging message from the eNB, if control signaling to be transmitted on uplink occurs, if there is a need to update the RAN paging area, or if there is a need to update the tracking area), and the cell is included in the second cell list.

The condition 2-2 indicates a case where the cell supports the light connection, there is no reason for the UE to establish a connection to the network, and the cell is included in the second cell list.

The condition 2-3 indicates a case where the cell supports the light connection and the cell is not included in the second cell list.

The condition 2-4 indicates a case where the cell does not support the light connection.

The operation 2-1 indicates that the UE performs the RRC connection resume procedure as described in FIGS. 3G and 3H by using the second UE identifier (through this procedure, a new second UE identifier and RAN paging area information may be configured).

The operation 2-2 indicates that the UE does not take any action and maintain the lightly connected mode while monitoring paging from the CN and paring from the anchor eNB/RAN/AN.

The operation 2-3 indicates that the UE performs the RAN paging area update procedure as described in FIG. 3H by using the second UE identifier.

The operation 2-4 indicates that the UE performs the general RRC connection establishment procedure as described in FIG. 3F.

Figure 3M:
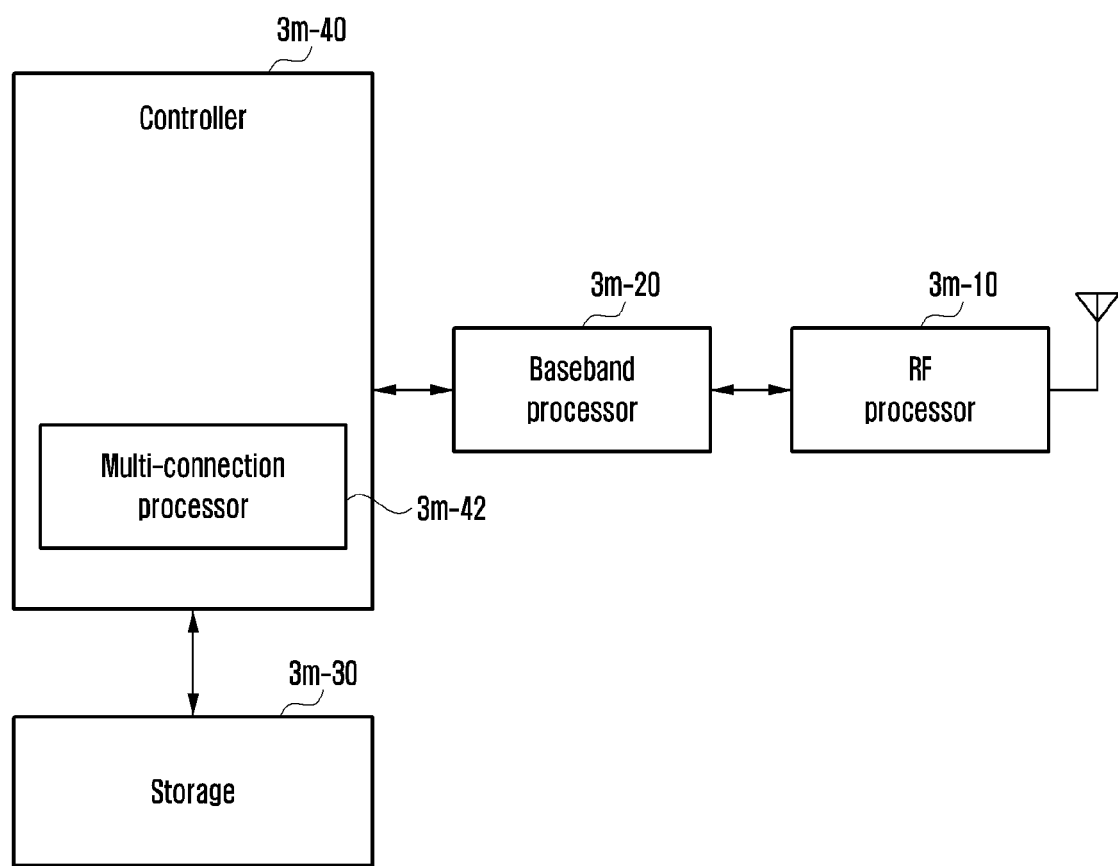
FIG. 3M is a diagram illustrating a structure of a terminal according to the third embodiment of the present disclosure.

FIG. 3M is a diagram illustrating a structure of a terminal according to the third embodiment of the present disclosure.

As shown in FIG. 3M, the terminal includes a radio frequency (RF) processor 3*m*-10, a baseband processor 3*m*-20, a storage 3*m*-30, and a controller 3*m*-40.

The RF processor 3*m*-10 performs a function, such as band conversion and amplification of a signal, for transmitting and receiving the signal through a radio channel. That is, the RF processor 3*m*-10 up-converts a baseband signal provided from the baseband processor 3*m*-20 into an RF band signal to transmit the RF band signal through an antenna, and also down-converts an RF band signal received through the antenna into a baseband signal. For example, the RF processor 3*m*-10 may include a transmitter filter, a receiver filter, an amplifier, a mixer, an oscillator, a digital to analog converter (DAC), an analog to digital converter (ADC), and the like. Although FIG. 3M shows only one antenna, the terminal may have a plurality of antennas. In addition, the RF processor 3*m*-10 may include a plurality of RF chains. Further, the RF processor 3*m*-10 may perform beamforming. For the beamforming, the RF processor 3*m*-10 may adjust the phase and size of each signal transmitted and received through a plurality of antennas or antenna elements. Also, the RF processor 3*m*-10 may perform MIMO and receive several layers in the MIMO operation.

The baseband processor 3*m*-20 performs a conversion function between a baseband signal and a bit stream in accordance with a physical layer standard of the system. For example, in data transmission, the baseband processor 3*m*-20 creates complex symbols by encoding and modulating transmission bit streams. Also, in data reception, the baseband processor 3*m*-20 restores reception bit streams by demodulating and decoding a baseband signal provided from the RF processor 3*m*-10. In case of complying with orthogonal frequency division multiplexing (OFDM) scheme, in data transmission, the baseband processor 3*m*-20 generates complex symbols by encoding and modulating transmission bit streams, maps the complex symbols to subcarriers, and constructs OFDM symbols through an inverse fast Fourier transform (IFFT) operation and a cyclic prefix (CP) insertion. In addition, in data reception, the baseband processor $3m$-20 divides a baseband signal provided from the RF processor $3m$-10 into OFDM symbol units, restores signals mapped to subcarriers through a fast Fourier transform (FFT) operation, and restores reception bit streams through demodulation and decoding.

As described above, the baseband processor $3m$-20 and the RF processor $3m$-10 transmit and receive signals. Accordingly, the baseband processor $3m$-20 and the RF processor $3m$-10 may be referred to as a transmitting unit, a receiving unit, a transceiver, or a communication unit. In addition, at least one of the baseband processor $3m$-20 and the RF processor $3m$-10 may include a plurality of communication modules to support a plurality of different radio access technologies. Also, at least one of the baseband processor $3m$-20 and the RF processor $3m$-10 may include different communication modules for processing signals of different frequency bands. For example, the different radio access technologies may include a wireless LAN (e.g., IEEE 802.11), a cellular network (e.g., LTE), and the like. In addition, the different frequency bands may include a super high frequency (SHF) band (e.g., 2.5 GHz, 5 GHz), and a millimeter wave (e.g., 60 GHz) band.

The storage $3m$-30 stores a basic program for the operation of the terminal, an application program, and data such as configuration information. In particular, the storage $3m$-30 may store information associated with an access node that performs wireless communication by using a radio access technology. Also, the storage $3m$-30 provides the stored data in response to a request of the controller $3m$-40.

The controller $3m$-40 controls overall operations of the terminal. For example, the controller $3m$-40 transmits and receives a signal through the baseband processor $3m$-20 and the RF processor $3m$-10. Also, the controller $3m$-40 writes and reads data to and from the storage $3m$-30. For this, the controller $3m$-40 may include at least one processor. For example, the controller $3m$-40 may include a communication processor (CP) for controlling communication and an application processor (AP) for controlling an upper layer such as an application program.

Figure 3N:
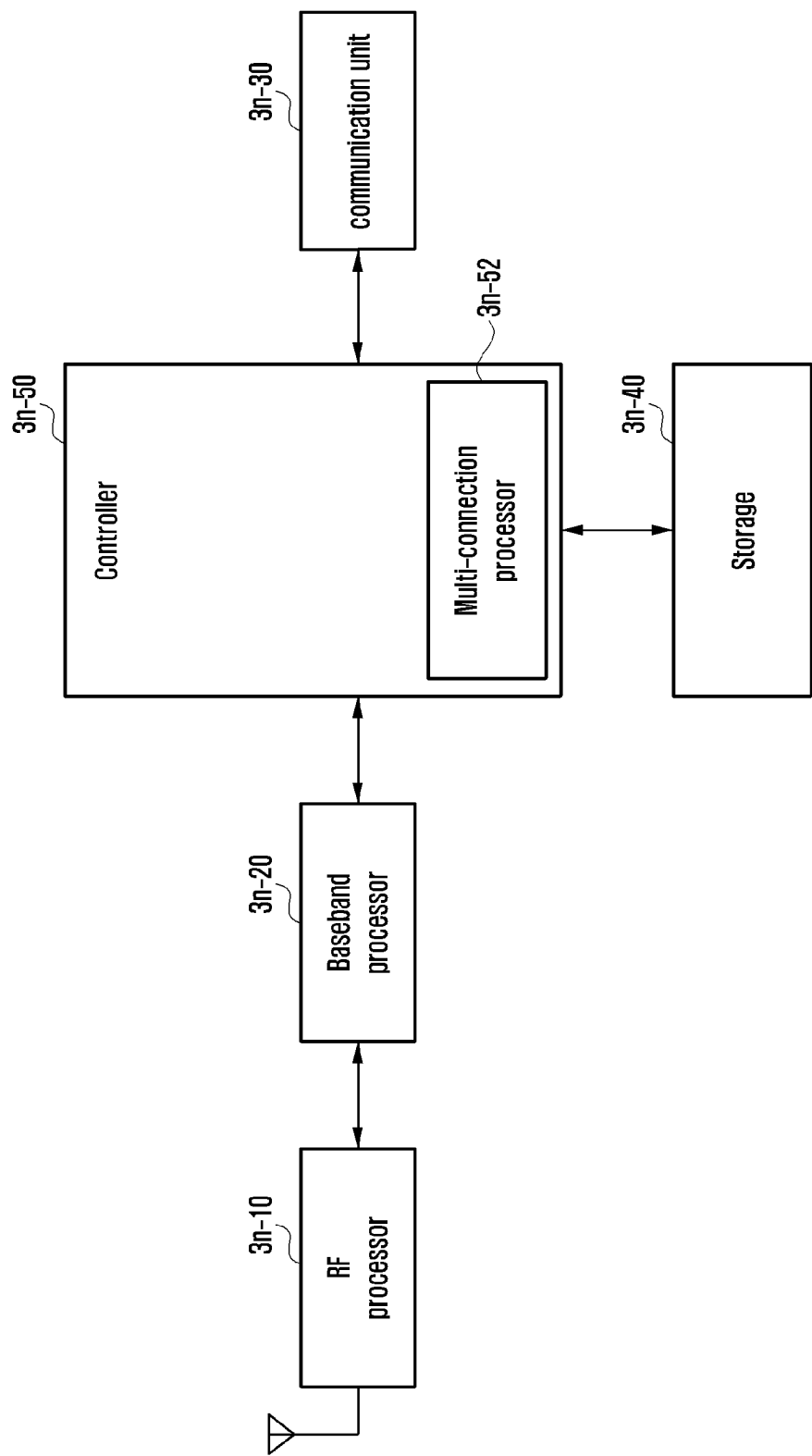
FIG. 3N is a block diagram illustrating a configuration of a base station in a wireless communication system according to the third embodiment of the present disclosure.

FIG. 3N is a block diagram illustrating a configuration of a base station in a wireless communication system according to the third embodiment of the present disclosure.

As shown in FIG. 3N, the base station includes an RF processor $3n$-10, a baseband processor $3n$-20, a backhaul communication unit $3n$-30, a storage $3n$-40, and a controller $3n$-50.

The RF processor $3n$-10 performs a function, such as band conversion and amplification of a signal, for transmitting and receiving the signal through a radio channel. That is, the RF processor $3n$-10 up-converts a baseband signal provided from the baseband processor $3n$-20 into an RF band signal to transmit the RF band signal through an antenna, and also down-converts an RF band signal received through the antenna into a baseband signal. For example, the RF processor $3n$-10 may include a transmitter filter, a receiver filter, an amplifier, a mixer, an oscillator, a DAC, an ADC, and the like. Although FIG. 3N shows only one antenna, the base station may have a plurality of antennas. In addition, the RF processor $3n$-10 may include a plurality of RF chains. Further, the RF processor $3n$-10 may perform beamforming. For the beamforming, the RF processor $3n$-10 may adjust the phase and size of each signal transmitted and received through a plurality of antennas or antenna elements. Also, the RF processor $3n$-10 may perform MIMO and receive several layers in the MIMO operation.

The baseband processor $3n$-20 performs a conversion function between a baseband signal and a bit stream in accordance with a physical layer standard of the radio access technology. For example, in data transmission, the baseband processor $3n$-20 creates complex symbols by encoding and modulating transmission bit streams. Also, in data reception, the baseband processor $3n$-20 restores reception bit streams by demodulating and decoding a baseband signal provided from the RF processor $3n$-10. In case of complying with OFDM scheme, in data transmission, the baseband processor $3n$-20 generates complex symbols by encoding and modulating transmission bit streams, maps the complex symbols to subcarriers, and constructs OFDM symbols through an IFFT operation and a CP insertion. In addition, in data reception, the baseband processor $3n$-20 divides a baseband signal provided from the RF processor $3n$-10 into OFDM symbol units, restores signals mapped to subcarriers through an FFT operation, and restores reception bit streams through demodulation and decoding. The baseband processor $3n$-20 and the RF processor $3n$-10 transmit and receive signals as described above. Thus, the baseband processor $3n$-20 and the RF processor $3n$-10 may be referred to as a transmitting unit, a receiving unit, a transceiver, a communication unit, or a wireless communication unit.

The backhaul communication unit $3n$-30 provides an interface for performing communication with other nodes in a network. That is, the backhaul communication unit $3n$-30 converts a bit stream transmitted from the base station to another node, e.g., a sub base station, a core network, etc., into a physical signal, and also converts a physical signal received from another node into a bit stream.

The storage $3n$-40 stores a basic program for the operation of the base station, an application program, and data such as setting information. In particular, the storage $3n$-40 may store information on a bearer allocated to the connected terminal, a measurement result reported from the connected terminal, and the like. In addition, the storage $3n$-40 may store information for determining whether to provide or suspend multiple connections to or from the terminal. Also, the storage $3n$-40 provides the stored data in response to a request of the controller $3n$-50.

The controller $3n$-50 controls overall operations of the base station. For example, the controller $3n$-50 transmits and receives a signal through the baseband processor $3n$-20 and the RF processor $3n$-10 or through the backhaul communication unit $3n$-30. Also, the controller $3n$-50 writes and reads data to and from the storage $3n$-40. For this, the controller $3n$-50 may include at least one processor.

The methods disclosed herein may be implemented in hardware, software, or a combination of hardware and software.

In case of implementation in software, a computer-readable storage medium that stores one or more programs (or software modules) may be provided. Such programs stored in the computer-readable storage medium are configured for execution by one or more processors equipped in an electronic device. In addition, such programs include instructions that cause the electronic device to perform the methods according to the disclosed embodiments of the present disclosure.

Such programs (or software modules) may be stored in a memory such as a random access memory, a non-volatile memory including a flash memory, a read only memory (ROM), an electrically erasable programmable ROM (EEPROM), a magnetic disc storage device, a compact disc- ROM (CD-ROM), a digital versatile disc (DVDs), other type optical storage device, a magnetic cassette, or any combination thereof. In addition, each of such memories may be included as plural components.

In addition, the program may be stored in an attachable storage device that is accessible through a communication network such as the Internet, an Intranet, a local area network (LAN), a wide LAN (WLAN), or a storage area network (SAN), or any combination thereof. Such a storage device may access an apparatus that performs an embodiment of the present disclosure via an external port. Further, a separate storage device on the communication network may access an apparatus that performs an embodiment of the present disclosure.

In the above-discussed embodiments of the present disclosure, the elements included in the disclosure are expressed singular or plural in accordance with the specific embodiment shown. However, it is to be understood that the singular or plural representations are selected appropriately for the sake of convenience of description, and the present disclosure is not limited to the singular or plural constituent elements. Even expressed as a singular element, it may be composed of plural elements, and vice versa. Although embodiments are described herein individually, two or more of such embodiments may be combined.

While the present disclosure has been particularly shown and described with reference to embodiments thereof, it is clearly understood that the same is by way of illustration and example only and is not to be taken in conjunction with the present disclosure. It will be understood by those skilled in the art that various changes in form and details may be made therein without departing from the subject matter and scope of the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method by a terminal, the method comprising:
   receiving, from a cell of a base station associated with a first core network, a message for releasing a radio resource control (RRC) connection that is established based on a first identity associated with the first core network, wherein the message includes configuration information for an RRC inactive state and the configuration information includes a resume identity (ID);
   entering the RRC inactive state based on the configuration information;
   reselecting a cell while the terminal is in the RRC inactive state;
   identifying whether the reselected cell supports the RRC inactive state based on system information received from the reselected cell;
   transmitting, to the reselected cell, a message for requesting RRC connection resume including the resume ID in case that a radio access network (RAN) notification area update procedure is triggered or a RAN paging message is received, while the terminal is in the RRC inactivate state based on the reselected cell supporting the RRC inactive state;
   entering an RRC idle state from the RRC inactive state in case that the reselected cell does not support the RRC inactive state; and
   transmitting, to the reselected cell associated with a second core network, a message for requesting an establishment of an RRC connection based on a second identity associated with the second core network, in case that an RRC connection establishment procedure is initiated while the terminal is in the RRC idle state.

2. The method of claim 1, wherein the first identity includes a serving temporary mobile subscriber identity (S-TMSI) associated with a 5G system, and
   wherein the second identity includes a S-TMSI associated with a long term evolution (LTE) system.

3. The method of claim 1, wherein the RAN notification area update procedure is triggered in case that the reselected cell does not belong to a configured RAN notification area.

4. The method of claim 1, wherein the terminal is connected to a cell of an LTE system or a cell of a 5G communication system.

5. A terminal, comprising:
   a transceiver; and
   a controller coupled with the transceiver and configured to:
   receive, from a cell of a base station associated with a first core network, a message for releasing a radio resource control (RRC) connection that is established based on a first identity associated with the first core network, wherein the message includes configuration information for an RRC inactive state and the configuration information includes a resume identity (ID),
   enter the RRC inactive state based on the configuration information,
   reselect a cell while the terminal is in the RRC inactive state,
   identify whether the reselected cell supports the RRC inactive state based on system information received from the reselected cell,
   transmit, to the reselected cell, a message for RRC connection resume including the resume ID in case that a radio access network (RAN) notification area update procedure is triggered or a RAN paging message is received, while the terminal is in the RRC inactive state based on the reselected cell supporting the RRC inactive state,
   enter an RRC idle state from the RRC inactive state in case that the reselected cell does not support the RRC inactive state, and
   transmit, to the reselected cell associated with a second core network, a message for requesting an establishment of an RRC connection based on a second identity associated with the second core network, in case that an RRC connection establishment procedure is initiated while the terminal is in the RRC idle state.

6. The terminal of claim 5, wherein the first identity includes a serving temporary mobile subscriber identity (S-TMSI) associated with a 5G system, and
   wherein the second identity includes a S-TMSI associated with a long term evolution (LTE) system.

7. The terminal of claim 5, wherein the RAN notification area update procedure is triggered in case that the reselected cell does not belong to a configured RAN notification area.

8. The terminal of claim 5, wherein the terminal is connected to a cell of an LTE system or a cell of a 5G communication system.

* * * * *